US008788404B1

(12) United States Patent
Christopolous et al.

(10) Patent No.: US 8,788,404 B1
(45) Date of Patent: Jul. 22, 2014

(54) STRUCTURED FINANCE SECURITIES OPTION PRICING ARCHITECTURE AND PROCESS

(75) Inventors: Andreas D. Christopolous, Ithaca, NY (US); Robert A. Jarrow, Ithaca, NY (US); Joshua G. Barratt, Ithaca, NY (US); Shirish Chinchalkar, Netcong, NJ (US); Thomas F. Coleman, Ithaca, NY (US); Abram D. Connelly, Ithaca, NY (US); Daniel C. Ilut, Ithaca, NY (US); Tibor Janosi, Ithaca, NY (US); Yohan Kim, Palisades Park, NJ (US); Yildiray Yildirim, Ithaca, NY (US); Mark A. Zifchock, Ithaca, NY (US)

(73) Assignees: Cornell Research Foundation, Inc., Ithaca, NY (US); WOTN, LLC, Ithaca, NY (US)

( * ) Notice: Subject to any disclaimer, the term of this patent is extended or adjusted under 35 U.S.C. 154(b) by 0 days.

(21) Appl. No.: 13/462,469

(22) Filed: May 2, 2012

Related U.S. Application Data

(63) Continuation of application No. 12/649,707, filed on Dec. 30, 2009, now abandoned, which is a continuation of application No. 11/009,484, filed on Dec. 10, 2004, now abandoned.

(60) Provisional application No. 60/528,938, filed on Dec. 11, 2003.

(51) Int. Cl.
*G06Q 40/00* (2012.01)

(52) U.S. Cl.
USPC ............................................. 705/38

(58) Field of Classification Search
USPC .................................................. 705/35–40
See application file for complete search history.

(56) References Cited

U.S. PATENT DOCUMENTS

| 5,812,988 | A  | * | 9/1998 | Sandretto ..................... | 705/36 R |
| 7,010,510 | B1 | * | 3/2006 | Schellhorn .................. | 705/36 R |
| 7,392,216 | B1 | * | 6/2008 | Palmgren et al. .............. | 705/37 |
| 2003/0105696 | A1 | * | 6/2003 | Kalotay et al. .................. | 705/35 |
| 2003/0135450 | A1 | * | 7/2003 | Aguais et al. .................... | 705/38 |
| 2004/0107161 | A1 | * | 6/2004 | Tanaka et al. ................... | 705/38 |
| 2004/0153330 | A1 | * | 8/2004 | Miller et al. ...................... | 705/1 |
| 2005/0182702 | A1 | * | 8/2005 | Williams, III ................. | 705/35 |
| 2009/0106133 | A1 | * | 4/2009 | Redmayne ..................... | 705/35 |

OTHER PUBLICATIONS

Definition, fair value, Value Based Management, Net.*
Definition, statistically significant, Investopedia.com.*
Definiton, standard error, American Heritage Dictionary.*
Commercial Mortgage-backed Securities, Prepayment and Default, Ambrose, B., Sanders, A.B., 2001.*
Advances in Valuation of Mortgage-backed Securities, Fabozzi, 1998, pp. 75-82.*
Statisticial Analysis for Decision Making, Hamburg., M., Young, P., 1994, certain pages.*
Liquidity Risk and Arbitage Pricing Theory, Cetin, U., Jarrow, R., Protter, P., Nov. 2003.*

(Continued)

*Primary Examiner* — Ryan D Donlon
(74) *Attorney, Agent, or Firm* — Burns & Levinson LLP; Jacob N. Erlich; Orlando Lopez

(57) ABSTRACT

A method and system for valuing structured-finance securities, such as, but not limited to, commercial mortgage-backed securities (CMBS).

27 Claims, 51 Drawing Sheets

(56) References Cited

OTHER PUBLICATIONS

Mortgage Termination: An Empirical Hazard Model with Stochastic Term Structure, Deng, 1995.*
A 3-factor Valuation Model for Mortgage-Backed Securities (MBS), Kariya et al. 2002.*
Pricing Mortgage-Backed Securities (MBS) A Model Describing the Burnout Effect), Kariya et al. 2000.*
On Stochastic models of Interest Rate with Jumps, Lin, 1999.*
Portfolio Value-at-Risk With Heavy-Tailed Risk Factors, Glasserman et al. 2002.*
The Interest Rate Risk of Fannie Mae and Freddie Mac, Jaffee, Journal of Financial Services Research (24) 1, 5-29, 2003.*
Efficient Sensitivity Analysis of Mortgage Backed Securities, Chen and Fu, Dec. 2001.*
An Option-Theoretic Prepayment Model for Mortgages and Mortgage-Backed Securities,Kalotay, Deng, and Fabozzi , Mar. 2004.*
Path Generation for Quasi-Monte Carlo Simulation of Mortgage-Backed Securites Akesson et al. 2000.*
Importance Sampling in the Heath-Jarrow-Morton Framework, Glasserman, P.,Heidelberger, P.,Shahbudin, P., 1999.*
An Intensity-Based Approach for Valuation of Mortgage Contracts Subject to Prepayment Risk, Goncharov, Y. 2002.*
Simulation-basd Pricng of Mortgage-Backed Securities, Chen, J., Winter 2004.*
Vol-Bond: an analytical solution Baviera, R., Apr. 2003.*
Simulating American Bond Options inan HJM Framework, Carr, P., Yang, G., 1996.*
Commercial Mortgage Backed Securities (CMBS) and Market Efficiency with respect to Costly Information Christopoulos, A, Jarrow, R., Yilditim, Y. Sep. 2007.*
Mortgage Default and Low Downpayment Loans: The Cost of Public Subsidy, Deng, Y., Quigley, J.M., VanOrder, R. 1995.*
Faster Valuation of Financial Derivatives, Paskov, S.H., Traub, J., 1995.*
Monte Carlo methods for security pricing, Boyle, P., Broadie, M., Glasserman, p. 1997.*
Interest Rate Models, Chapter 1, Cheyette, O.*
Rational Prepayments and the Valuation of Collateralized Mortgage Obligations, McConnell,J.J., Singh, M., 1994.*
Brigo, D. et al. Credit Default Swaps Calibration and Option Pricing with the SSRD Stochastic Intensity and Interest-Rate Model. Proc. 6th Columbia JAFEE Conference (2003): 563-585.
Rogers, L.C.G. Modelling Credit Risk. Working Paper, University of Bath (1999): 1-17.
Agca, S. The Performance of Alternative Interest Rate Risk Measures and Immunization Strategies under a Heath-Jarrow-Morton Framework. Dissertation, Virginia Polytechnic Institute and State University (2002): 1-224.
Chen, J. Three Essays on Mortgage Backed Securities: Hedging Interest Rate and Credit Risks. Dissertation, University of Maryland, Robert H. Smith School of Business (2003): 1-168.

* cited by examiner

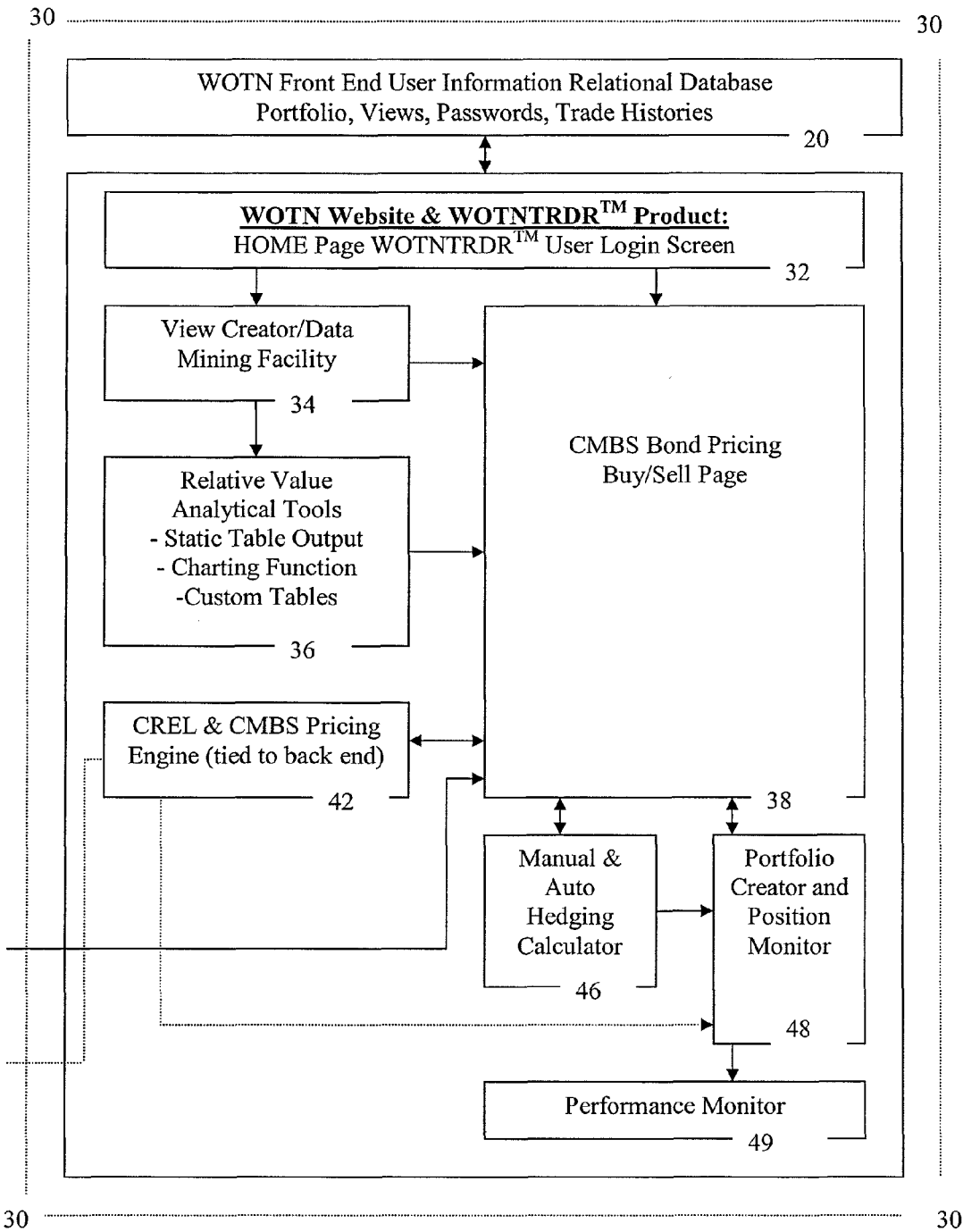
Fig. 5b GUI Interacted with by User

WOTNTRDR™

Views | Bonds | PerfMon | PortMon | Universe | TradeSim

Bonds/Tranches
Show
- ☑ Current Sub Level (%)
  MinValue: 1    MaxValue: 50
- ☑ WOTN Rating
  Values: w1

Risk Measures/Characteristics
Show
- ☑ WAL
  MinValue: 2    MaxValue: 6.00

Spreads/Values
Show
- ☑ zv to market price
  MinValue: -2000    MaxValue: 2000
- ☑ oas to market price
  MinValue: -2000    MaxValue: 2000
- ☑ zv to market price – oas to market price
  MinValue: -2000    MaxValue: 2000
- ☑ Yield
  MinValue: 1    MaxValue: 50
- ☑ Wotn Px – Trepp Px
  MinValue: -2000    MaxValue: 2000

[Save]  [Cancel]

Fig. 9

| | | | | | | | | | | | 192bonds found |
|---|---|---|---|---|---|---|---|---|---|---|---|
| Buy bond | Analysis | Trepp CMBS ID | Class | Current Sub Level (%) | WAL | WOTN Rating | zv to market price | oas to market price | zv to market price - oas to market price | Yield | Wotn Px - Trepp Px |
| Buy | Analysis | AMC98C1 | A-2 | 41.87 | 2.82 | w1 | 81.84 | 134.43 | (52.59) | 3.715 | 2.764 |
| Buy | Analysis | BOA001 | A-1A | 31.11 | 2.84 | w1 | 150.72 | 174.61 | (23.89) | 4.392 | 4.298 |
| Buy | Analysis | BOA001 | A-2A | 31.11 | 4.68 | w1 | 105.25 | 103.01 | 2.24 | 4.255 | 4.824 |
| Buy | Analysis | BOA001 | A-3B | 31.11 | 3.86 | w1 | 94.41 | 80.58 | 13.83 | 4.001 | 2.829 |
| Buy | Analysis | BOA002 | A-1 | 25.59 | 2.70 | w1 | 81.52 | 64.69 | 16.83 | 3.694 | 1.678 |
| Buy | Analysis | BOA002 | A-2 | 25.59 | 5.16 | w1 | 91.92 | 88.94 | 2.98 | 4.294 | 4.606 |
| Buy | Analysis | BOA011 | A1 | 22.44 | 3.25 | w1 | 110.72 | 235.16 | (124.44) | 4.106 | 4.359 |

| WOTN Hedge Info | | | |
|---|---|---|---|
| O.A. Wal | 3.97 | WOTN dyn. Int Tsy Yld | 4.602 |
| Eff. Dur. | 0.00 | WOTN dyn. Int Swap | 79.40 |
| O.A. Eff. Dur. | 0.00 | WOTN dyn. Yield | 6.188 |
| Convexity | 0.00 | WOTN dyn. Spd to Tsy | 158.61 |
| | | WOTN dyn. Spd to Swp. | 79.21 |
| ZV | 119.48 | Dynamic ZV | 119.48 |
| OAS | 118.80 | Dynamic OAS | 118.80 |
| Difference | 0.68 | Dynamic Difference | 0.68 |

Equilibrium Table

| v. Swps | v. Tsys | Yld(%) | ZV | OAS | ZV-OAS |
|---|---|---|---|---|---|
| 60.80 | 145.63 | 6.172 | 123.51 | 118.80 | 4.71 |
| 59.80 | 144.63 | 6.162 | 122.57 | 118.80 | 3.77 |
| 58.80 | 143.63 | 6.152 | 121.63 | 118.80 | 2.83 |
| 57.80 | 142.63 | 6.142 | 120.68 | 118.80 | 1.88 |
| 56.80 | 141.63 | 6.132 | 119.74 | 118.80 | 0.94 |
| 55.80 | 140.63 | 6.122 | 118.80 | 118.80 | 0.00 |
| 54.80 | 139.63 | 6.112 | 117.86 | 118.80 | -0.94 |
| 53.80 | 138.63 | 6.102 | 116.92 | 118.80 | -1.88 |
| 52.80 | 137.63 | 6.092 | 115.97 | 118.80 | -2.83 |
| 51.80 | 136.63 | 6.082 | 115.03 | 118.80 | -3.77 |
| 50.80 | 135.63 | 6.072 | 114.09 | 118.80 | -4.71 |

10 Yr Equiv. Exposure % & $mm in Hedge Equiv.

| | Market | | WOTN | |
|---|---|---|---|---|
| | lower | upper | lower | upper |
| Tsys | 16.97%/0.00 | 83.03%/0.00 | 34.42%/0.00 | 65.58%/0.00 |
| Swaps | 16.97%/0.00 | 83.03%/0.00 | 34.42%/0.00 | 65.58%/0.00 |

Calculate price    Add to portfolio  first

Fig. 22a

Selected portfolio:yourfirstportfolio

7/2/2001 10:28:08 PM

CMBS

| buy/sell | bond | coupon | spd v swaps | spread v tsys | price | rating | modDur | wal |
|---|---|---|---|---|---|---|---|---|
| 20 | CHASE982 A1 | 6.025 | ◉ 47.6300 | ○ 125.0000 | 100.66 | w1 | 3.2114 | 3.77 |

TREASURY HEDGES

| amount | issue | coupon | yield | price | modDur | tenor |
|---|---|---|---|---|---|---|
| Buy/Sell | issue 2004n8 ▾ | | yield 4.172 | Add Tsy Hedge | | |

SWAP HEDGES

| amount | issue | coupon | spread | modDur | tenor |
|---|---|---|---|---|---|
| Buy/Sell | issue 2004n8 ▾ | | spread 59 | Add Swap Hedge | |

Complete Trade

Bond Name [CMBS1A1] ▾ [All] ▾ [Buy] [Analysis]

WOTNTRDR

| 1sy | 2yr | 4.172 | 5y |
| Swap 2yr | 59.00 | | 5y |
| | | 2001 July 02 | |

Deal Ranking 1 2 3 4 5 6

| TREPP ID | Deal Bal. ($) | Run Date | Date of Securitization | Total Deals | Deal Rank | %ile Rank | E[DealLoss](%) | Deal ProbDef(%) | # of Loans | Av |
|---|---|---|---|---|---|---|---|---|---|---|
| 1301AOA | 436,894,962.00 | 20010702 | 20000824 | 134 | 1 | 99.25 | 0.00 | 0.00 | 7 | |
| BOA011 | 947,385,887.41 | 20010702 | 20010628 | 134 | 2 | 98.51 | 0.00 | 0.00 | 185 | |
| CHASE245 | 500,000,000.00 | 20010702 | 20010313 | 134 | 3 | 97.76 | 0.00 | 0.00 | 7 | |
| FB01CF2 | 1,125,703,337.16 | 20010702 | 20010430 | 134 | 4 | 97.01 | 0.00 | 0.00 | 182 | |
| FB01CK3 | 1,126,127,615.94 | 20010702 | 20010625 | 134 | 5 | 96.27 | 0.00 | 0.00 | 169 | |
| FUNB01C2 | 1,000,696,427.81 | 20010702 | 20010611 | 134 | 6 | 95.52 | 0.00 | 0.00 | 107 | |
| GS01ROCK | 1,210,000,000.00 | 20010702 | 20010607 | 134 | 7 | 94.78 | 0.00 | 0.00 | 1 | |
| GS98GL2 | 1,323,322,981.00 | 20010702 | 19980521 | 134 | 8 | 94.03 | 5.66 | 5.99 | 11 | |
| PGMT01XL | 354,076,608.00 | 20010702 | 20010501 | 134 | 9 | 93.28 | 5.75 | 6.20 | 1 | |
| NM97MD7 | 458,922,976.00 | 20010702 | 19970327 | 134 | 10 | 92.54 | 5.85 | 5.88 | 7 | |
| MS98XL1 | 886,759,712.00 | 20010702 | 19980611 | 134 | 11 | 91.79 | 5.98 | 6.35 | 11 | |
| MS98XL2 | 700,276,228.00 | 20010702 | 19981015 | 134 | 12 | 91.04 | 6.29 | 6.90 | 7 | |
| CHASE962 | 234,755,472.34 | 20010702 | 19961218 | 134 | 13 | 90.30 | 7.15 | 7.32 | 96 | |
| MSXL280 | 268,813,216.00 | 20010702 | 20010207 | 134 | 14 | 89.55 | 7.99 | 8.60 | 1 | |
| MS97XL1 | 726,371,694.00 | 20010702 | 19971017 | 134 | 15 | 88.81 | 8.98 | 9.17 | 12 | |
| CHASE981 | 766,078,149.00 | 20010702 | 19980515 | 134 | 16 | 88.06 | 9.38 | 10.06 | 78 | |
| VFC00VNO | 494,117,956.00 | 20010702 | 20000301 | 134 | 17 | 87.31 | 9.66 | 10.45 | 7 | |
| PRUHTGC1 | 242,615,232.00 | 20010702 | 20001130 | 134 | 18 | 86.57 | 10.68 | 11.60 | 1 | |
| MS98HF1 | 1,185,235,248.06 | 20010702 | 19980327 | 134 | 19 | 85.82 | 10.93 | 11.47 | 351 | |
| COMM991 | 1,276,521,268.66 | 20010702 | 19990316 | 134 | 20 | 85.07 | 11.00 | 11.66 | 221 | |
| CHASE001 | 690,391,953.75 | 20010702 | 20000327 | 134 | 21 | 84.33 | 11.03 | 22.83 | 91 | |
| NLF992 | 1,007,845,947.63 | 20010702 | 19991123 | 134 | 22 | 83.58 | 11.16 | 11.61 | 330 | |
| MCF98MC1 | 1,242,995,009.50 | 20010702 | 19980506 | 134 | 23 | 82.84 | 11.24 | 11.63 | 249 | |
| MS99LIFE | 583,945,005.00 | 20010702 | 19990810 | 134 | 24 | 82.09 | 12.35 | 13.25 | 97 | |
| MS99WF1 | 929,686,704.69 | 20010702 | 19990225 | 134 | 25 | 81.34 | 12.42 | 13.40 | 267 | |

| Id | Name | | | | | | | | | | | |
|---|---|---|---|---|---|---|---|---|---|---|---|---|
| 30223213 | Bainbridge Market Place | | | | | | | | | | | |

Status | Relative | Chart | Basel Loan | Create Shadow | Deal Override

Type: Default | Time: 108 | Amount: 100 | Loss Sev: 36 | Mos. to Recover: 12 | Data not Saved

| Loan ID | Loan Name | O.Term | R.Term | Age | DLQ | LTV | DSCRx | Cpn(%) | C.Loan Bal. | P.Type | P.Def(%) | Mos to Recover | WOTN LTD | WOTN LGD | Override | | | |
|---|---|---|---|---|---|---|---|---|---|---|---|---|---|---|---|---|---|---|
| 30223200 | Corporate Pointe II | 120 | 55 | 65 | B | 70.70 | 0.00 | 6.9 | 6,020,020.00 | OF | 0.020 | | 112.88 | 21.00 | Sim | 0 | 0 | 0 | 0 |
| 30223201 | Mansfield Plaza | 120 | 64 | 56 | B | 59.84 | 0.00 | 7.76 | 8,111,803.00 | RT | 0.040 | | 87.27 | 21.00 | Sim | 0 | 0 | 0 | 0 |
| 30223202 | Raintree Towne Shopping Center | 120 | 64 | 56 | B | 53.33 | 0.00 | 7.67 | 7,878,150.00 | RT | 0.010 | | 99.62 | 21.00 | Pre | 78 | 100 | 0 | 0 |
| 30223203 | Biltmore Suites Hotel | 120 | 65 | 55 | 3 | 68.24 | 0.00 | 8.973 | 3,975,361.00 | LO | 1.180 | | 85.73 | 21.00 | Pre | 100 | 100 | 0 | 0 |
| 30223204 | Imperial Courtyard Apartments | 120 | 0 | 120 | B | 74.48 | 0.00 | 8 | 0.00 | MF | 0.000 | | 120.00 | 21.00 | Sim | 0 | 0 | 0 | 0 |
| 30223205 | Huntersville Square S/C | 223 | 168 | 55 | B | 67.06 | 0.00 | 7.694 | 4,110,149.00 | RT | 0.500 | | 176.67 | 21.00 | Sim | 0 | 0 | 0 | 0 |
| 30223206 | Laurel Square Shopping Center | 120 | 63 | 57 | B | 79.33 | 0.00 | 7.553 | 3,825,232.00 | RT | 0.030 | | 92.23 | 21.00 | Sim | 0 | 0 | 0 | 0 |
| 30223207 | Town Center | 180 | 119 | 61 | B | 79.10 | 0.00 | 7.525 | 2,285,658.00 | RT | 0.260 | | 142.88 | 21.00 | Ext | 180 | 100 | 0 | 5 |
| 30223208 | Cox Communications Building | 120 | 64 | 56 | B | 79.08 | 0.00 | 8.11 | 11,764,230.00 | IN | 0.010 | | 96.15 | 21.00 | Sim | 0 | 0 | 0 | 0 |
| 30223209 | Cantrell Shopping Center | 113 | 55 | 58 | B | 76.75 | 0.00 | 7.35 | 1,990,056.00 | RT | 0.030 | | 80.92 | 21.00 | Def | 90 | 100 | 40 | 15 |
| 30223210 | Southside Shopping Center | 120 | 66 | 54 | B | 78.54 | 0.00 | 7.5 | 3,932,165.00 | RT | 0.060 | | 89.88 | 21.00 | Sim | 0 | 0 | 0 | 0 |
| 30223211 | Huffman Mill Plaza | 120 | 65 | 55 | B | 78.61 | 0.00 | 7.17 | 17,555,350.00 | RT | 0.020 | | 89.73 | 21.00 | Sim | 0 | 0 | 0 | 0 |
| 30223212 | Walnut Woods of Boyertown | 120 | 53 | 67 | B | 71.42 | 0.00 | 6.77 | 7,038,957.00 | HC | 0.320 | | 96.80 | 21.00 | Sim | 0 | 0 | 0 | 0 |
| 30223213 | Bainbridge Market Place | 180 | 126 | 54 | B | 77.62 | 0.00 | 7.25 | 3,250,295.00 | RT | 0.150 | | 142.17 | 21.00 | Sim | 0 | 0 | 0 | 0 |
| 30223214 | Hampshire Retirement | 120 | 53 | 67 | B | 71.79 | 0.00 | 6.77 | 6,407,256.00 | HC | 0.210 | | 97.37 | 21.00 | Sim | 0 | 0 | 0 | 0 |
| 30223215 | Venbury Trail Apartments | 180 | 115 | 65 | B | 60.16 | 0.00 | 6.96 | 2,447,528.00 | MF | 0.480 | | 138.05 | 21.00 | Sim | 0 | 0 | 0 | 0 |
| 30223216 | New Lake Hill Shopping Center | 120 | 55 | 65 | B | 70.61 | 0.00 | 7 | 3,390,624.00 | RT | 0.010 | | 66.62 | 21.00 | Sim | 0 | 0 | 0 | 0 |
| 30223217 | Hilton Garden Inn | 180 | 115 | 65 | B | 56.90 | 0.00 | 7.55 | 5,438,042.00 | LO | 1.570 | | 128.51 | 21.00 | Def | 83 | 100 | 60 | 8 |
| 30223218 | Power Properties 3 (Roll-Up) | 120 | 56 | 64 | B | 72.14 | 0.00 | 7.25 | 1,939,221.00 | MF | 0.020 | | 89.65 | 21.00 | Sim | 0 | 0 | 0 | 0 |
| 30223219 | Pelican Cove Apartments | 120 | 52 | 68 | B | 70.99 | 0.00 | 7.178 | 1,411,527.00 | MF | 0.040 | | 108.38 | 21.00 | Sim | 0 | 0 | 0 | 0 |
| 30223220 | Wayman Court Shopping Center | 120 | 52 | 68 | B | 72.89 | 0.00 | 7.25 | 3,336,009.00 | RT | 0.010 | | 108.38 | 21.00 | Sim | 0 | 0 | 0 | 0 |

Fig. 39 Fixed-Rate Prepayment Hazard Rate Estimation for Each Property X Region.

Fig. 40 Fixed-Rate Default Hazard Rate Estimation for Each Property X Region.

Fig. 41 Floating-Rate Prepayment Hazard Rate Estimation for Each Property X Region.

Fig. 42 Floating-Rate Default Hazard Rate Estimation for Each Property X Region.

STRUCTURED FINANCE SECURITIES OPTION PRICING ARCHITECTURE AND PROCESS

CROSS REFERENCE TO RELATED APPLICATIONS

This application is a continuation of U.S. application Ser. No. 12/649,707 filed Dec. 30, 2009 now abandoned and entitled STRUCTURED FINANCE SECURITIES OPTION PRICING ARCHITECTURE AND PROCESS, which in turn is a continuation of U.S. application Ser. No. 11/009,484 filed Dec. 10, 2004 now abandoned and entitled STRUCTURED FINANCE SECURITIES OPTION PRICING ARCHITECTURE AND PROCESS, which in turn claims priority of U.S. Provisional Application Ser. No. 60/528,938 filed Dec. 11, 2003, all of which are incorporated by reference herein in their entirety for all purposes.

BACKGROUND OF THE INVENTION

This invention relates generally to a method and systems for evaluating embedded options of structured-finance securities, and, more particularly, to the process of reducing theoretical financial engineering methods to computational instructions.

Commercial mortgage-backed securities (CMBS) are a subset of a class of financial securities known as asset-backed or structured-finance securities. CMBS are bonds of various seniorities, whose payments are made from the cash flows obtained from a CMBS trust. A CMBS trust is a legal entity that consists of a collection of loans secured by commercial real estate loans (CRELs) called the underlying loan pool. These CREL's are usually fixed-rate loans of a particular maturity, although they can include floating-rate loans as well. The properties securing these loans are usually diverse, both geographically and economically. Issued against the cash flows of the CMBS loan pool are a collection of bonds. These bonds are usually fixed-rate with a given maturity. Different classes of bonds are issued (called bond tranches) with different seniorities relating to the timing of the cash flows from the loan pool. The most senior bonds get the cash flows before the less senior bonds do, including any prepayment of principal. Principal repayment can occur due to voluntary prepayments or recoveries in the event of default. In reverse order to seniority, the least senior bonds lose their underlying principal first from defaults. In addition, most CMBS trusts issue a class of bonds called interest-only (IO) bonds, whose cash flows come solely from the interest payments to the loan pool, but only after all the senior bond coupons are paid. IO bonds receive no principal payments from the loan pool. The cashflow allocation from a typical CMBS capital structure can be found in FIG. 1.

The collateral for CMBS are mortgages secured by commercial (income producing) properties such as Multifamily, Hotel, Office, Retail & Industrial.

The majority of CMBS are bonds in a senior/subordinated sequential-pay structure. In a senior/subordinated sequential-pay structure the principal (prepays or scheduled amortization) and interest payments from the loan collateral in the trust flow sequentially from the top to the bottom of the capital structure beginning with the AAA class A-1 down thru to the Unrated Class J in accordance with the rules established for the deal.

As the principal amounts of each of the individual classes pay off (A1 Balance=$0), then the next bond in the sequence (from top to bottom) begins to receive principal payments, until it is paid down, etc., (A2 Balance=$0); Principal payments (including all prepayments); i.e., a top-down approach.

Principal losses are created by defaults in which the recoveries from the disposition of the securing property are of an amount insufficient to cover the outstanding balance on the mortgage. Such losses to the trust are allocated to the lowest rated class outstanding at the time of the loss in reverse, sequential payment (i.e., Class J gets losses until J Balance=$0, then. Class I gets losses until I Balance=$0, etc., i.e., a bottom-up approach.

Although the CMBS Universe contains a variety of transaction types, including Single Asset Transactions (1 loan) and large loan transactions (typically 5-15 loans), diversified conduit transactions are the most common type of CMBS transaction. A typical conduit transaction is structured using a CMBS trust that contains around 100 underlying loans (typically first liens), and issues about 10 different bond tranches, including an IO bond. There are over 650 CMBS trusts and, thus, over 6,500 CMBS constituting the CMBS universe trading over-the-counter across both fixed-rate and floating-rate collateral, including both US and foreign collateral. In addition to traditional CRELs discussed above, CMBS trusts often contain credit tenant leases (CTLs). CTLs are first liens that are guaranteed by either a rated corporate entity or a non-rated borrower who provides guarantor status through certain lease provisions (triple-net lease, double-net lease, etc. . . . ) Because rated CTLs benefit from a corporate guarantor, the likelihood of their default must be associated with the overall likelihood of default of the rated corporate guarantor and not based upon its CREL characteristics. In contrast, unrated CTLs are treated as traditional CRELs, because the non-rated borrower guarantor information is unavailable.

The CMBS sector is the most complex member of the structured finance product family, which, at $400 billion, represents about 10% of the entire $4.0 Trillion structured finance universe. Despite the size of this market, CMBS and CREL investors do not enjoy the benefits of financial engineering risk-management technology that is applied to more mature, but fundamentally less complex, securities such as Residential Mortgage-backed Securities ("RMBS").

The collateral underlying RMBS are mortgages secured by residential properties. In order to receive the payment guarantees of interest and principal from the government and quasi-government agencies, GNMA, FNMA, and FHLMC (together, the "Agencies"), such mortgages must satisfy the underwriting and pooling requirements established by the Agencies. These requirements relate primarily to size of mortgage, leverage amounts, coupon and geographic distribution, and servicing fees and rights and have been established to provide investment banking underwriters and professional investment managers with a level of comfort surrounding the homogeneity and transparency of the collateral securing RMBS. The majority (approximately 80%) of RMBS are secured by collateral satisfying the requirements established by the Agencies (the "Agency RMBS"); the remaining RMBS that do not satisfy the Agencies' requirements are referred to as Non-Conforming, Jumbo, or Whole-Loan RMBS (approximately 20%). Because residential mortgage borrowers may freely prepay their mortgages without economic penalty or restriction, and because the Agencies guarantee the payment of principal to bond holders, thereby eliminating the risk of losses of principal due to default, investors in RMBS are primarily concerned with prepayment risks and the timing uncertainties associated therewith. Addressing this single concern ultimately gave rise to the development and subsequent ubiquitous use of Option Adjusted Spread ("OAS") methodologies for this $2.0 trillion market segment. OAS provides investors with a single reliable measure to evaluate the impact of the underlying borrower's option to prepay a mortgage on the value of any Agency RMBS.

Prior to the introduction of OAS, the Public Securities Association ("PSA", but now the Bond Market Association, "BMA") attempted to address the RMBS investor's concern about the uncertainty of prepayments by requiring that every RMBS issuer price all Agency RMBS by using the "PSA Curve," shown in FIG. 2, to estimate prepayments on a given collateral pool. This PSA Curve is still used today to price RMBS at issuance and to report the monthly rate of prepayment (also known as prepayment speeds) to investors. The application of the PSA Curve is straightforward: At 100% of the PSA Curve, all loans within a pool are assumed to partially prepay in an amount equal to 0.2% (on an annualized basis) of their outstanding principal balance at the beginning of every month for the first 30 months and then are assumed to prepay at constant rate of 6% (on an annualized basis) for the remainder of the lives of each of the loans in the pool. Increases or decreases to the PSA Curve are linear so, for example at 200% of the PSA Curve, all loans are assumed to prepay at 0.4% for the first 30 months and then are assumed to prepay at constant rate of 12% for the remainder of the lives of each of the loans in the pool—for 50% the loans are assumed to prepay at 0.1% for the first 30 months and 3% for the remainder of the lives of each of the loans in the pool, and so forth.

The standard and required use of the PSA curve is an explicit acknowledgement that the principal payment schedules of collateral securing RMBS have embedded prepayment options whose strike prices are unknown. It should be noted that no such established PSA curve exists, or has ever existed, for either CMBS or CRELs to date.

As a single-path/static estimate of prepayments, the PSA curve was imprecise and limited as a bond valuation tool. As a result, this estimation rapidly gave way to the introduction and adoption of highly quantitative theory and sophisticated computer technology to derive better, multi-path, forward-looking measures of prepayment risk. Over the past twenty years, practitioners and theoreticians have implemented robust modeling procedures involving interest rate diffusion processes and simulation of random walks to be mapped against simulated cashflows of the underlying pools to quantify in a precise and repeatable way the risk of prepayment underlying RMBS using OAS Methods based on stochastic processes. Today, OAS risk measures are derived by several third-party research firms as well as all major investment banks in the United States. The following statement on OAS for RMBS by an expert in the field of mortgage-backed securities research, Dr. Lakhbir Hayre—Managing Director of Salomon Smith Barney's Mortgage Research Group (from his book Salomon Smith Barney Guide to Mortgage-Backed and Asset-Backed Securities), is worth noting:

> OAS methodology, while not perfect, does provide substantial insight for RMBS investors, which may result in improved security selection (buy/sell) and overall improvement in returns realized by professional portfolio managers . . . . In the relatively short time since its development, OAS analysis became an essential tool for MBS investors. Its widespread acceptance indicates that most investors are well aware of the optionality inherent in RMBS . . . OAS has been derived as an extension of the standard spread over treasuries (yield to maturity), to account for the dispersion and uncertainty associated with the return of principal from RMBS. Can it be realized as a return over treasuries? Theoretically, with dynamic hedging, the answer is yes . . . From a practical point of view, however, it is perhaps best to think of the OAS . . . as a useful measure of relative value . . . (V)arious studies have shown that, applied consistently over time, OASs can be good indicators of cheap or rich RMBS" (Hayre, Salomon Smith Barney Guide to Mortgage-Backed and Asset-Backed Securities, 2001, pp. 39-40)

One such study was conducted by Hayre for Salomon Brothers in the early days of OAS in the RMBS market. The study of RMBS spanned the period from 1985 to 1990 and compared the use of OAS methods to discern risk versus the traditional yield to maturity method. The use of OAS resulted in a 21% improvement in the frequency of positive returns over the yield to maturity method and an average periodic outperformance of 174 basis points (1.74%) on an annualized basis over the 5-year period of that study. In only 8% of the cases did yield to maturity provide better returns than OAS. Finally it is worth noting anecdotally that during the period of this study there were substantial increases in the issuance of RMBS, which can be partially attributed to increased confidence on the part of mortgage bankers in their ability to hedge their mortgage issuance pipeline risk of prepayment using OAS methods. This increased confidence in the ability to measure prepayment risk on a forward looking basis is widely regarded by experts in the literature as a significant catalyst for more favorable mortgage rates, which, in turn, reduced the prospective American homeowner's prospective mortgage payments, thereby increasing American home ownership by making it more affordable. The application of OAS to RMBS, therefore, was an important part of the rationalization of the lending market enabling mortgage bankers to hedge prepayment risk in the lending pipeline more efficiently, enabling them to lend at more competitive rates which, ultimately, significantly contributed to the creation of a more efficient housing market throughout the United States The structural complexity of CMBS and the heterogeneity of the CRELs underlying such CMBS have provided a significant barrier to the development of a robust financial theory that accurately addresses the substantial risks of prepayment and default on both the CRELs and CMBS. In a typical CMBS trust there are CRELs secured by different property types (multifamily, retail, hotel, industrial, and office, among others) in different geographic regions (Downtown NYC—Office, Houston, Tex.—Multifamily, Tempe Arizona—Hotels, etc) throughout the United States. Additionally, each of these loans has different amounts of leverage (as measured by the loan to value ratio ("LTV") at issuance—70%, 90%, etc.) and differing amount of income support for such leverage (as measured by the Ratio of the Commercial Real Estate ("CRE") property's net operating income to the annual mortgage payment on the CREL secured by such property—a.k.a. the debt service coverage ratio ("DSCR")—1.35×, 2.83×, etc.). Since the principal payments of CMBS and CRELs are generally not guaranteed by government agencies, these financial objects expose investors to both prepayment and credit risk. (One exception in CMBS is FNMA Designated Underwriter Servicer (FNMA-DUS) bonds which are backed 100% by first liens on multifamily properties. Like conforming RMBS, FNMA-DUS CMBS do carry the guarantees of interest and principal. FNMA-DUS constitute less than 10% of the CMBS market.) Thus, to value a CMBS bond accurately, one must first understand the cash flows to the underlying CMBS loan pools, the cash flow allocation rules to the various bond tranches, the prepayment restrictions/penalties, and the credit profile of the trust based on the underlying CRE collateral. The valuation of CMBS therefore must include a robust treatment of four significant risks-market, credit, prepayment and liquidity.

Prior to the development of the process of this invention, there existed significant intellectual barriers to understanding credit risk because this discipline has only become mature over the past few years; in addition, the significant financial barriers to the securing of computational hardware and software necessary to compute the voluminous number of paths needed to adequately simulate the risks of CRELs have impeded previous efforts to develop a model for the evaluation of the risks of CMBS and the underlying CRELs. Moreover, during the economic boom of the mid- to late-1990s, credit issues were not a major concern for many risk managers involved in CMBS; property prices were rising steadily from the levels that were depressed during the recession of the early 1990s, and the prospect of experiencing default on CRELs seemed, with good reason, remote. As a result, less than robust forms of risk-management evaluation proved satisfactory for the developing CMBS market. Today, the risk measurement technologies available to professional. CMBS investors remain effectively at the level of those available to RMBS investors in the early to mid-1980's: yield to maturity and spread to treasuries (and swaps) are used by market participants as the sole quantifiable and repeatable measures of risk and reward in conjunction with measures of tenor such as duration and weighted average life by market participants.

The economic downturn experienced since early 2000 has revealed weaknesses in the risk-management practices of many of the world's largest financial institutions in the areas of hedging and underwriting structured finance securities, especially with regard to CMBS and CRELs. The threat of actual default and the liquidity crisis and associated price volatility during October 1998 and September 2001 exposed weaknesses in banking and trading practices related to CREL and CMBS. The lack of adequate risk management tools in these times of stress exposed investors in CMBS and CRELs to substantial losses, even in the absence of actual defaults. Moreover, in response to trading, banking, and accounting losses incurred by financial institutions involved in the CMBS and CREL markets, the Basel Commission is considering imposing capital requirements in the Basel II Accord that will significantly restrict the levering, lending, and investment practices of major financial institutions in the area of CMBS and CRELs. Thus it has become clear that better risk management technology is necessary for CREL and CMBS markets to continue to function efficiently.

The closest attempt to derive any measure of risk of the collateral pool underlying CMBS resides with the public securities rating agencies (S&P, Moody's, and Fitch), However, the rating agencies only scientifically analyze the fundamental credit risk of CRELs underlying CMBS at issuance and make no claims regarding risks associated with the price volatility of CMBS in the secondary marketplace. Further, the rating agencies make no claim as to the prepayment exposure of CMBS investors. So, while rating agencies provide valuable ongoing monitoring of collateral pools and frequently upgrade and downgrade securities according to their internal rating system, the ratings and subordination levels generated by the rating agencies are inappropriate metrics of risk for professional investors, because they do not quantify the relative value of securities.

Since Dec. 11, 2003, several vendors (including the rating agencies) have made available to the market software that employs deterministic/forecasting models to impute the Probability of Default, Loss Given Default, Exposure at Default, and Maturity at Default of CRELs. Such deterministic/forecasting models do not provide non-deterministic theoretical and computationally robust methods to statistically derive the aforementioned values. Importantly, the deterministic models, which typically forecast net operating income volatility, are not statistically derived; so while Monte Carlo methods may be employed by such models to derive these values deterministically, such values are inconsistent with the actual default experience of CRELs. In addition, since such models do not include prepayment as a "competing" risk component in the hazard rate (to the extent a hazard rate model is used), they ignore a substantial empirical option risk embedded within CRELs. Furthermore, such models do not include the current delinquency status of loans that are known to contribute substantially to the probability of default estimates. Additionally, such models do not make an explicit provision to accommodate for the different treatment of rated CTLs. Finally, because non-traded instruments are used by such deterministic models in the determination of the above-mentioned values, such values cannot be used as the foundation for pricing the fair value of CMBS or for determining derivative risk measures for CMBS, such as its OAS without a risk-premium adjustment. This risk premium adjustment is nearly impossible to estimate and no one in portfolio theory has been able to accomplish such estimation for the past 30 years. Therefore, such deterministic models are limited in their use to industry and do not accomplish the application of OAS technology and risk-management practices to CMBS.

There is a vast literature related to prepayment modeling, OAS technology, and risk-management practices, and numerous collateral studies relating to both RMBS and CMBS. This literature discusses prepayment and OAS modeling techniques relating to the modeling of RMBS prepayment risks, which are substantially similar in theory to CMBS prepayment risks. With respect to CMBS, summary statistics on commercial mortgage defaults and loss severities from 1972-1997 have been provided and a default model for multifamily commercial mortgage has been studied. Competing risk hazard and prepayment models for CMBS have been estimated. None of these studies investigate valuation or hedging of CMBS. The valuation of a class of CMBS called "bullet" bonds has been studied and a structural model for CMBS valuation to determine such model's implications for tranche values has been simulated. However, those models have not been empirically tested. Despite all this literature and theoretical discussion, no empirically tested model for the evaluation of the risks of CMBS and CRELs has ever been published, and OAS technology still has not been adopted by the CMBS and CREL marketplace.

There is therefore a need to provide a process for introducing rational risk-management technology to participants in the CREL and CMBS markets to assist them in their risk management practices. There is a further need to establish continuity of affordable risk management technology to financial institutions investing in CRELs and CMBS, thereby elevating CMBS to the level of risk management practices enjoyed in the RMBS sector. Satisfying such needs may expand the audience of investors in CRELs and CMBS, by providing them with best practice risk management technology and thus enabling them to understand their risks better. As was the case in the residential mortgage market, satisfying such needs may bring greater efficiencies to the areas of lending, borrowing, and securities investing in United States CREL and CMBS markets.

SUMMARY OF THE INVENTION

A method and system for valuing structured-finance securities, such as, but not limited to, CMBS, is disclosed.

In one embodiment, the method of this invention includes the steps of obtaining data for a structured finance product, determining statistical cash flow information for the structured finance product, and determining a valuation for the structured finance product. (Valuation as used herein includes, but is not limited to, the fair value price and measures of risk, such as, but not limited to, Option Adjusted Spread, Zero Volatility/Static Spread, Delta, Gamma, Theta, Epsilon, Subordination Levels, the Risk Ratings, Probability of Default, Probability of Prepayment, Loss Given Default, Exposure at Default, and Maturity at Default.)

The user interface of this invention includes, in one embodiment, a structured collection of data including, but not limited to, criteria for viewing candidate structured finance products, a component capable of selecting criteria from the structured collection of data, another structured collection of data including, but not limited to, structured finance products satisfying the selected criteria, another component capable of selecting a portfolio of structured finance products from the structured finance products satisfying the selected criteria, further components capable of displaying valuation parameters for the portfolio of structured finance products, and means for enabling transactions for the portfolio of structured finance products.

The data in one embodiment of the database of this invention is presented in a data structure, where the data structure includes a number of data objects, stored in the memory, each data object comprising information from the database, where the data objects include a reliability class of data objects, each data object in the reliability class comprising a structured collection of finance products with substantially reliable data, a variability class comprising a static data object and a dynamic data object, the static data object comprising static finance product characteristics and the dynamic data object comprising variable finance product characteristics, a structured finance product data object comprising structured finance product financial characteristics and a source of the structured finance product financial characteristics, and a regional class of data objects comprising region objects of different precision and relationships between the region objects.

In one embodiment, the system of this invention includes one or more processors, a computer readable medium including a data structure, where the data structure includes information resident in a database of structured finance product data, and one or more other computer readable media having computer executable code embodied therein, the computer executable code being capable of causing the one or more processors to implement the methods of this invention. In one aspect of this invention, the computer executable code implements the user interface of this invention for display on one or more display devices.

For a better understanding of the present invention, together with other and further needs thereof, reference is made to the accompanying drawings and detailed description and its scope will be pointed out in the appended claims.

BRIEF DESCRIPTION OF THE SEVERAL VIEWS OF THE DRAWING

FIGS. 5a and 5b are schematic block diagram representations of an embodiment of the front-end processes in the method of this invention;

FIGS. 6-31 depict various views of an embodiment of the graphical user interface of this invention;

DETAILED DESCRIPTION

Figure 1:
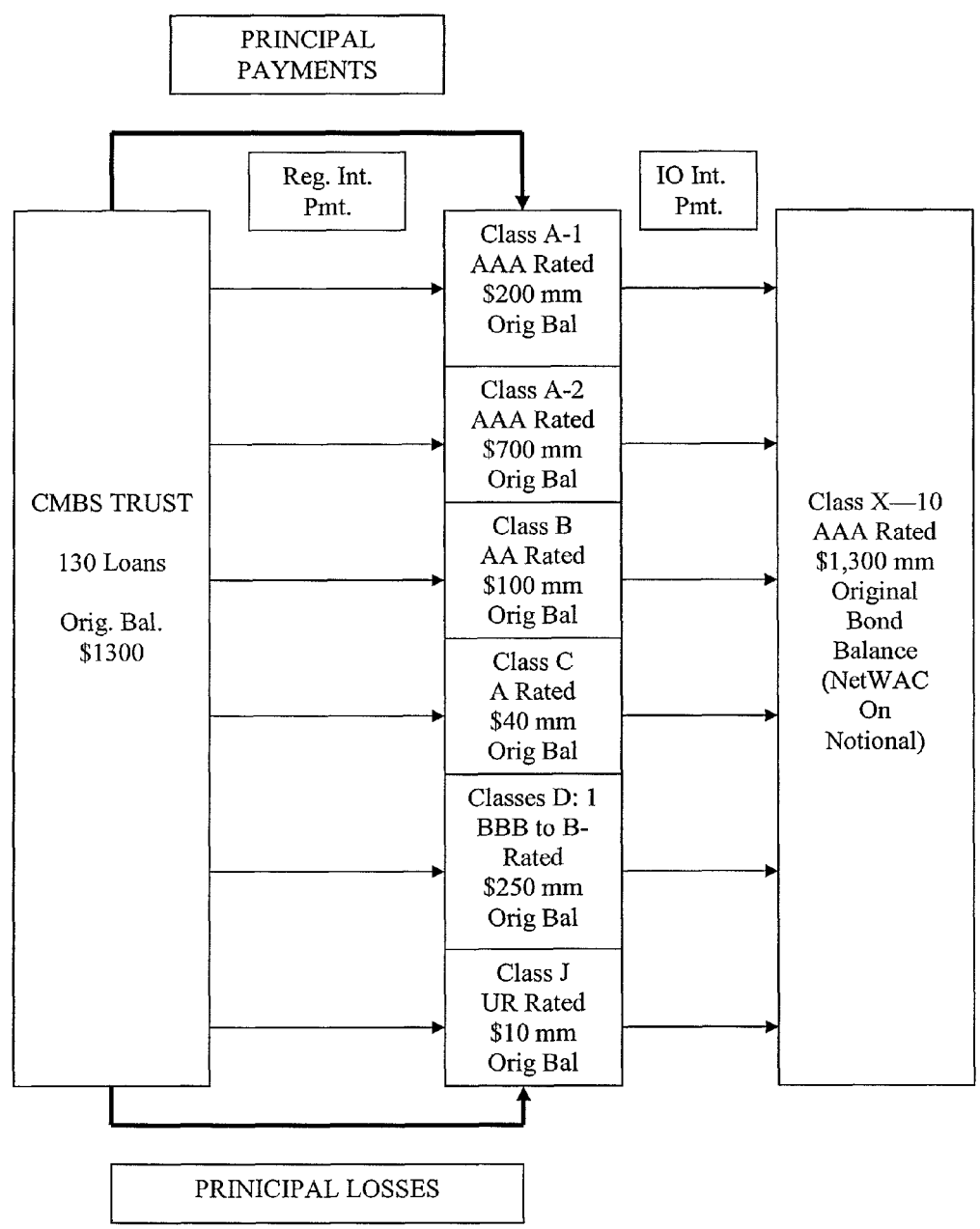
FIG. 1 is a schematic block diagram representation of a conventional CMBS structure.
Figure 2:
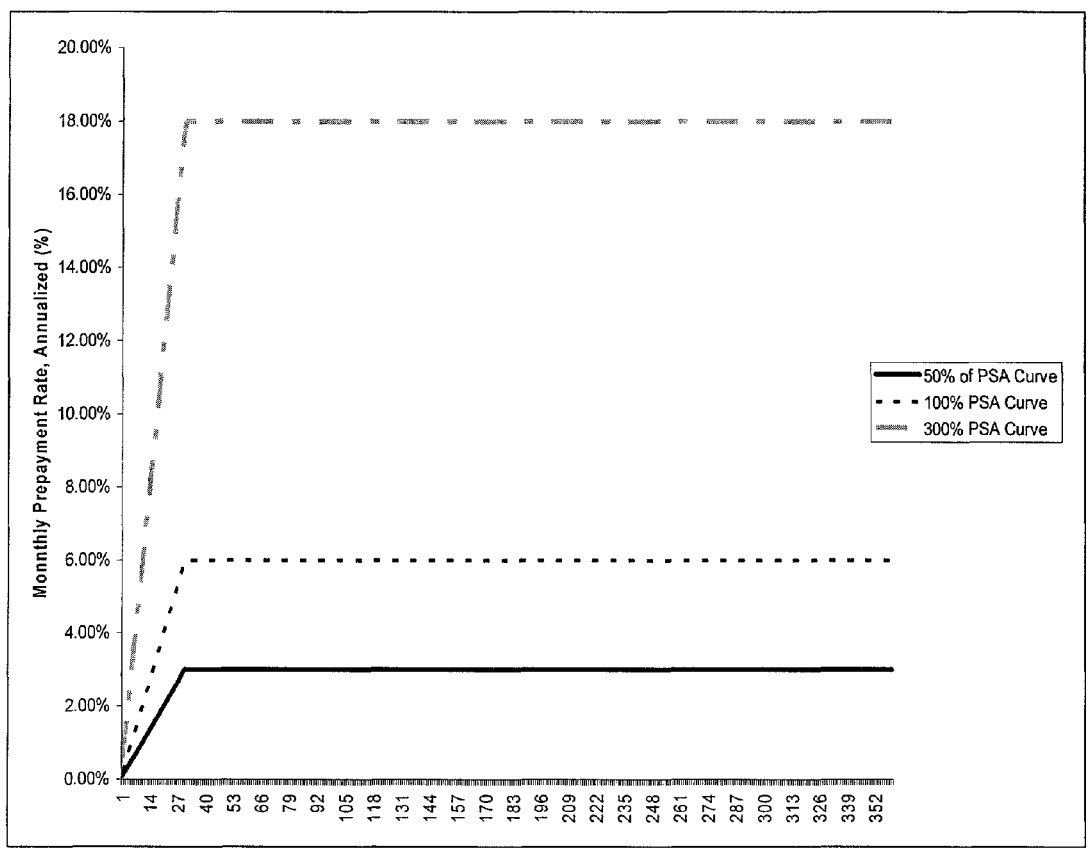
FIG. 2 depicts a schematic graphical representation of a conventional PSA curve.
Figure 3:
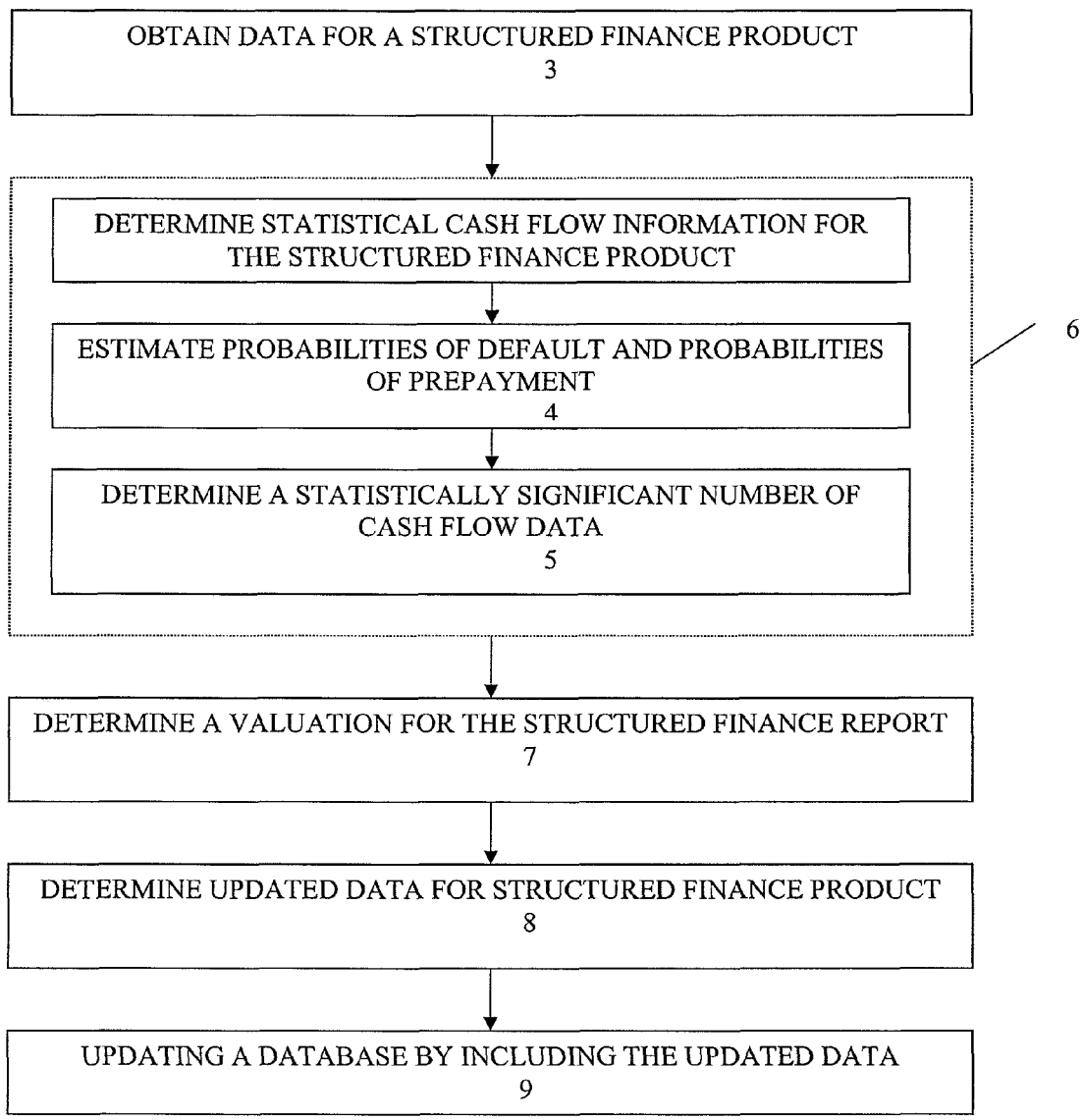
FIG. 3 is a schematic flow chart representation of an embodiment of the method of this invention.

A flowchart representation of one embodiment of the method of this invention is shown in FIG. 3. Referring to FIG. 3, data for a structured finance product is obtained from a database (step 3, FIG. 3). Statistical cash flow information for the structured finance product is determined utilizing the data (step 6, FIG. 3). In one embodiment, the step of obtaining the statistical cash flow information includes the steps of estimating, from the structured finance product data, probabilities of default and probabilities of prepayment (step 4, FIG. 3) and the step of determining a statistically significant number of cash flow data (step 5, FIG. 3). A valuation for the structured finance product is then determined (step 7, FIG. 3). (Valuation as used herein includes, but is not limited to, the fair value price and measures of risk, such as, but not limited to, Option Adjusted Spread, Zero Volatility/Static Spread, Delta, Gamma, Theta, Epsilon, Subordination Levels, the Risk Ratings, Probability of Delimit, Probability of Prepayment, Loss Given Default, Exposure at Default, and Maturity at Default.) The embodiment shown in FIG. 3 also includes the steps of determining, utilizing the statistical cash flow information and the valuation, updated data for structured finance product (step 8, FIG. 3), and updating the database by including the updated data (step 9, FIG. 3).

A more detailed description of the embodiment of FIG. 3 is given hereinbelow. In the embodiment of FIG. 3, the process of this invention reduces theoretical financial engineering methods to computational instructions that, using traditional simulation and parallel processing computational techniques, derive values of the options embedded within structured finance products, where such values are appropriate to the management of risk by investment professionals. The embodiment of FIG. 3:

(a) Utilizes a previously populated relational database of this invention (the "Structured Finance Product Database") with historical and current market and loan information (the "Generic Structured Finance Data" of step 3, FIG. 3). Such Generic Structured Finance Data generally relates to loan information, including, but not limited to, loan-to-value ratios, debt-service coverage ratios, loan coupon, loan maturity date, loan amount, property location, borrower location, loan amortization schedule, historical defaults and historical losses, historical prepayments, historical treasury rates and historical swap rates, property value indices, borrower credit risk scores, bond and deal structural information, and historical bond prices;

(b) Estimates statistical probabilities of default and prepayment (step 4, FIG. 3) on underlying loans that have been sold into trusts and that serve as collateral for the associated structured finance notes in the Structured Finance Product Database (also referred to as the "Structured Finance Product Estimates") using the Generic Structured Finance Data and the implementation of a statistical theory of this invention relating to a competing risk hazard rate estimation procedure developed to derive the Structured Finance Product Estimates (also referred to as the "Structured Finance Product Statistical Theory"), where certain aspects of the Structured Finance Product Statistical Theory are reduced to objects and/or code (including, but not limited to, loan value by regional value matrices) that are necessary components of the computational instructions for the simulations (referred to as the "Implemented Structured Finance Product Statistical Objects"). The implementation of the Structured Finance Product Statistical. Theory is conducted by a generic loan cashflow generation and pricing engine (referred to as the "Generic Structured Finance Product Engine");

(c) Embeds key components and elements of the Structured Finance Product Estimates and the Implemented Structured Finance Product Statistical Objects into a repeatable set of computational instructions that are applied to each loan within the Structured Finance Product Database (referred to as the "Structured Finance Product Path Rules") using the Generic Structured Finance Product Engine;

(d) Uses the Structured Finance Product Path Rules to calculate with the Generic Structured Finance Product Engine a statistically significant number of cash flow data (step 5, FIG. 3) for each loan within the Structured Finance Product Database, such that the standard error from the mean of the distribution of such cash flows is small, (referred to as the "Statistically Significant Structured Finance Product Cash Flows");

(e) Generates an identical number of corresponding simulated interest rate and loan value paths (referred to as the "Structured Finance Product Paths") using well-documented and generally accepted rules for generating such Structured Finance Product Paths (referred to as the "Generic Structured Finance Product Simulation Paths") in order to simulate an econometric state of the world congruent with the Structured Finance Product Path Rules and the Statistically Significant Structured Finance Product Cash Flows;

(f) Implements the finance theory of this invention (referred to as the "Structured Finance Product Finance Theory") that is used to derive fair values (step 7, FIG. 3) for each of the structured finance products contained within the Structured Finance Product Database (referred to as the "Structured Finance Product Fair Values"), where certain aspects of the Structured Finance Product Finance Theory are reduced to objects and/or code which are incorporated into the computational instructions for the accurate aggregation of the products of the Generic Structured Finance Product Simulation Paths and the Statistically Significant Structured Finance Product Cash Flows;

(g) Aggregates the Generic Structured Finance Product Simulation Paths and the Statistically Significant Structured Finance Product Cash Flows for each of the loans contained within the Structured Finance Product Database using the Generic Structured Finance Product Engine and sets of instructions that fully incorporate the Structured Finance Product Finance Theory in a repeatable way and (using, in one embodiment, standard parallel processing and clustered queuing techniques across multiple microprocessors) calculates the information related to the structured finance product (referred to as the "Structured Finance Product Information") (step 8, FIG. 3);

(h) Repopulates the Structured Finance Product Database with the Structured Finance Product Information (step 9, FIG. 3).

Figure 4:
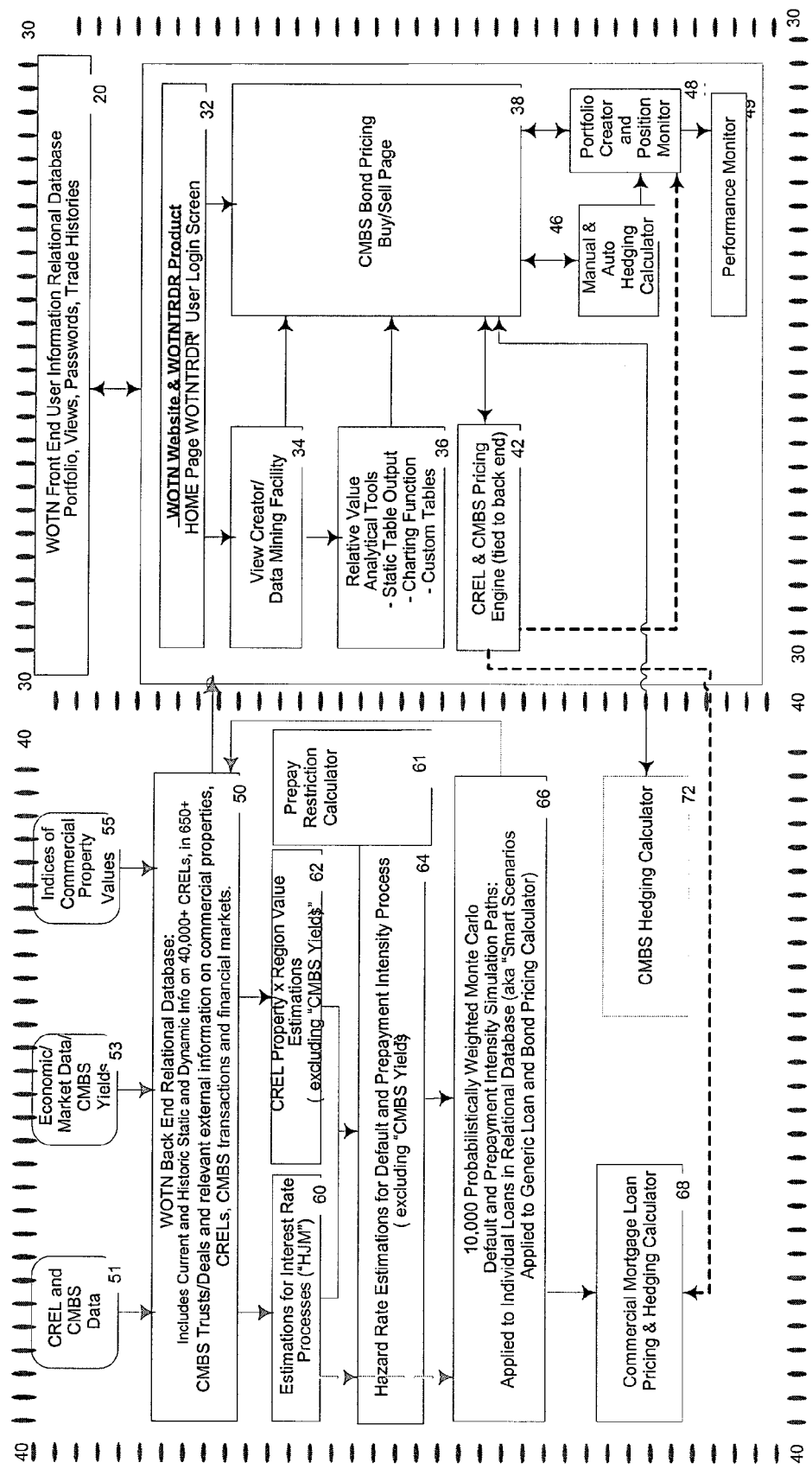
FIG. 4 is a schematic block diagram representation of an embodiment of the method of this invention.

A detailed embodiment of the method of this invention is shown in FIG. 4. FIG. 4 shows a block diagram of an embodiment 10 of the system of this invention. Referring to FIG. 4, a front-end relational database 20 is accessible from a front-end structure 30. The front-end structure 30 includes a graphical user interface (GUI) 32, a view creator component 34, an analytical tools component 36, a bond pricing buy/sell component 38, a pricing component 42, a manual or automatic edging calculator 46, a portfolio creating component 48, and a performance monitor 49. The front-end structure 30 communicates with a back-end structure 40 through interfaces provided by the pricing component 42 and the buy/sell component 38. The back-end structure 40 includes a back-end relational database 50, an interest rate risk calculator 60, a prepayment restriction calculator 61, an estimator 62, a default and prepayment (credit) risk calculator 64, a simulator 66, a loan pricing and hedging calculator 68, and a structured finance product hedging calculator 72.

Figure 5A:
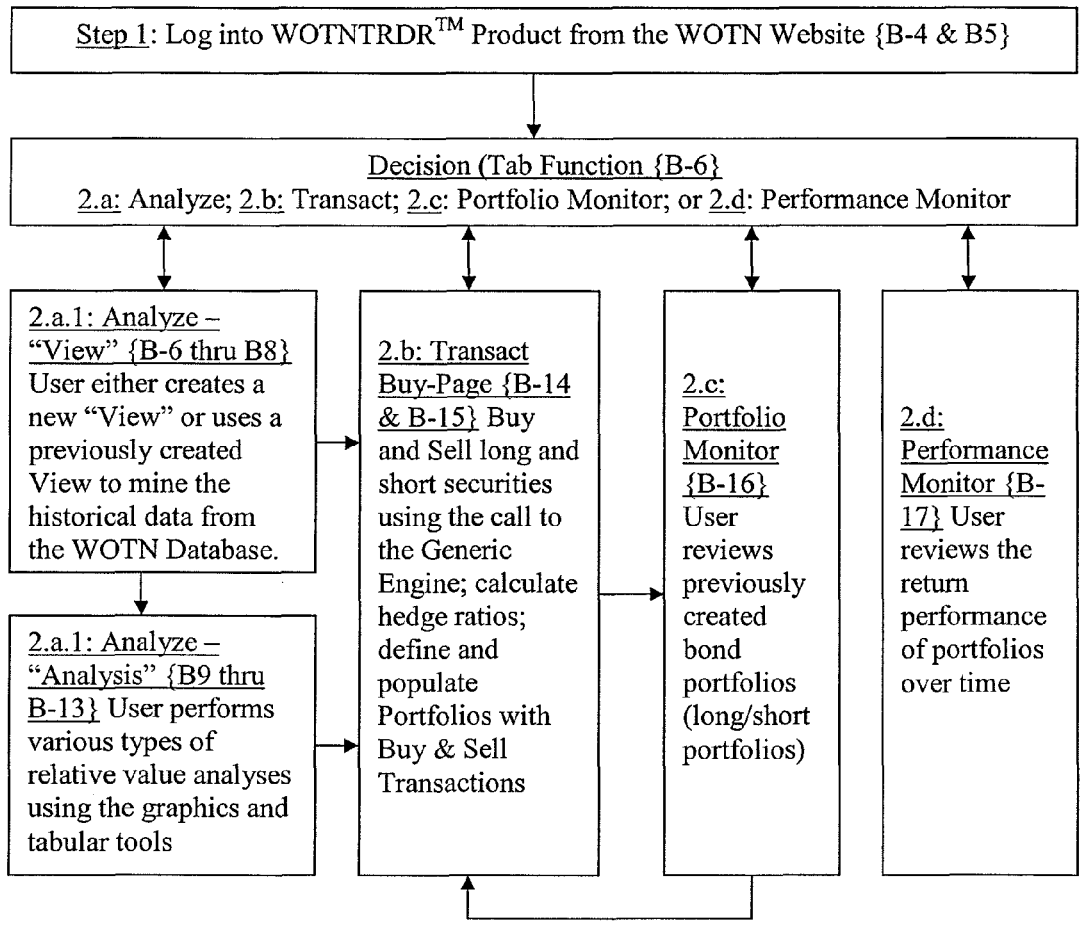

FIGS. 5a and 5b show a flow chart of the operation of the front-end structure. Referring to FIGS. 5a and 5b, a user accesses the GUI (82, FIG. 5b). From a menu (a menu as used herein refers to any GM structure allowing the user to select from a variety of options) the user selects the function to be performed (step 2) from one of the following options: analyzed/view, analyze/analysis, buy/sell, portfolio monitor, and Performance Monitor. Each of the options provides a different view and further options to the user. The user interaction with a GUI will be described herein below.

In order to better illustrate the method of this invention, a detailed discussion of the embodiment of FIG. 4 is presented hereinbelow. Including the aspects specific to CMBS.

The method of this invention as specifically related to CMBS and CRELs, derives fair values for CMBS and CRELs independent of observed market prices of the CMBS and CRELs (the "Fair Values"), as well as other measures of risk associated with CMBS and CRELs, including, but not limited to, Option Adjusted Spread, Zero Volatility/Static Spread, Delta, Gamma, Theta, Epsilon, Subordination Levels of this invention, the Risk Ratings of this invention, Probability of Default, Probability of Prepayment, Loss Given Default, Exposure at Default, and Maturity at Default (the "Other Risk Measures", each of which is defined in Quick Definitions below) that utilize both market prices and the Fair Values in their derivation. The Fair Values and the Other Risk Measures (together the "Information") are the result of the successful application of the process of this invention to CMBS and CRELs.

In the embodiment relating to CRELs and CMBS, the method of this invention:

(a) Populates a database of this invention (the "Database") with historical and current market information and loan information (the "Generic Data"). Such Generic Data generally relates to loan information, including, but not limited to, Loan to Value ratios, debt service coverage ratios, loan coupon, loan maturity date, loan amount, property location, loan amortization schedule, historical defaults and historical losses, historical prepayments, historical treasury rates and historical swap rates, property value indices, bond and deal structural information, and historical bond prices;

(b) Estimates statistical probabilities of default and prepayment on CRELs and CRELs underlying the CMBS in the Database (the "Estimates") using the Generic Data and the implementation of a statistical theory of this invention relating to a competing risk hazard rate estimation procedure of this invention to derive the Estimates (the "Statistical Theory"), where certain aspects of the Statistical Theory are reduced to objects and/or code (including, but not limited to, property value by regional value matrices) that are necessary components of the computational instructions for the simulations (the "Implemented Statistical Objects"). The implementation of the Statistical Theory is conducted by a generic CREL and CMBS cashflow generation and pricing engine (the "Generic Engine");

(c) Embeds key components and elements of the Estimates and the Implemented Statistical Objects into a repeatable set of computational instructions that are applied to each CREL and CMBS within the Database (the "Path Rules") using the Generic Engine;

(d) Uses the Path Rules to calculate with the Generic Engine a statistically significant number of cash flows for each CREL and CMBS contained within the Database, such that the standard error from the mean of the distribution of such cash flows is small, (the "Statistically Significant Cash Flows");

(e) Generates an identical number of corresponding simulated interest rate and commercial real estate property value paths (the "Paths") using well-documented and generally accepted rules for generating such Paths (the "Generic Simulation Paths") in order to simulate an econometric state of the world congruent with the Path Rules and the Statistically Significant Cash Flows;

(f) Implements the finance theory of this invention that is used to derive the Fair Values (the "Finance Theory"), where certain aspects of the Finance Theory are reduced to objects and/or code which are incorporated into the computational instructions for the accurate aggregation of the products of the Generic Simulation Paths and the Statistically Significant Cash Flows;

(g) Aggregates the Generic Simulation Paths and the Statistically Significant Cash Flows for each of the CRELs and CMBS contained within the Database using the Generic Engine and sets of instructions that fully incorporate the Finance Theory in a repeatable way using standard parallel processing and clustered queuing techniques across multiple microprocessors to calculate the Information of this invention;

(h) Repopulates the Database with the Information of this invention.

In the detailed embodiment specific to CMBS, a model of this invention for pricing and hedging CMBS and CRELs is developed, implemented, and tested. The process of this invention successfully models four risks: interest rate, credit, prepayment, and liquidity. In total, the process of this invention incorporates sixty-five (65) correlated factors to generate accurately the randomness present in CMBS cash flows. Monte Carlo simulation is used to value the securities. The parameters used in the model behind the process of this invention are estimated using a comprehensive CMBS database. An empirical comparison of model prices with market prices and the back-testing of trading strategies based on the model structure supports the validity of the methodology and implementation of the process of this invention.

The interest rate risk, in the method of this invention, is modeled using a multi-factor HJM (D. Heath, R. Jarrow, and A. Morton, 1992, "Bond Pricing and the Term Structure of Interest Rates: A New Methodology for Contingent Claims Valuation," Econometrica, 60, 77-105) model, Credit risk is modeled using the reduced form methodology introduced by Jarrow and Turnbull (R. Jarrow and S. Turnbull, 1992, "Credit Risk: Drawing the Analogy," Risk Magazine, 5 (9); R. Jarrow and S. Turnbull, 1995, "Pricing Derivatives on Financial Securities Subject to Credit Risk," Journal of Finance, 50 (1), 53-85). Because CMBS is valued from the market's perspective, an intensity process is used to incorporate prepayment risk with regional property value indices included as explanatory variables. Lastly, liquidity risk is incorporated into both the estimation of CMBS fair values and the testing of various trading strategies.

The CMBS model of this invention is fitted using daily forward rate curves, regional property value indices, REIT stock price indices, and historical commercial loan databases that include information on loan characteristics, historical defaults, prepayments, and recovery rates. Such information can be obtained from various sources, see Reilly and Golub (M. Reilly and B. Golub, "CMBS: Developing Risk Management for a New Asset Class," in Handbook of Commercial Mortgage Backed Securities, Fabozzi, 2000, Chapter 10, 171-181.) and Trepp and Savitsky (R. Trepp and J. Savitsky, "An Investor's Framework for Modeling and Analyzing CM," in Handbook of Commercial Mortgage Backed Securities, Fabozzi, 2000, Chapter 5, 93-112) for a thorough treatment of specific sources. Standard procedures were used to parameterize the term structure model (see R. Jarrow, 2002, Modeling Fixed Income Securities and Interest Rate Options, 2nd edition, Stanford University Press: Palo Alto, Calif., pp. 302-322). A competing risk hazard rate procedure was used to fit both default and prepayment risk, consistent with the observation that the occurrence of default precludes prepayment, and conversely. A CMBS bond database was used for model validation and the back testing of various trading strategies based on model values.

In total, in one embodiment, the model of this invention includes, but is not limited to, sixty-five (65) correlated factors generating the randomness inherent in the CMBS loan pool cash flows. This represents four (4) interest rate factors and sixty-one (61) property value indices. In addition, each commercial mortgage loan has two independent random variables generating its default and prepayment risk. As such, the complexity of the modeling structure necessitates using Monte Carlo simulations for the computation of fair values. In one embodiment, the system of this invention utilizes cluster computing on PCs with parallel processing technology. For one embodiment of this invention, running the valuation software for a sample of three-hundred fifty (350) of the approximately six-hundred and fifty (650) outstanding CMBS trusts takes approximately seven and one-half (7.5) hours on sixteen (16) 4.0 GhZ clustered Intel Xeon dual micro-processors run at Intel Corporation's Remote Access Site.

In one embodiment, the database utilized by the method of this invention is a Microsoft SQL Server 2000 database ("MSFTSQL"), but the use of MSFTSQL is not necessary to this or any other embodiment. The scripts in the database of this invention that make calls to the Generic Engine can be, in one embodiment, written in C, SQL Scripting Language, and C# and are fully integrated with the GUI. There are over fifty (50) tables in the database of this invention with hundreds of millions of entries navigated across multiple relational joins. The information in the database of this invention is updated according to its maximum available frequency ranging from daily to quarterly depending on the data object. Some of the data specifically used in the method of this invention are as follows:

- CREL Loan Specific Information such as Financials (i.e. Loan Amount, LTV, DSCR, Coupon, etc.), Geographic (Address, City, State, MSA, etc.), prepayment restriction schedule (i.e. Locked out for the first sixty (60) months and then Yield Maintenance thereafter), Amortization Schedule, Balloon Dates, Trust/Deal Name, Fixed Rate or Floating Rate, Main Tenants, Occupancy (%), Square Footage, etc. . . .
- Historical defaults & historical losses
- Historical prepayments
- Cumulative Commercial Property Foreclosure Index
- Historical US Treasury rates & Interest Rate Swap Rates
- Market CMBS yields & prices
- Analytical Model for CMBS CMBS face market (interest rate), credit, prepayment, and liquidity risks. (There is often a fifth type of risk discussed with respect to CMBS called extension risk. Extension risk is discussed below.) In the initial formulation, in one embodiment, frictionless and competitive bond markets are assumed. Liquidity risk is addressed in the empirical implementation of that one embodiment. The description below concentrates on modeling the interest rate, credit, and prepayment risks inherent in CMBS. The interest rate risk is handled using a multi-factor Heath, Jarrow, Morton (D. Heath, R. Jarrow, and A. Morton, 1.992, "Bond Pricing and the Term Structure of Interest Rates: A New Methodology for Contingent Claims Valuation," Econometrica, 60, 77-105) model for the term-structure evolution. To model the credit risk component, the reduced form credit risk methodology first introduced by Jarrow and Turnbull (R. Jarrow and S. Turnbull, 1992, "Credit Risk: Drawing the Analogy," Risk Magazine, 5 (9); R. Jarrow and S. Turnbull, 1995, "Pricing Derivatives on Financial Securities Subject to Credit Risk," Journal of Finance, 50 (1), 53-85) is utilized. Lastly, prepayment risk is modeled using an intensity process. This is also done because from the market's perspective, prepayment often appears as a surprise. As with credit risk, this is due to asymmetric information with respect to the property's economic condition, transaction costs, and the borrower's personal situation (see R. Stanton, 1995, "Rational Prepayment and the Valuation of Mortgage-backed Securities," Review of Financial Studies, 8 (3), 677-708 for a justification of this approach for residential mortgages).

A filtered probability space $(\Omega, (F_t)_{t \in (0,T)}, P)$ satisfying the usual conditions (See P. Proffer, 1990, Stochastic Integration and Differential Equations: A New Approach, Springer-Verlag: New York, p. 3 for the definition of the usual conditions) with P the statistical probability measure is used. The trading interval is [0,T]. The objects traded are default free bonds of all maturities $T \in [0,T]$, with time t prices denoted p(t,T), and various properties, commercial mortgage loans, and CMBS bonds introduced below. The spot rate of interest at time t is denoted $r_t$. Let $(X_t)_{t \in [0,T]}$ represent a vector of state variables, adapted to the filtration, describing the relevant economic state of the economy. For example, the spot rate of interest could be included in this set of state variables.

The markets are assumed to be complete and arbitrage free so that there exists a unique equivalent martingale probability measure Q under which discounted prices are martingales. (The discount factor at time t is $$e^{\int_0^t r_s ds}.)$$

Since, in this embodiment, the problem of interest is the valuing of CMBS, most of the model formulation will be under the probability measure Q.

1. Commercial Real Estate Loans

Commercial Real Estate Loans (CRELs) are issued against commercial properties. These CRELs can be fixed-rate or floating. This discussion, although not a limitation of this invention, concentrates on fixed-rate loans. (Floating-rate notes can be handled in a similar fashion. The computer implementation, discussed below, handles these explicitly.)

These mortgage loans are issued to borrowers based on the quality (economic earning power) of the underlying property. If the property loses value, the borrower may decide to default on the loan. As such, CRELs face both market (interest rate) and credit risk.

A. Description:

Fixed-rate CRELs are similar to straight corporate bonds with the exception that the loan's principal is partly amortized over the life of the loan. Typical CRELs have a (T/n) balloon payment structure. In the (T/n) balloon payment structure, the loan has a fixed maturity date T, a principal F, payments P paid at equally spaced intervals over the life of the loan (usually monthly), and a coupon rate per payment period c=C/F where C is the dollar coupon payment. The payments P are determined as if the loan would be completely amortized in n periods. But, instead of lasting n periods, a balloon payment occurs at time T<n representing the remaining principal balance at that time, denoted $B_T$. It is shown in the appendix that the payment per period is $$P = cF \left[ \frac{(1+c)^n}{(1+c)^n - 1} \right]$$

and balloon payment is $$B_T = F(1+c)^T - P \left[ \frac{(1+c)^T - 1}{c} \right].$$

For analysis, one can think of CRELs as an ordinary coupon bond with a face value of $B_T$ and a "coupon" payment of P.

As common to residential mortgages, CRELs have an embedded prepayment option. Unlike residential mortgages, CRELs cannot be prepaid during a lockout period, denoted $[0,T_L]$. After the lockout period, the loan can be prepaid, but there is a time dependent prepayment penalty. These prepayment penalties can take various forms (see, for example, R. Trepp and J. Savitsky, "An Investor's Framework for Modeling and Analyzing CM," in Handbook of Commercial Mortgage Backed Securities, Fabozzi, 2000, Chapter 5, 93-112), and they are designed to make prepayment unattractive based on the changing level of interest rates, (For example, one type of prepayment penalty is that at the time of prepayment, the loan must be replaced by a collection of Treasury Strips that match the remaining payments P. These are referred to as defeasance loans.) Letting $B_t$ denote the remaining principal balance of the loan at time t, the prepayment penalty is represented as $B_t(1+Y_t)$ where $Y_t$ is the time t prepayment cost as a percentage of the remaining principal balance.

B. Valuation:

To value a CML (Commercial Mortgage Loan), a particular loan is fixed. Let $\tau_d$ be the random default time on this loan and denote its point process by $N_d(t) \equiv 1_{(\tau_d \leq t)}$. Following Lando (D. Lando, 1998, "On Cox Processes and Credit Risky Securities, Review of Derivatives Research, 2, 99-120), in one embodiment, it is assumed that the point process follows a Cox process with an intensity $\lambda_t = \lambda(t, X_t)$ under the martingale measure. (This intensity process and the other intensity processes introduced below are assumed to satisfy the necessary measurability and integrability conditions required to guarantee that the related expressions in expression (3) (below) are well-defined and exist, see D. Lando, 1998, "On Cox Processes and Credit Risky Securities, Review of Derivatives Research, 2, 99-120 for details.) The Cox process assumption implies that conditional upon the information set generated by $(X_t)_{t \in [0,T]}$ up to time T, $N_d(t)$ behaves like a Poisson process. If default occurs, the recovery on the loan is assumed to be $\delta \cdot (B_{\tau_d} + P)$. The trust receives $\delta$ percent of the remaining principal balance plus the (prorated) payment, (For notational simplicity, in one embodiment, it is assumed that the prorated portion of the loan payment is the entire payment P. However, in the subsequent valuation software, the exact prorated portion of the loan payment is computed.) The assumption of a constant recovery rate could be easily generalized. (The recovery rate could be a random process dependent on the state variables $X_t$. Unfortunately, in the database of this embodiment of this invention, the number of defaults with recovery rates is too small to allow for this extension.) However, given the available data on loan recoveries, these generalizations are not useful for the implementation of this one embodiment, but could be useful in another embodiment.

Under this intensity process, the probability that a default will occur on the loan's balloon payment date [T−dt,T] is approximately $\lambda(T, X_T)dt$. Allowing for default on the balloon payment date captures what is often called "extension risk" in the CMBS literature. Extension risk is the risk that, on the balloon payment date, the borrower will not be able (or willing) to make the balloon payment, but is able (or willing) to continue making the coupon and amortization payments P. The belief is that by extending the loan, the balloon payment will be made at a later date. The trustee of the CMBS trust decides whether or not to extend the loan and the conditions of the extension. (The balloon date could be extended (usually less than 3 years) and the underlying coupon rate may be increased.) If extension occurs, one can think of this situation as being equivalent to the occurrence of default, but the extension process is initiated to increase the recovery rate on the loan.

Let $\tau_p$ be the random prepayment time on this loan and denote its point process by $N_p(t) \equiv 1_{(\tau_p \leq t)}$. Again, let the prepayment point process be a Cox process with intensity $\eta_t = \eta(t, X_t)$ under the martingale measure. If the loan is prepaid, the trustee receives $B_{\tau_p}(1+Y_{\tau_p})$ dollars. For analytic convenience, in one embodiment, it is assumed that conditional upon the information set generated by $(X_t)_{t \in [0,T]}$ up to time T, both $N_d(t)$ and $N_p(t)$ are independent Poisson processes.

Given the previous notation, as viewed from time t, the cash flow to a CML at time T is $$\sum_{j=t+1}^{T} P 1_{\{j<\tau_d\}} 1_{\{j<\tau_p\}} e^{\int_j^T r_s ds} + (B_T + P) 1_{\{T<\tau_d\}} 1_{\{T<\tau_p\}} + \qquad (1)$$

$$\delta_{\tau_d}(B_{\tau_d} + P) 1_{\{\tau_d \leq T\}} 1_{\{\tau_d \leq \tau_p\}} e^{\int_{\tau_d}^T r_s ds} +$$

$$B_{\tau_p}(1 + Y_{\tau_p}) 1_{\{T_L < i\}} 1_{\{\tau_p < T\}} 1_{\{\tau_p < \tau_d\}} e^{\int_{\tau_p}^T r_s ds}.$$

The first two terms in expression (1) give the promised payments on the CML if there is no default and no prepayment. The third term gives the accumulated payment up to time T if a default occurs prior to a prepayment, and the fourth term gives the accumulated payment up to time T if a prepayment occurs prior to a default.

Given the martingale measure Q, the time t present value of these cash flows is $$E_t \left\{ \sum_{j=t+1}^{T} P 1_{\{j<\tau_d\}} 1_{\{j<\tau_p\}} e^{-\int_t^j r_s ds} + (B_T + P) 1_{\{T<\tau_d\}} 1_{\{T<\tau_p\}} e^{-\int_t^T r_s ds} + \right. \qquad (2)$$

$$\delta_{\tau_d}(B_{\tau_d} + P) 1_{\{\tau_d \leq T\}} 1_{\{\tau_d \leq \tau_p\}} e^{-\int_t^{\tau_d} r_s ds} +$$

$$\left. B_{\tau_p}(1 + Y_{\tau_p}) 1_{\{T_L < i\}} 1_{\{\tau_p < T\}} 1_{\{\tau_p < \tau_d\}} e^{-\int_t^{\tau_p} r_s ds} \right\}$$

where $E_t(\cdot)$ denotes expectation under the martingale measure. Under the Cox processes, standard techniques yield $$E_t \left\{ \sum_{j=t+1}^{T} P e^{-\int_t^j (r_s + \lambda_s + \eta_s) ds} + (B_T + P) e^{-\int_t^T (r_s + \lambda_s + \eta_s) ds} + \right. \qquad (3)$$

$$\int_t^T \delta_s (B_s + P) \lambda_s e^{-\int_t^T (r_s + \lambda_s) du} ds \cdot e^{-\int_t^T \eta_s ds} +$$

$$\int_t^T \int_t^k \delta_s (B_s + P) \lambda_s e^{-\int_t^s (r_s + \lambda_s) ds} ds \cdot \eta_k e^{-\int_t^k \eta_s ds} dk +$$

$$\int_t^T B_s (1 + Y_s) \eta_s e^{-\int_t^s (r_d + \eta_d) du} ds \cdot e^{-\int_t^T \lambda_s ds} +$$

$$\left. \int_t^T \int_t^k B_s (1 + Y_s) \eta_x e^{-\int_t^s (r_s + \eta_x) du} ds \cdot \lambda_k e^{-\int_t^k \lambda_s ds} dk \right\}.$$

This valuation expression is proved in below. For the implementation, the expectation in expression (3) is calculated using Monte Carlo simulation.

In another embodiment, the default and prepayment model also includes the delinquency status of a loan. Let $U_t$ be a vector of loan specific characteristics. There are four possible states of the loan (current c, delinquent l, defaulted d, and prepaid p). Both default and prepayment are absorbing states and current/delinquent are repeating states. Let C(t) be a counting process, counting the number of times the loan switches between current and delinquent. C(0) is set as C(0)=0. It is assumed, in this embodiment, that C(t) follows a Cox process with an intensity $v(t) = 1_{\{C(t-) \text{ is odd}\}} \lambda_c(t, U_t, X_t) + 1_{\{C(t-) \text{ is even}\}} \lambda_c(t, U_t, X_t)$ under the martingale measure.

Define $N(t)=\{1$ if $C(t)$ is even, 0 if $C(t)$ is odd$\}$. $N(t)$ represents the delinquency status of the loan.

The default and prepayment processes are unchanged with the exception that both intensities now depend on the delinquency status, i.e. $\lambda_t = \lambda(t, N_t, U_t, X_t)$ and $\eta_t = \eta(t, N_t, U_t, X_t)$.

The recovery rate on the loan is extended to be a stochastic process depending upon both the loan specific characteristics and the state variables as denoted $\delta(t, U_t, X_t)$.

2. CMBS Bonds

A CMBS trust's assets consist of a pool of loans whose values were modeled in the previous section. A typical trust, in turn, issues a collection of i=1, . . . , m ordinary coupon bonds and a single IO bond.

A. Description

The ordinary coupon bonds have coupon rates $c_i$, face values $F_i$, and maturity dates $T_i$ with increasing maturity $T_1 \leq T_2 \leq \ldots \leq T_m$. The cash flows that pay the CMBS bonds come from the loans underlying the trust. The cash flows are allocated based on the bond's maturity. The most senior bonds (maturity $T_1$) receive their coupon payments first, then the next most senior bonds (maturity $T_2$) receive their coupon payments second (if any cash flows remain), and so forth to the least senior bonds (maturity $T_m$). Also, any loan prepayments and/or default recovery payments received are allocated according to seniority as well. These prepayments or default recovery payments on the loans result in prepayment of the principal on the CMBS bonds prior to their expected maturity. In reverse fashion, any losses in default are subtracted from the least senior bond's (maturity $T_m$) principal first, then working backwards up to the most senior bond's (maturity $T_1$) principal.

The IO bonds have a maturity date $T_0$, no principal repayment, and they receive only interest payments. The interest payments received on the IOs are the cumulative interest payments from the loan pool, less the cumulative coupons paid to the CMBS coupon bonds. A detailed analytic description of these cash flows for a generic CMBS trust is described below.

B. Valuation

For the purposes of this section, however, the random cash flows at time t to bonds i=0, 1, . . . , m is denoted by $v_i(t)$. Bond i=0 corresponds to the IO bond. Then, the time t value of these bonds is given by the following expression $$b_i(t) = E_t \left\{ \sum_{j=i+1}^{T_i} v_i(j) e^{-\int_t^j r_s ds} \right\}. \tag{4}$$

Because of the complexity of the valuation problem, the expectation in this expression will be evaluated using Monte Carlo simulation, described in a subsequent section.

(a) The Empirical Processes

This section describes the stochastic processes for the term structure of interest rates and state variables used in the empirical implementation. A multiple factor IBM model for interest rate risk and standard diffusion processes for the state variables is used.

1. The RIM Model

The evolution of the term structure can be specified using forward rates under the martingale measure.

A. The Stochastic Process

Let $$f(t, T) = \frac{\partial \log p(t, T)}{\partial T}$$

be the instantaneous (continuously compounded) forward rate at time t for the future date T. A K factor model HJM model is used.

$$df(t, T) = \alpha(t, T) dt + \sum_{j=1}^{K} \sigma_j(t, T) dW_j(t) \tag{5}$$

where K is a positive integer, $$\alpha(t, T) = \sum_{j=1}^{K} \sigma_j(t, T) \int_t^T \sigma_j(t, u) du,$$

$\sigma_j(t,T) \equiv \min[\sigma_{rj}(T) f(t,T), M]$ for M a large positive constant, $\sigma_{rj}(T)$ are deterministic functions of T for j=1, . . . , K, and $W_j(t)$ for j=1, . . . , K are uncorrelated Brownian motions initialized at zero. Under this evolution, forward rates are "almost" lognomially distributed. The spot rate process, used for valuation, can be deduced from the forward rate evolution. Let $r_t = f(t,t)$.

$$dr_t = \left[ \frac{\partial f(t, t)}{\partial T} \right] dt + \alpha(t, t) dt + \sum_{j=1}^{K} \sigma_j(t, t) dW_j(t) \tag{6}$$

But $\alpha(t, t) = \sum_{j=1}^{K} \sigma_j(t, t) \int_t^t \sigma_j(t, t) du = 0$, so $$dr_t = \left[ \frac{\partial f(t, t)}{\partial T} \right] dt + \sum_{j=1}^{K} \min[\sigma_{rj}(T) r_t, M] dW_j(t).$$

For the subsequent analysis, knowledge of the evolution of constant maturity zero-coupon bonds is necessary. It is shown below that $$\frac{d p(t, t+T)}{d(t, T)} = (r_t - f(t, t+T)) dt - \sum_{j=1}^{K} \left( \int_t^{t+T} \sigma_j(t, u) du \right) dW_j(t). \tag{7}$$

B. The Empirical Methodology

To estimate the forward rate process given in expression (5), in one embodiment, a principal component analysis is used, Given is a time series of discretized forward rate curves $\{f(t,T_1), f(t,T_2), \ldots, f(t,T_{N_r})\}_{t=1}^m$ where $N_r$ is the number of discrete forward rates observed, the interval between sequential time observations is $\Delta$ and m is the number of observations. Then, percentage changes are computed $$\left\{ \frac{f(l+\Delta, T_1) - f(l, T_1)}{f(l, T_1)}, \ldots, \frac{f(l+\Delta, T_N) - f(l, T_{N_r})}{f(l, T_{N_r})} \right\}_{l=1}^m.$$

From the percentage changes, the $N_r \times N_r$ covariance matrix (from the different maturity forward rates) is computed, and its eigenvalue/eigenvector decomposition calculated. The normalized eigenvectors give the discretized volatility vectors $$\{\sigma_{rj}(T_1)\sqrt{\Delta}, \ldots, \sigma_{rj}(T_{N_r})\sqrt{\Delta}\} \text{ for } j = 1, \ldots, N_r.$$

Figure 38:
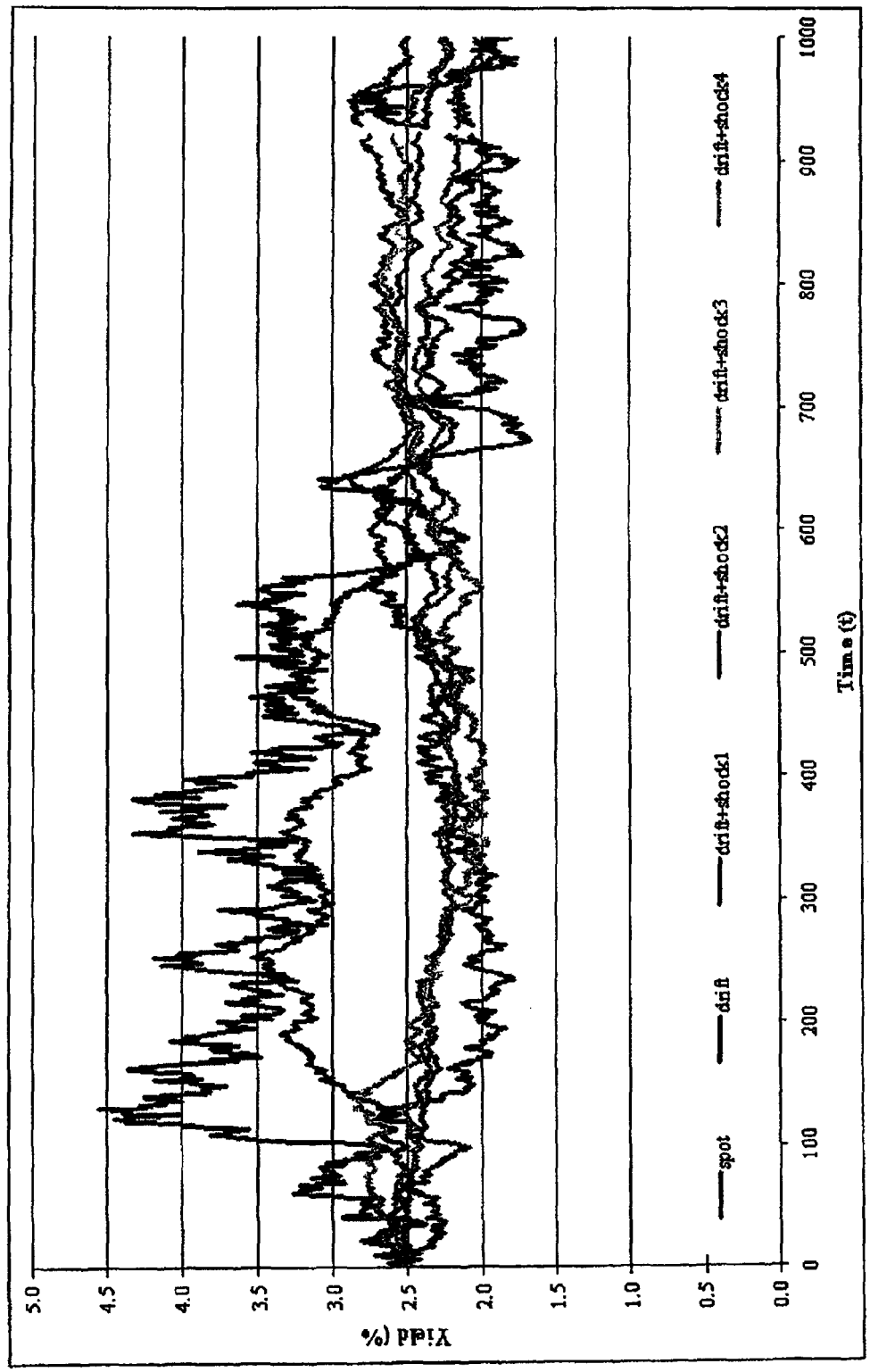
FIG. 38 is a schematic graphical representation of the four (4) factor interest rate process under the martingale measure.
Figure 39:
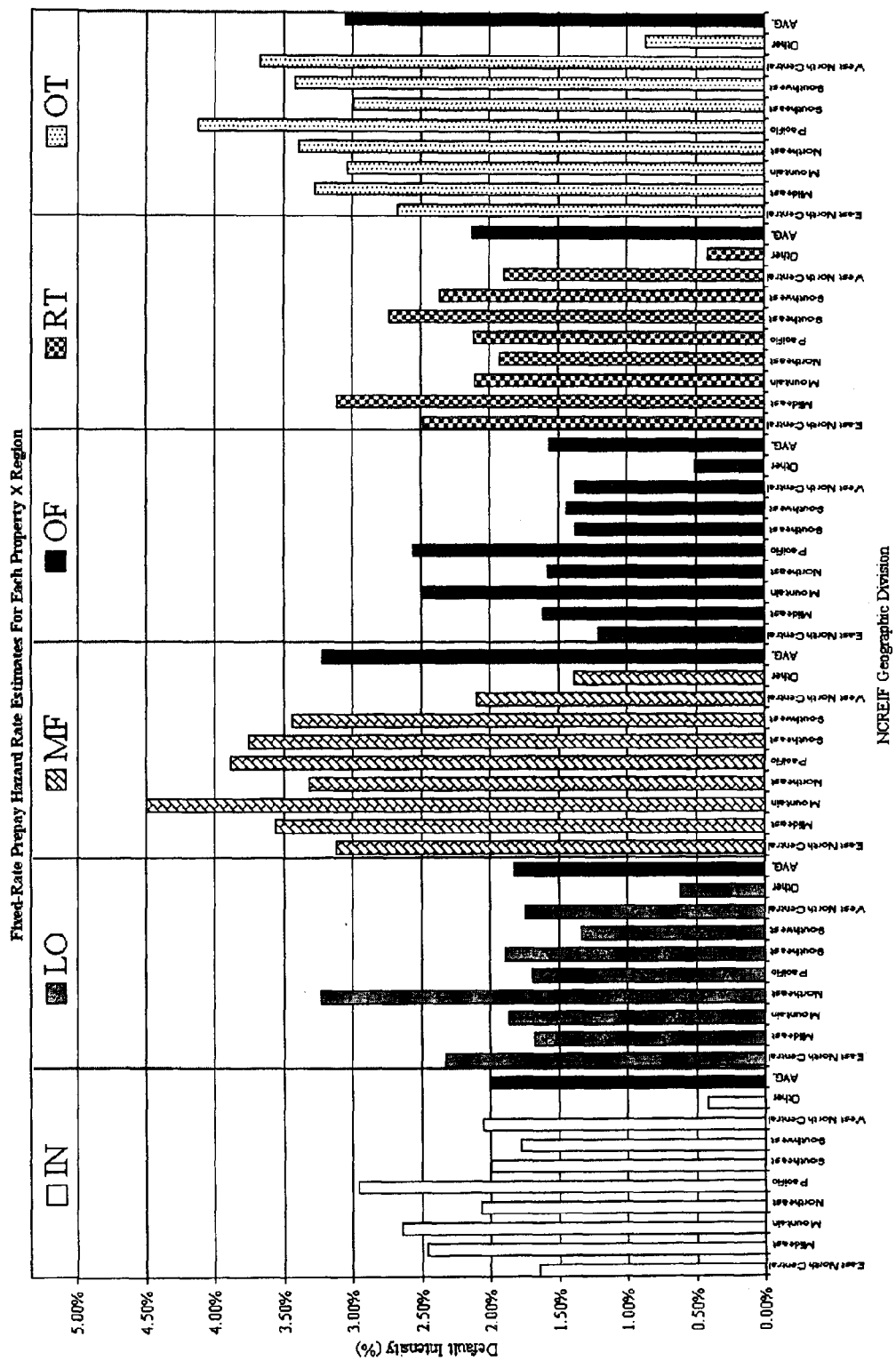
FIGS. 39-42 are schematic graphical representations of the one year default and prepayment probabilities, respectively, for the various loans by property types and geographic location on September 2004.
Figure 40:
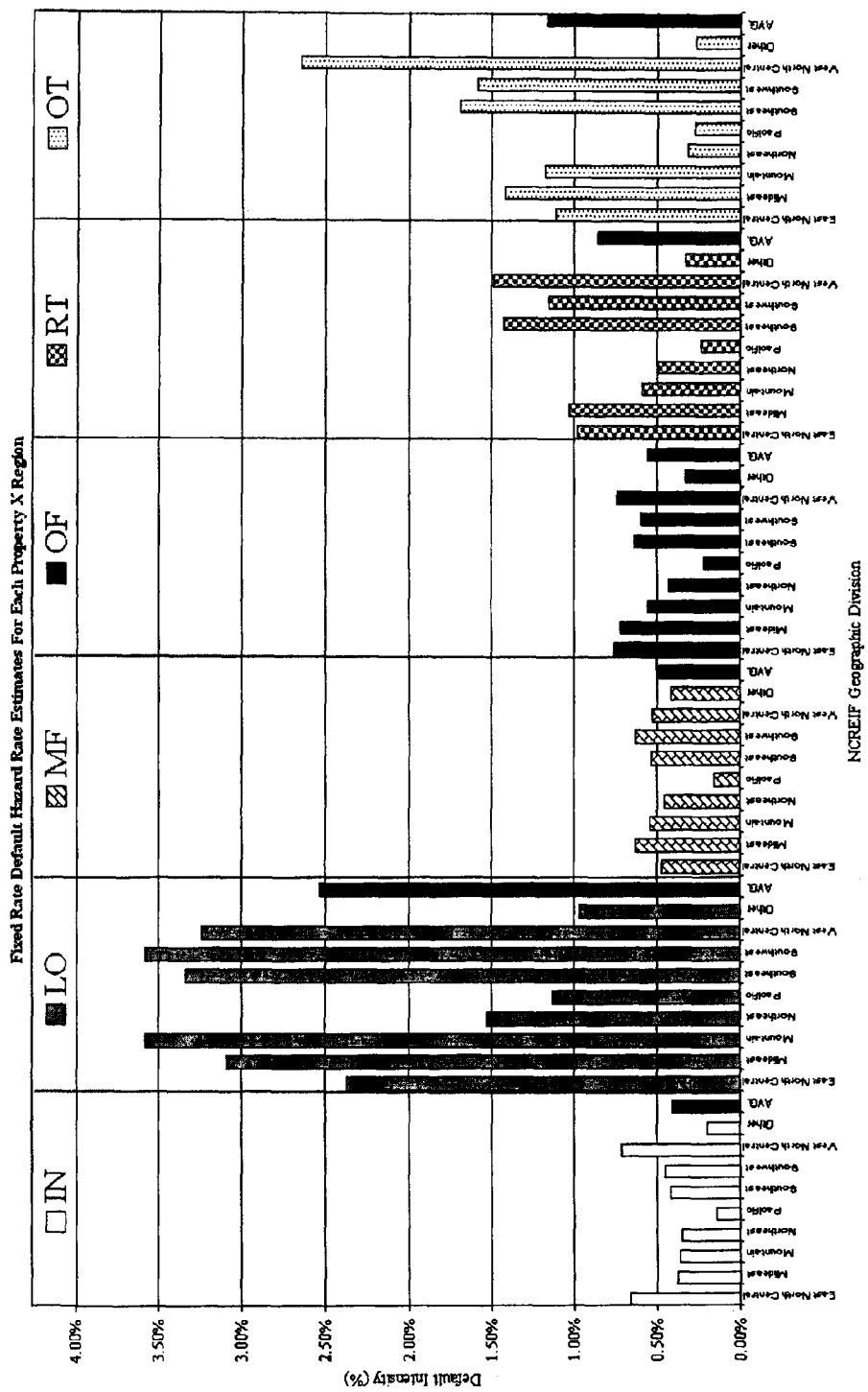
Figure 41:
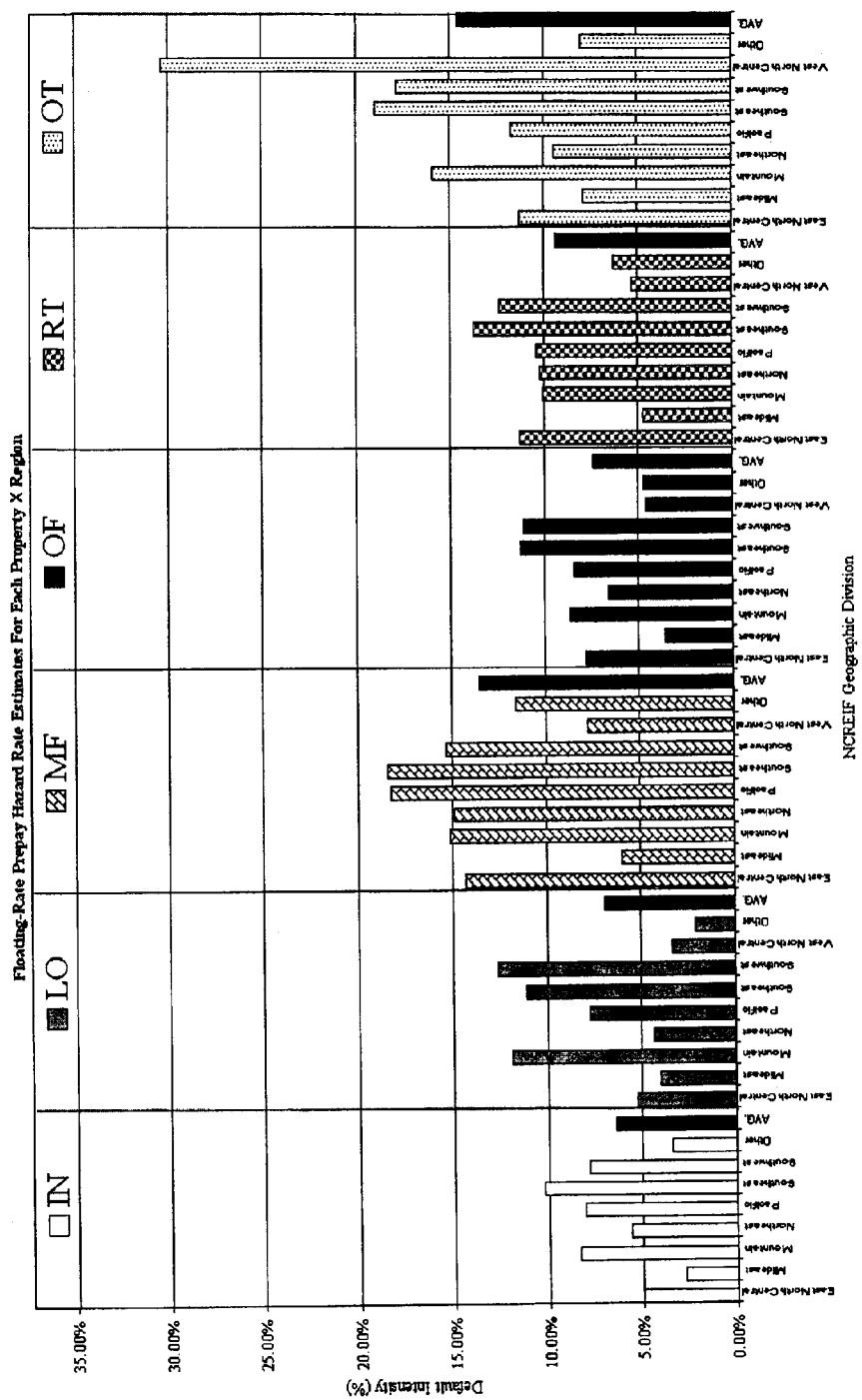
Figure 42:
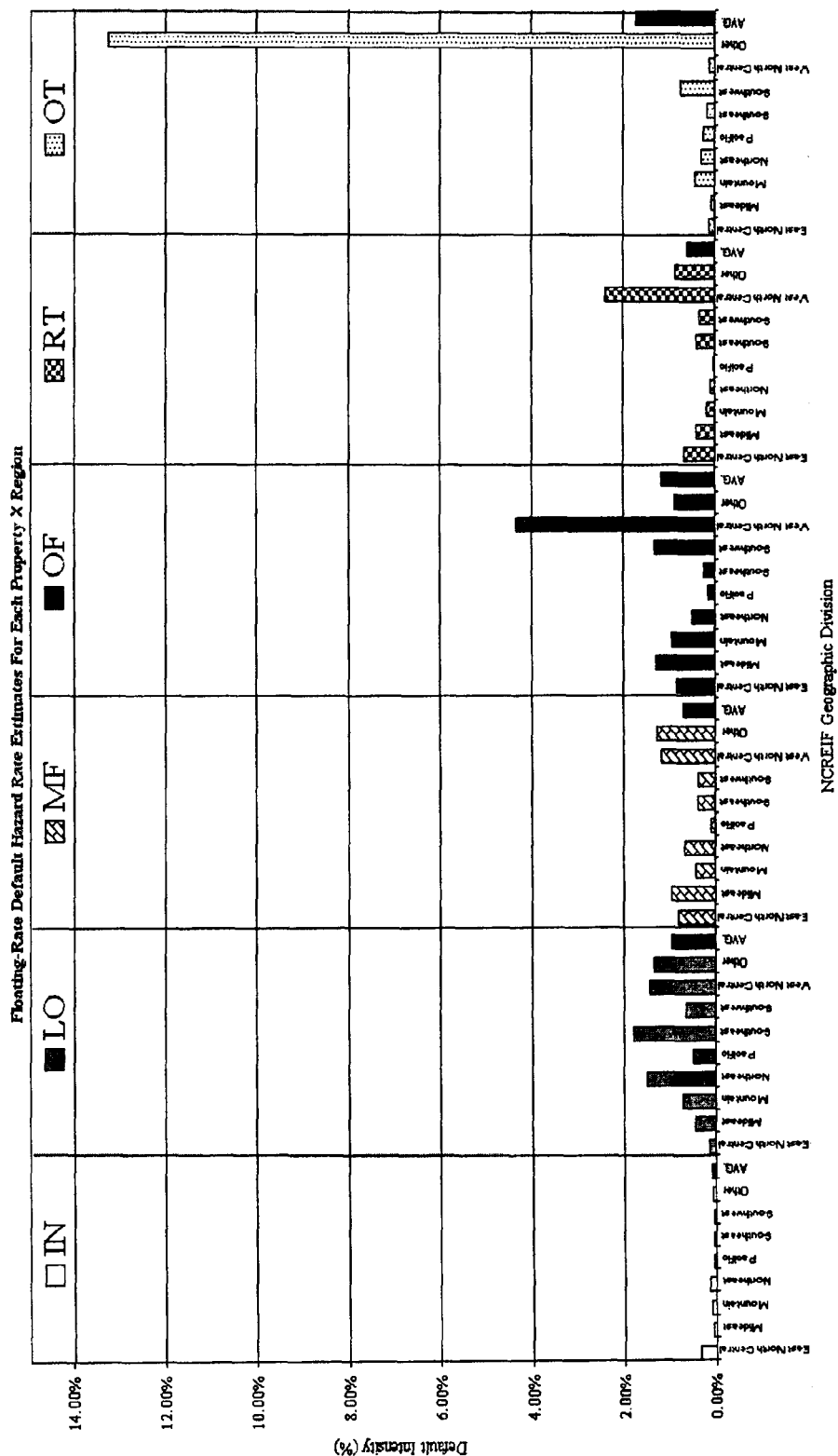

(See FIG. 38 for a drawing of the four (4) factor interest rate process under the martingale measure.)

The State Variables

The state variables in the model relating to this embodiment of the invention correspond to various indices related to the property values underlying the CMBS trusts. There are three levels of indices. All indices correspond to the prices of traded assets (i.e. values of different portfolios of properties). The first set of state variables correspond to the price of a particular type of property located in a particular region of the country, e.g. hotels in New York City. The second set of state variables correspond to an index for a particular property type (but across the entire country), e.g. hotels. Lastly, the third state variable is an index across all property types across the entire country, e.g. a REIT general stock price index. The idea underlying this decomposition comes from portfolio theory, where the first state variable is an individual stock price, the second state variable is an industry index, and the third state variable is the market index. This construction is formulated to facilitate simulation of the state variable processes in a subsequent section.

A. The Stochastic Process

The stochastic processes for these state variables is specified in reverse order. All stochastic processes are specified under the martingale measure. The evolution for the economy-wide property index, and the regional property index are $$d\overline{H}(t) = r_t\overline{H}(t)dt + \sigma(\overline{H})\overline{H}(t)dZ^{\overline{H}}(t) \quad (8)$$

$$dH_i(t) = r_t H_i(t)dt + \sigma_i(H)H_i(t)dZ_i^H(t) \text{ for } i = 1, \ldots, n_H \quad (9)$$

where $$Z^{\overline{H}}(t), Z_i^H(t)$$

are Brownian motions for all $$i, \sigma(\overline{H}), \sigma_i(H)$$

are constants for all i, $$dZ^{\overline{H}}(t)dZ_i^H(t) = \rho_i^{H\overline{H}}dt, \, dZ_j^H(t)dZ_i^H(t) = \rho_{ji}^{HH}dt,$$

all correlated with the forward rate Brownian motions are $$dZ^{\overline{H}}(t)dW_i(t) = \eta_i^{\overline{H}}dt$$

and $$dZ_j^H(t)dW_i(t) = \eta_{ji}^H dt.$$

The property×region index satisfies $$\frac{dh_i(t)}{h_i(t)} = r_t dt + \sum_{k=1}^{K} \sigma_{ik}\left(\frac{dp(t, t+T_k)}{p(t, t+T_k)} - r_t dt\right) + \beta_{ij}\left(\frac{dH_j(t)}{H_j(t)} - r_t dt\right) + \gamma_i\left(\frac{d\overline{H}_j(t)}{\overline{H}_j(t)} - r_t dt\right) + \sigma_i(h)dZ_i^h(t) \quad (10)$$

for $i = 1, \ldots, n_h$ where $\alpha_{ik}, \beta_{ij}, \gamma_i, \sigma_i(h)$ are constants for all i,k,j, the property×region index represented by $h_i(t)$ is the property type corresponding to index $H_j(t)$, and $Z_i^h(t)$ are Brownian motions independent of $Z^{\overline{H}}(t), Z_i^H(t), W_j(t)$ for all i,j. The K maturity bonds $T_k$ are chosen to be distinct.

Since all three classes of stochastic processes represent the prices of traded assets, their drifts equal the spot rate of interest under the martingale measure. Note that in expression (10), the zero coupon bond price returns correspond to a constant maturity bond, i.e. its maturity is always $T_m$.

This formulation is chosen because in the subsequent simulation, under this system, there are only $(1+n_H+K)$ correlated Brownian motions to be simulated. The remaining $n_h$ Brownian motions associated with expression (10) are independent. This substantially reduces the size of the simulation from one where $(1+n_H+K+n_h)$ correlated Brownian motions need to be generated. (In the subsequent implementation, K=4, $n_H$=6, and $n_h$=54.)

B. The Empirical Methodology

To compute the parameters of expressions (8) and (9), the quadratic variation, which is invariant under a change of equivalent probability measures is used. This estimation is illustrated with respect to expression (9). The procedure is identical for expression (8) as well.

Given is a time series of $\{H_i(t)\}_{i=1}^m$ where the interval between sequential time observations is $\Delta$ and m is the number of observations. Define $\Delta H_i(t) \equiv [H_i(t+\Delta) - H_i(t)]$. Then, the following expression, $$\sum_{t=1}^{m}\left(\frac{\Delta H_i(t)}{H_i(t)}\right)^2 \frac{1}{m} \text{ giving an estimate of } \sigma_i(H)^2\Delta. \quad (11)$$

can be calculated. Next, $$\sum_{t=1}^{m}\left(\frac{\Delta H_j(t)}{H_j(t)} \frac{\Delta H_i(t)}{H_i(t)}\right)\frac{1}{m}$$

giving an estimate of $$\sigma_j(H)\sigma_i(H)\rho_{ji}^{HH}\Delta. \quad (12)$$

can be calculated. To obtain the correlation between the forward rates and the regional property index $$\eta_{ji}^H$$

for j=1, ..., K, the following expression, $$\sum_{i=1}^m \left(\frac{\Delta f(t, T_k)}{f(t, T_k)} \frac{\Delta H_i(t)}{H_i(t)}\right)\frac{1}{m} \text{ giving an estimate of} \quad (13)$$

$$\sum_{j=1}^K \sigma_{rj}(T_k)\sigma_i(H)\eta_{ji}^H\Delta,$$

can be calculated. This is computed for k=1, ..., K for distinct $T_1, \ldots, T_K$ yielding K equations in K unknowns $$\{\eta_{1i}^H, \ldots, \eta_{Ki}^H\}.$$

Solving this system gives the estimates. This is done for all i=1, ..., $n_H$.

To estimate the parameters of expression (10), this expression is discretized and changed to the statistical measure $$\frac{\Delta h_i(t)}{h_i(t)} - r_t\Delta = \chi_i\Delta + \sum_{k=1}^K \alpha_{ik}\left(\frac{\Delta p(t, t+T_k)}{p(t, t+T_k)} - r_t\Delta\right) + \quad (14)$$

$$\beta_{if}\left(\frac{\Delta H_j(t)}{H_j(t)} - r_t\Delta\right) + \gamma_i\left(\frac{\Delta \overline{H}_j(t)}{\overline{H}_j(t)} - r_t\Delta\right) + \varepsilon_i(t)$$

$$\text{for } i = 1, \ldots, n_h$$

where $\chi_i$ is a constant and $$\varepsilon_i(t) \equiv \sigma_i(h)\Delta\hat{Z}_i^h(t)$$

In this expression $$\hat{Z}_i^h(t)$$

is the Brownian motion under the empirical measure and $\chi_i$ is the adjustment in the drift due to the market price of risk associated with the change of measure.

3. The Default and Prepayment Intensity Processes

Each commercial loan i has a default and prepayment intensity process that depends on the state variable vector $X_t$ and, by assumption, a vector of loan specific characteristics $U_i^f$ that are deterministic (non-random), e.g. the net operating income of the underlying property at the loan origination.

A. The Stochastic Processes

The intensity processes for each loan have the same functional form, differing only in the loan specific variables used. Let $$\lambda(t, U_t^i, X_t) = e^{\varphi_\lambda + \phi_\lambda U_t^i + \psi_\lambda X_t} \text{ for loan } i \quad (15)$$

$$\eta(t, U_t^i, X_t) = e^{\varphi_\eta + \phi_\eta U_t^i + \psi_\eta X_t} \text{ for loan } i \quad (16)$$

where $\phi_\lambda, \Phi_\lambda, \psi_\lambda, \phi_\eta, \phi_\eta, \psi_\eta$ are vectors of constants.

In one embodiment, the intensity processes for current and delinquency for loan i are:

$$\lambda_l(t, U_i, X_t) = e^{\varphi_l + \phi_l U_t^i + \psi_l X_t}$$

for $\text{loan}_i$ $$\lambda_d(t, N_i, U_i, X_t) = e^{\varphi_c + \theta_c N_i + \phi_c U_t^i + \psi_c X_t}$$

for $\text{loan}_i$

These intensity processes are given under the martingale measure for inclusion in the valuation equations. However, estimation of these intensities is under the statistical measure. Fortunately, given the assumption that default and prepayment risk is conditionally diversifiable, these intensity functions will be equivalent under both the empirical and martingale measures. This assumption is reasonable if the intensity processes, through the state variables employed, include all relevant systematic risks in the economy. This inclusion leaves only idiosyncratic risk to determine the actual occurrence of default and prepayment. The alternative approach is to modify expressions (15) and (16) by estimates of the market prices of default and prepayment risk. (Let $\kappa_\lambda, \kappa_p$ denote the random processes representing the market prices of default and prepayment risk, respectively. The transformation is $\kappa_\lambda \lambda(t, U_t^i, X_i)$ and $\kappa_p \eta(t, U_t^i, X_i)$, see R. Jarrow, D. Lando, and F. Yu, 2002, "Default Risk and Diversification: Theory and Applications", working paper, Cornell University for details.)

B. The Empirical Methodology

Given are commercial loan payment histories, including defaults, prepayments, loan characteristics, and time series observations for the state variables $$(X_t)_{t=1}^N$$

where the interval between sequential time observations is $\Delta$.

For empirical estimation, expressions (15) and (16) are replaced with their discrete approximations $$\lambda(t, U_t^i, X_t)\Delta = 1 / \left(1 + e^{-(\varphi_\lambda + \phi_\lambda U_t^i + \psi_\lambda X_t)}\right) \quad (17)$$

$$\eta(t, U_t^i, X_t)\Delta = 1 / \left(1 + e^{-(\varphi_\eta + \phi_\eta U_t^i + \psi_\eta X_t)}\right). \quad (18)$$

These discrete approximations have the interpretation of being the probability of default and prepayment over [t,t+Δ], respectively, conditional on no default or prepayment prior to time t. These expressions are estimated in a competing risk paradigm (see Y. Deng, J. Quigley, and R. Van Order, 2000, "Mortgage Terminations, Heterogeneity and the Exercise of Mortgage Options," Econometrica, 68 (2), 275-307; B. Ambrose and A. Sanders, 2001, "Commercial Mortgage-backed Securities: Prepayment and Default," working paper, Ohio State University; and B. Ciochetti, G. Lee, J. Shilling and R. Yao, "A Proportional Hazards Model of Commercial Mortgage Default with Originator Bias," working paper, University of North Carolina) using maximum likelihood estimation. Competing risk means that the occurrence of default precludes prepayment, and conversely. The estimation methodology explicitly incorporates this interdependence.

In one embodiment, the discrete approximations to the intensity processes for current and delinquency are:

$$\lambda_l(t, U_t, X_t) = 1 \big/ \left(1 + e^{-(\varphi_t + \phi_t U_t^i + \psi_t X_t)}\right) \text{ and}$$

$$\lambda_c(t, U_t, X_t) = 1 \big/ \left(1 + e^{-(\varphi_c + \theta_c N_i + \phi_c U_t^i + \psi_c X_t)}\right).$$

(b) The Estimates

This section discusses the data and the results from the estimations.

1. The Term Structure of Interest Rates

The term structure data consists of daily forward rates with maturities from 3 months up to 20.75 years in increments of 3 month intervals. The data set starts on Jan. 4, 1982 and goes to Oct. 15, 2004. There are 9 different maturity forward rates in these time series, hence, up to potentially 9 different factors. TABLE B1a contains the average and standard deviation of the forward rates (in percents), per year, over the observation period. Reported are only the 0.25, 0.5, 0.75, 1, 2, 3, 5, 7, 10, 15 and 20 year forward rates. TABLE B1b provides the volatility coefficients for the 0.25, 0.5, 0.75, 1, 2, 3, 5, 7, 10, 15 and 20 year forward rates and the percentage variance explained by the first 9 factors based on monthly observation intervals (Δ=1/12). (Daily observation intervals were not used because daily variations in rates are partly caused by the smoothing procedure. Monthly observation intervals reduce the importance of this smoothing noise in the estimated coefficients.) As indicated, the first four factors explain 92.75 percent of the variation in monthly forward rate movements. For the subsequent analysis, K is set to K=4 in expression (5).

TABLE B1a

Treasury forward rates from 4 Jan. 1982 to 15 Oct. 2004. Reported are the (yearly average, yearly standard deviation).

| Years | N | 3 month | 6 month | 1 year | 2 year | 3 year | 5 year | 7 year | 10 year | 20 year |
|---|---|---|---|---|---|---|---|---|---|---|
| | | | | | Maturities | | | | | |
| 1982 | 12 | (12.21, 2.37) | (12.14, 2.09) | (11.82, 1.83) | (13.29, 1.67) | (12.08, 1.44) | (13.02, 1.41) | (12.38, 1.21) | (12.03, 1.29) | (11.67, 1.03) |
| 1983 | 24 | (9.597, 0.655) | (9.504, 0.746) | (9.848, 0.644) | (11.12, 0.666) | (10.58, 0.774) | (11.77, 0.674) | (11.24, 0.472) | (11.21, 0.777) | (11.11, 0.663) |
| 1984 | 36 | (10.77, 1.01) | (10.87, 1.12) | (11.21, 1.01) | (12.56, 0.825) | (11.89, 0.767) | (13.01, 0.664) | (12.31, 0.584) | (12.14, 1.06) | (11.54, 0.777) |
| 1985 | 48 | (8.356, 0.794) | (8.338, 0.833) | (3.872, 0.79) | (10.64, 1) | (9.884, 0.928) | (11.42, 0.89) | (11.21, 0.636) | (10.2, 0.954) | (11.42, 0.563) |
| 1986 | 60 | (6.394, 0.69) | (6.265, 0.648) | (6.513, 0.553) | (7.486, 0.617) | (7.138, 0.58) | (7.924, 0.629) | (8.039, 0.704) | (7.694, 0.608) | (7.832, 0.908) |
| 1987 | 72 | (6.765, 0.534) | (6.963, 0.709) | (7.283, 0.813) | (8.44, 0.835) | (7.9, 0.831) | (8.878, 0.857) | (9.079, 0.82) | (8.581, 0.649) | (7.79, 0.749) |
| 1988 | 84 | (7.717, 0.768) | (7.789, 0.695) | (7.823, 0.621) | (8.71, 0.418) | (8.204, 0.401) | (9.165, 0.307) | (9.243, 0.281) | (8.82, 0.317) | (8.982, 0.271) |
| 1989 | 96 | (8.449, 0.744) | (8.191, 0.816) | (8.133, 0.747) | (8.479, 0.736) | (8.054, 0.568) | (8.349, 0.618) | (8.355, 0.317) | (8.039, 0.715) | (8.253, 0.234) |
| 1990 | 108 | (7.883, 0.497) | (7.568, 0.509) | (7.666, 0.508) | (8.581, 0.466) | (8.028, 0.249) | (8.821, 0.322) | (8.73, 0.326) | (8.243, 0.422) | (8.773, 0.35) |
| 1991 | 120 | (5.752, 0.751) | (5.636, 0.782) | (6.155, 0.766) | (7.47, 0.743) | (7.397, 0.668) | (8.699, 0.278) | (8.241, 0.314) | (8.415, 0.246) | (8.312, 0.183) |
| 1991 | 132 | (3.87, 0.425) | (3.992, 0.451) | (4.666, 0.604) | (6.444, 0.661) | (5.596, 0.528) | (8.156, 0.322) | (7.73, 0.338) | (8.622, 0.433) | (8.323, 0.43) |
| 1493 | 144 | (3.415, 0.125) | (3.492, 0.172) | (3.969, 0.171) | (5.144, 0.235) | (5.462, 0.293) | (6.738, 0.441) | (6.547, 0.412) | (7.166, 0.515) | (7.455, 0.817) |
| 1994 | 156 | (5.433, 1.12) | (5.818, 1.18) | (6.032, 0.954) | (7.093, 0.9) | (6.937, 0.673) | (7.645, 0.521) | (7.447, 0.444) | (7.76, 0.55) | (7.571, 0.355) |
| 1995 | 168 | (5.942, 0.512) | (5.786, 0.662) | (5.793, 0.753) | (6.385, 0.769) | (6.177, 0.665) | (6.655, 0.691) | (6.62, 0.591) | (6.681, 0.669) | (7.239, 0.479) |
| 1996 | 180 | (5.445, 0.243) | (5.479, 0.399) | (5.766, 0.512) | (6.34, 0.522) | (6.177, 0.461) | (6.664, 0.383) | (6.756, 0.311) | (6.619, 0.493) | (7.087, 0.235) |
| 1997 | 192 | (5.634, 0.181) | (5.645, 0.279) | (5.843, 0.35) | (6.418, 0.353) | (6.04, 0.433) | (6.549, 0.382) | (6.41, 0.416) | (6.236, 0.585) | (7.041, 0.367) |
| 1998 | 204 | (5.113, 0.431) | (4.913, 0.53) | (4.788, 0.575) | (5.178, 0.599) | (4.828, 0.571) | (5.403, 0.512) | (5.421, 0.329) | (4.741, 0.497) | (6.32, 0.303) |
| 1999 | 216 | (5.239, 0.493) | (5.171, 0.47) | (5.313, 0.429) | (6.013, 0.575) | (5.317, 0.427) | (6.391, 0.613) | (6.162, 0.474) | (4.44, 0.689) | (7.19, 0.422) |
| 2000 | 228 | (6.381, 0.364) | (5.985, 0.456) | (5.68, 0.564) | (6.406, 0.741) | (5.538, 0.484) | (6.305, 0.516) | (5.741, 0.285) | (5.282, 0.414) | (6.157, 0.295) |
| 2001 | 240 | (3.276, 1.03) | (3.193, 0.815) | (3.668, 0.593) | (4.452, 0.573) | (4.792, 0.238) | (5.768, 0.364) | (5.537, 0.312) | (5.533, 0.38) | (6.316, 0.325) |
| 2002 | 252 | (1.802, 0.363) | (2.007, 0.539) | (2.666, 0.85) | (3.776, 1.11) | (4.306, 0.874) | (5.475, 0.558) | (5.605, 0.321) | (5.507, 0.507) | (7.615, 0.632) |

TABLE B1a-continued

Treasury forward rates from 4 Jan. 1982 to 15 Oct. 2004. Reported are the (yearly average, yearly standard deviation).

| Years | N | 3 month | 6 month | 1 year | 2 year | 3 year | 5 year | 7 year | 10 year | 20 year |
|---|---|---|---|---|---|---|---|---|---|---|
| 2003 | 264 | (1.087, 0.111) | (1.248, 0.099) | (1.653, 0.286) | (2.621, 0.458) | (3.578, 0.499) | (5.024, 0.467) | (5.076, 0.324) | (5.803, 0.512) | (6.915, 0.352) |
| 2004 | 274 | (1.276, 0.343) | (2.112, 0.695) | (1.986, 0.239) | (3.622, 0.724) | (3.508, 0.444) | (5.459, 0.347) | (4.726, 0.398) | (5.171, 0.279) | (6.54, 0.41) |

TABLE B1b

Volatility functions and the percentage variance explained for the first eight factors over the time period 4 Jan. 1982 to 15 Oct. 2004.

| | Maturities | | | | | | | | |
|---|---|---|---|---|---|---|---|---|---|
| | 1 | 2 | 3 | 4 | 5 | 6 | 7 | 8 | 9 |
| 3 months | −0.1712 | −0.0246 | 0.1156 | 0.0882 | −0.0228 | 0.0205 | −0.0118 | 0.0353 | 0.0231 |
| 6 months | −0.2579 | −0.0089 | 0.1068 | 0.0273 | 0.0008 | −0.0089 | 0.0208 | −0.0470 | −0.0295 |
| 1 year | −0.2925 | 0.0156 | 0.0172 | −0.0924 | −0.0402 | −0.0334 | −0.0481 | 0.0037 | 0.0063 |
| 2 year | −0.2925 | −0.0064 | −0.0150 | −0.0341 | 0.0795 | −0.0083 | 0.0359 | 0.0100 | 0.0262 |
| 3 year | −0.2062 | 0.0071 | −0.0656 | −0.0308 | −0.0547 | 0.0500 | 0.0445 | 0.0216 | −0.0186 |
| 5 year | −0.1640 | 0.0072 | −0.0622 | 0.0409 | 0.0512 | 0.0165 | −0.0466 | 0.0201 | −0.0380 |
| 7 year | −0.1349 | 0.0366 | −0.0862 | 0.0361 | −0.0098 | 0.0476 | −0.0240 | −0.0445 | 0.0294 |
| 10 year | −0.0869 | −0.1926 | −0.0916 | 0.0530 | −0.0219 | −0.0489 | 0.0055 | −0.0032 | 0.0030 |
| 20 year | −0.0818 | 0.1939 | −0.0571 | 0.0619 | −0.0208 | −0.0517 | 0.0179 | 0.0076 | 0.0001 |
| Percentage Explained | 63.0059 | 16.7645 | 8.9670 | 4.0168 | 2.7161 | 1.9567 | 1.3608 | 0.8101 | 0.4022 |

2. The State Variables

Monthly observations of the REIT stock price index, $\overline{H}(t)$, over the time period June 1998 to December 2002, have been obtained. Analogous to the REIT stock price index, monthly observations of the property value indices, $H_i(t)$, over the same time period, have also been obtained. There are six property types considered ($n_H=6$): industrial (IN), lodging (LO), multifamily (MF), office (OF), retail (RT), and other (OT). The property x region (P×R) indices, $h_i(t)$, are obtained quarterly and they correspond to 9 regions: east north central, mideast, mountain, northeast, pacific, southeast, southwest, west north, and other. This gives a total of 54 different indices ($n_h=54$). For the constant maturity zero-coupon bond prices in expression (7), in one embodiment, the maturities 1 year, 2 years, 5 years and 7 years were used.

TABLES B2a1, B2a2 and B2a3 give summary tables containing the averages and standard deviations of the property value indices, per year, over the observation period.

TABLE B2a1

Property Value Index from June 1998 to October 2004. Reported are the yearly average and standard deviation

| Property Type | Year | H(t) | Stdev |
|---|---|---|---|
| IN | 1998 | 179.8814 | 7.2475 |
| IN | 1999 | 168.1588 | 5.2481 |
| IN | 2000 | 179.8400 | 11.7104 |
| IN | 2001 | 191.333 | 3.7384 |
| IN | 2002 | 213.0621 | 8.8878 |
| IN | 2003 | 230.8151 | 16.7405 |
| IN | 2004 | 274.6833 | 12.1632 |
| LO | 1998 | 116.0779 | 23.0016 |
| LO | 1999 | 74.2163 | 7.8849 |
| LO | 2000 | 70.5854 | 5.4504 |
| LO | 2001 | 76.2783 | 11.1328 |
| LO | 2002 | 71.7929 | 7.3246 |
| LO | 2003 | 61.8615 | 8.5744 |
| LO | 2004 | 81.6233 | 2.3674 |
| MF | 1998 | 117.2307 | 4.5346 |
| MF | 1999 | 118.6029 | 4.5604 |
| MF | 2000 | 130.6779 | 10.2846 |
| MF | 2001 | 148.1196 | 4.4155 |
| MF | 2002 | 146.4762 | 8.8260 |
| MF | 2003 | 143.6226 | 10.1412 |
| MF | 2004 | 160.0833 | 4.3041 |
| OF | 1998 | 198.9813 | 13.6352 |
| OF | 1999 | 186.8679 | 11.6537 |
| OF | 2000 | 197.0946 | 15.1795 |
| OF | 2001 | 213.6146 | 5.6097 |
| OF | 2002 | 207.2754 | 13.8477 |
| OF | 2003 | 205.5084 | 17.5052 |
| OF | 2004 | 238.6100 | 8.7948 |
| OT | 1998 | 166.0779 | 23.0016 |
| OT | 1999 | 74.2163 | 7.8849 |
| OT | 2000 | 70.5864 | 5.4504 |
| OT | 2001 | 76.2783 | 11.1328 |
| OT | 2002 | 71.7929 | 7.3246 |
| OT | 2003 | 61.8615 | 8.5744 |
| OT | 2004 | 81.6233 | 2.3674 |
| RT | 1998 | 124.2143 | 3.6011 |
| RT | 1999 | 108.2546 | 7.6288 |
| RT | 2000 | 102.0950 | 3.0700 |
| RT | 2001 | 120.8671 | 5.8915 |
| RT | 2002 | 149.7329 | 7.4710 |

TABLE B2a1-continued

Property Value Index from June 1998 to October 2004. Reported are the yearly average and standard deviation

| Property Type | Year | H(t) | Stdev |
|---|---|---|---|
| RT | 2003 | 184.3675 | 23.1593 |
| RT | 2004 | 242.7856 | 13.4876 |

TABLE B2a2

REIT stock price index from June 1998 to October 2004. Reported are the yearly average and standard deviation

| Year | $\overline{H(t)}$ | Stdev |
|---|---|---|
| 1998 | 122.4779 | 7.4054 |
| 1999 | 110.0413 | 5.7429 |
| 2000 | 110.7277 | 6.4716 |
| 2001 | 123.7938 | 3.4817 |
| 2002 | 127.7473 | 5.9664 |
| 2003 | 132.4888 | 11.9078 |
| 2004 | 158.3433 | 6.1618 |

TABLE B2a3

Property by Region Indices from June 1998 to October 2004. Reported are the yearly average and standard deviation. The property types are: industry (IN), lodging (LO), multifamily (MF), office (OF), other (OT), and retail (RT).

| | | East North Central | | Mideast | | Mountain | | Northeast | | Pacific | |
|---|---|---|---|---|---|---|---|---|---|---|---|
| Property | Year | $h_i(t)$ | Stdev | $h_i(t)$ | Stdev | $h_i(t)$ | Stdev | $h_i(t)$ | Stdev | $h_i(t)$ | Stdev |
| IN | 1998 | 3.018 | 0.275 | 3.306 | 0.348 | 2.150 | 0.908 | 4.165 | 0.284 | 4.250 | 1.297 |
| IN | 1999 | 2.483 | 0.679 | 2.510 | 0.789 | 2.493 | 0.544 | 2.880 | 0.405 | 0.131 | 0.122 |
| IN | 2000 | 1.909 | 1.909 | 0.356 | 3.318 | 2.472 | 0.330 | 3.058 | 0.515 | 4.285 | 1.251 |
| IN | 2001 | 1.232 | 0.998 | 2.504 | 0.623 | 1.708 | 0.647 | 2.066 | 0.636 | 3.037 | 1.091 |
| IN | 2002 | 1.790 | 0.522 | 2.248 | 0.406 | 2.257 | 0.514 | 1.867 | 0.277 | 1.789 | 0.422 |
| IN | 2003 | 2.029 | 0.125 | 2.753 | 0.584 | 1.723 | 0.677 | 2.477 | 0.635 | 2.492 | 0.466 |
| IN | 2004 | 4.413 | 0.004 | 3.912 | 0.010 | 2.769 | 0.042 | 2.939 | 0.004 | 2.369 | 0.007 |
| LO | 1998 | −2.196 | 6.759 | −2.196 | 6.759 | −2.196 | 6.759 | −21.966 | 6.759 | −21.966 | 6.759 |
| LO | 1999 | −5.910 | 10.766 | −5.910 | 10.766 | −5.910 | 10.766 | −5.910 | 10.766 | −5.910 | 10.766 |
| LO | 2000 | 7.250 | 6.369 | 7.250 | 6.369 | 7.250 | 6.369 | 7.250 | 6.369 | 7.250 | 6.369 |
| LO | 2001 | −3.645 | 14.345 | −3.645 | 14.345 | −3.645 | 14.345 | −3.645 | 14.345 | −3.645 | 14.345 |
| LO | 2002 | 0.926 | 19.334 | 0.926 | 19.334 | 0.926 | 19.334 | 0.926 | 19.334 | 0.926 | 19.334 |
| LO | 2003 | 9.043 | 11.737 | 9.043 | 11.737 | 9.043 | 11.737 | 9.043 | 11.737 | 9.043 | 11.737 |
| LO | 2004 | 8.811 | 1.026 | 8.811 | 1.026 | 8.811 | 1.026 | 8.811 | 1.026 | 8.811 | 1.026 |
| MF | 1998 | 2.984 | 0.480 | 3.799 | 0.912 | 2.166 | 0.234 | 4.293 | 1.221 | 3.151 | 1.003 |
| MF | 1999 | 2.520 | 0.488 | 3.56 | 0.502 | 2.374 | 0.256 | 3.052 | 0.316 | 2.743 | 1.065 |
| MF | 2000 | 1.906 | 0.274 | 3.164 | 0.395 | 2.550 | 0.4003 | 3.002 | 1.290 | 4.038 | 0.725 |
| MF | 2001 | 1.085 | 1.133 | 2.106 | 0.285 | 1.722 | 1.047 | 1.945 | 0.637 | 3.095 | 0.966 |
| MF | 2002 | 1.275 | 0.562 | 2.545 | 0.874 | 1.677 | 0.360 | 1.790 | 0.566 | 2.434 | 0.277 |
| MF | 2003 | 1.633 | 0.339 | 2.371 | 0.257 | 2.160 | 0.269 | 2.194 | 0.254 | 2.779 | 0.917 |
| MF | 2004 | 2.346 | 0.008 | 1.374 | 0.010 | 2.946 | 0.032 | 3.309 | 0.004 | 3.311 | 0.015 |
| OF | 1998 | 4.004 | 0.441 | 3.854 | 0.814 | 2.315 | 0.444 | 3.921 | 0.512 | 4.440 | 0.692 |
| OF | 1999 | 2.768 | 0.647 | 2.933 | 0.329 | 2.292 | 0.280 | 2.722 | 0.986 | 3.331 | 0.553 |
| OF | 2000 | 1.879 | 0.338 | 3.020 | 0.703 | 2.231 | 0.342 | 3.096 | 0.635 | 4.418 | 0.590 |
| OF | 2001 | 0.678 | 0.969 | 1.803 | 0.347 | 1.237 | 0.879 | 1.668 | 0.960 | 1.759 | 1.065 |
| OF | 2002 | 1.056 | 0.727 | 1.388 | 0.388 | 0.809 | 0.836 | 1.865 | 0.495 | 0.317 | 0.564 |
| OF | 2003 | 1.468 | 0.460 | 1.946 | 0.159 | 1.556 | 1.030 | 2.038 | 0.108 | 1.558 | 0.463 |
| OF | 2004 | 1.423 | 0.005 | 1.759 | 0.003 | 2.331 | 0.064 | 2.835 | 0.004 | 2.218 | 0.005 |
| OT | 1998 | 2.763 | 0.151 | 4.051 | 0.752 | 2.130 | 0.726 | 4.054 | 0.774 | 4.172 | 0.782 |
| OT | 1999 | 2.283 | 0.374 | 2.620 | 0.169 | 2.088 | 0.218 | 2.747 | 0.271 | 3.009 | 0.409 |
| OT | 2000 | 1.850 | 0.248 | 2.317 | 0.227 | 2.400 | 0.417 | 3.034 | 0.732 | 3.715 | 0.587 |
| OT | 2001 | 1.186 | 0.999 | 1.408 | 0.242 | 1.565 | 0.569 | 1.897 | 0.701 | 2.272 | 0.894 |
| OT | 2002 | 1.598 | 0.275 | 1.627 | 0.547 | 1.785 | 0.460 | 2.021 | 0.439 | 1.649 | 0.325 |
| OT | 2003 | 1.637 | 0.391 | 2.400 | 0.726 | 2.193 | 0.483 | 2.554 | 0.840 | 4.408 | 0.445 |
| OT | 2004 | 2.163 | 0.048 | 1.134 | 0.199 | 2.651 | 0.179 | 2.682 | 0.019 | 2.520 | 0.012 |
| RT | 1998 | 2.438 | 0.430 | 3.361 | 0.352 | 0.714 | 1.737 | 3.890 | 1.160 | 3.098 | 0.360 |
| RT | 1999 | 2.046 | 0.428 | 3.151 | 0.265 | 2.403 | 0.587 | 2.541 | 0.295 | 2.932 | 0.504 |
| RT | 2000 | 1.752 | 0.540 | 2.336 | 0.518 | 2.319 | 0.170 | 2.810 | 0.473 | 2.826 | 0.654 |
| RT | 2001 | 0.975 | 1.162 | 1.555 | 0.358 | 1.878 | 0.353 | 1.794 | 0.734 | 2.471 | 0.485 |
| RT | 2002 | 1.828 | 0.702 | 1.945 | 0.834 | 3.071 | 0.786 | 2.073 | 0.695 | 2.712 | 0.538 |
| RT | 2003 | 1.989 | 0.882 | 3.683 | 0.907 | 3.199 | 1.018 | 3.002 | 0.816 | 4.270 | 1.817 |
| RT | 2004 | 2.782 | 0.005 | 1.572 | 0.029 | 2.737 | 0.016 | 2.842 | 0.004 | 2.589 | 0.012 |

| | | Southeast | | Southwest | | West North Central | | Other | |
|---|---|---|---|---|---|---|---|---|---|
| Property | Year | $h_i(t)$ | Stdev | $h_i(t)$ | Stdev | $h_i(t)$ | Stdev | $h_i(t)$ | Stdev |
| IN | 1998 | 3.405 | 0.347 | 3.510 | 0.662 | 2.745 | 0.514 | 3.516 | 0.609 |
| IN | 1999 | 2.492 | 0.249 | 2.814 | 0.740 | 2.582 | 0.598 | 2.792 | 0.164 |
| IN | 2000 | 2.152 | 0.372 | 2.178 | 0.254 | 2.947 | 1.002 | 3.336 | 0.547 |
| IN | 2001 | 1.440 | 1.237 | 2.315 | 0.550 | 1.035 | 1.057 | 2.251 | 0.854 |
| IN | 2002 | 1.578 | 0.419 | 1.115 | 0.318 | 1.027 | 0.808 | 1.634 | 0.274 |
| IN | 2003 | 2.628 | 1.001 | 1.588 | 0.340 | 1.291 | 0.459 | 1.998 | 0.442 |

TABLE B2a3-continued

Property by Region Indices from June 1998 to October 2004. Reported are the yearly average and standard deviation.
The property types are: industry (IN), lodging (LO), multifamily (MF), office (OF), other (OT), and retail (RT).

| | | | | | | | | | |
|---|---|---|---|---|---|---|---|---|---|
| IN | 2004 | 2.713 | 0.002 | 2.286 | 0.007 | 2.921 | 0.012 | 2.386 | 0.000 |
| LO | 1998 | −21.966 | 6.759 | −21.966 | 6.759 | −21.966 | 6.759 | −21.966 | 6.759 |
| LO | 1999 | −5.910 | 10.766 | −5.910 | 10.766 | −5.910 | 10.766 | −5.910 | 10.766 |
| LO | 2000 | 7.250 | 6.369 | 7.250 | 6.369 | 7.250 | 6.369 | 7.250 | 6.369 |
| LO | 2001 | −3.645 | 14.345 | −3.645 | 14.345 | −3.645 | 14.345 | −3.645 | 14.345 |
| LO | 2002 | 0.926 | 19.334 | 0.926 | 19.334 | 0.926 | 19.334 | 0.926 | 19.334 |
| LO | 2003 | 9.043 | 11.737 | 9.043 | 11.737 | 9.043 | 11.737 | 9.043 | 11.737 |
| LO | 2004 | 8.811 | 1.026 | 8.811 | 1.026 | 8.811 | 1.026 | 8.811 | 1.026 |
| MF | 1998 | 2.996 | 0.377 | 3.119 | 0.206 | 3.972 | 0.920 | 3.420 | 0.132 |
| MF | 1999 | 2.651 | 0.349 | 2.201 | 0.251 | 3.529 | 0.260 | 2.811 | 0.261 |
| MF | 2000 | 2.429 | 0.214 | 1.985 | 0.139 | 2.546 | 0.511 | 3.102 | 0.632 |
| MF | 2001 | 1.886 | 0.515 | 2.030 | 0.288 | 1.525 | 0.783 | 2.265 | 0.470 |
| MF | 2002 | 1.831 | 0.423 | 1.801 | 0.409 | 1.731 | 0.717 | 2.123 | 0.316 |
| MF | 2003 | 1.985 | 0.240 | 1.753 | 0.265 | 1.920 | 0.533 | 2.155 | 0.126 |
| MF | 2004 | 3.101 | 0.007 | 1.984 | 0.003 | 3.663 | 0.004 | 3.003 | 0.000 |
| OF | 1998 | 3.379 | 0.613 | 4.765 | 0.805 | 4.143 | 0.338 | 4.106 | 0.385 |
| OF | 1999 | 2.624 | 0.912 | 2.060 | 0.493 | 2.745 | 0.652 | 2.924 | 0.160 |
| OF | 2000 | 2.042 | 0.058 | 1.824 | 0.248 | 2.227 | 0.680 | 3.356 | 0.489 |
| OF | 2001 | 1.367 | 0.563 | 1.185 | 0.431 | 0.971 | 0.895 | 1.520 | 1.014 |
| OF | 2002 | 1.047 | 0.478 | 0.508 | 0.418 | 0.162 | 1.163 | 0.689 | 0.297 |
| OF | 2003 | 1.888 | 0.929 | 1.223 | 0.491 | 1.511 | 0.536 | 1.389 | 0.170 |
| OF | 2004 | 1.992 | 0.004 | 1.522 | 0.003 | 2.082 | 0.007 | 2.244 | 0.000 |
| OT | 1998 | 3.271 | 0.271 | 3.804 | 0.166 | 3.957 | 0.620 | 3.605 | 0.263 |
| OT | 1999 | 2.376 | 0.148 | 2.284 | 0.169 | 2.664 | 0.616 | 2.728 | 0.129 |
| OT | 2000 | 2.045 | 0.069 | 2.092 | 0.225 | 2.101 | 0.662 | 2.932 | 0.352 |
| OT | 2001 | 1.472 | 0.598 | 1.682 | 0.415 | 1.588 | 0.522 | 1.775 | 0.754 |
| OT | 2002 | 1.427 | 0.394 | 1.395 | 0.216 | 1.226 | 0.407 | 1.646 | 0.105 |
| OT | 2003 | 1.861 | 0.297 | 2.226 | 0.405 | 1.623 | 1.369 | 2.177 | 0.361 |
| OT | 2004 | 2.885 | 0.047 | 2.223 | 0.053 | 1.896 | 0.015 | 2.564 | 0.000 |
| RT | 1998 | 3.582 | 1.135 | 3.363 | 0.334 | 3.049 | 0.431 | 3.029 | 0.285 |
| RT | 1999 | 2.426 | 0.289 | 3.119 | 0.481 | 2.634 | 0.596 | 2.306 | 0.176 |
| RT | 2000 | 2.225 | 0.185 | 1.759 | 0.531 | 2.351 | 0.414 | 1.886 | 0.180 |
| RT | 2001 | 1.790 | 0.196 | 1.971 | 0.488 | 1.671 | 0.533 | 1.644 | 0.438 |
| RT | 2002 | 2.506 | 0.247 | 2.539 | 0.591 | 1.522 | 0.728 | 3.276 | 1.020 |
| RT | 2003 | 2.621 | 0.161 | 3.232 | 0.911 | 2.814 | 1.581 | 4.045 | 1.426 |
| RT | 2004 | 3.101 | 0.006 | 1.868 | 0.010 | 2.623 | 0.019 | 3.000 | 0.000 |

The estimated values for the state variable parameters are given in TABLES B2b and B2c. TABLE B2c contains the coefficients, standard errors, and $R^2$ from regression equation (10). Note that the $R^2$, ranging between 1 to 20 percent, are similar in magnitude to those observed in the empirical asset pricing literature for stock returns.

TABLE B2b

State variable parameters from June 1990 to October 2004

| | | | | | | |
|---|---|---|---|---|---|---|
| $\sigma(\overline{H})=$ | 0.1134 | | | | | |
| $\sigma(H_i)=$ | 0.1146 | 0.2221 | 0.1014 | 0.1209 | 0.221 | 0.1437 |
| $\eta_j^H=$ | 0.2828 | 0.0709 | −0.2707 | −0.0442 | | |
| $\eta_{i1}^H=$ | 0.4382 | −0.0965 | 0.0408 | 0.1958 | −0.0965 | 0.3687 |
| $\eta_{i2}^H=$ | 0.0347 | 0.1783 | 0.001 | 0.1164 | 0.1783 | 0.0063 |
| $\eta_{i3}^H=$ | −0.274 | −0.0395 | −0.1911 | −0.2446 | −0.0395 | −0.2969 |

TABLE B2b-continued

State variable parameters from June 1990 to October 2004

| | | | | | | |
|---|---|---|---|---|---|---|
| $\eta_{i4}^H=$ | 0.0014 | −0.1023 | −0.003 | −0.0393 | −0.1023 | −0.0006 |
| $\rho_i^{HH}=$ | 0.9125 | 0.7075 | 0.8793 | 0.9542 | 0.7075 | 0.8629 |

The index i = IN, LO, MF, OF, OT, TR (from left to right). The property types are: industry (IN), lodging (LO), multifamily (MF), office (OF), other (OT), and retail (RT).
The index j = 1, 2, 3, 4 corresponds to the interest rate factors.

| $\rho_{ij}^{HH}$ | IN | LO | MF | OF | OT | RT |
|---|---|---|---|---|---|---|
| IN | 1 | 0.5991 | 0.777 | 0.8377 | 0.5991 | 0.8435 |
| LO | 0.5991 | 1 | 0.6375 | 0.6502 | 1 | 0.5958 |
| MF | 0.7770 | 0.6375 | 1 | 0.8584 | 0.6375 | 0.6302 |
| OF | 0.8377 | 0.6502 | 0.8584 | 1 | 0.6502 | 0.7420 |
| OT | 0.5991 | 1 | 0.6375 | 0.6375 | 1 | 0.5958 |
| RT | 0.8435 | 0.5958 | 0.6302 | 0.6302 | 0.5958 | 1 |

The indices i, j = IN, LO, MF, OF, OT, TR (from left to right, and top to bottom). The property types are: industry (IN), lodging (LO), multifamily (MF), office (OF), other (OT), and retail (RT).

TABLE B2c

Regression coefficients of expression (14). Numbers in parentheses are standard errors.
Observation period is from June 1998 to October 2004. The property types are: industry (IN), lodging (LO), multifamily (MF), office (OF), other (OT), and retail (RT).

| Property | Region | Intercept, ($\alpha_1$, stderr) | ($\alpha_2$, stderr) | ($\alpha_3$, stderr) | ($\alpha_4$, stderr) | ($\beta$, stderr) | ($\gamma$, stderr) | $R^2$ | N |
|---|---|---|---|---|---|---|---|---|---|
| IN | EastNorth-Central | (−0.2029, 0.1647) | (20.02, 55.45) | (−41.5, 75.68) | (46.68, 48.76) | (−26.79, 29.44) | (1.578, 6.921) | (0.6055, 6.699) | 0.0500 | 75 |

TABLE B2c-continued

Regression coefficients of expression (14). Numbers in parentheses are standard errors.
Observation period is from June 1998 to October 2004. The property types are: industry
(IN), lodging (LO), multifamily (MF), office (OF), other (OT), and retail (RT).

| Property | Region | Intercept, Region | ($\alpha_1$, stderr) | ($\alpha_2$, stderr) | ($\alpha_3$, stderr) | ($\alpha_4$, stderr) | ($\beta$, stderr) | ($\gamma$, stderr) | $R^2$ | N |
|---|---|---|---|---|---|---|---|---|---|---|
| IN | Medeast | (−0.0037, 0.0802) | (−24.29, 27) | (28.03, 36.85) | (5.546, 23.75) | (−9.307, 14.34) | (2.156, 3.37) | (−1.252, 262) | 0.1906 | 75 |
| IN | Mountain | (0.1253, 0.0975) | (−53.43, 32.84) | (86.25, 44.82) | (−42.28, 28.88) | (9.992, 17.44) | (1.096, 4.098) | (−0.3548, 3.967) | 0.2713 | 75 |
| IN | Northeast | (0.0316, 0.03774) | (−6.835, 12.71) | (12.46, 17.35) | (−5.797, 11.18) | (1.002, 6.749) | (−0.4121, 1.586) | (0.6644, 1.535) | 0.5898 | 75 |
| IN | Pacific | (0.0038, 0.05462) | (−2.707, 18.4) | (6.905, 25.11) | (−5.151, 16.18) | (1.877, 9.767) | (0.2156, 2.296) | (−0.1584, 2.222) | 0.3596 | 75 |
| IN | Southeast | (−0.1054, 0.1207) | (18.19, 40.66) | (−29.94, 55.49) | (23.5, 35.76) | (−12.45, 21.59) | (3.328, 5.075) | (−1.777, 4.912) | 0.1060 | 75 |
| IN | Southwest | (0.0514, 0.06131) | (−26.64, 20.65) | (40.51, 28.18) | (−19.69, 18.16) | (5.901, 10.96) | (1.984, 2.577) | (−0.9046, 2.494) | 0.4021 | 75 |
| IN | WestNorth-Central | (−0.6395, 0.3695) | (243.4, 124.5) | (−329, 169.9) | (89.15, 109.4) | (−6.437, 66.08) | (−4.882, 15.53) | (7.271, 15.03) | 0.0624 | 75 |
| IN | Other | (0.0313, 0.04393) | (−12.06, 14.8) | (19.74, 20.19) | (−8.715, 13.01) | (1.586, 7.856) | (0.4151, 1.847) | (0.134, 1787) | 0.5267 | 75 |
| LO | EastNorth-Central | (−0.3055, 0.5293) | (48.98, 186.7) | (−90.43, 250.5) | (47.98, 156.6) | (−10.56, 96.35) | (11.62, 6873) | (−7.979, 13.1) | 0.0648 | 75 |
| LO | Medeast | (−0.3055, 0.5293) | (48.98, 186.7) | (−90.43, 250.5) | (47.98, 156.6) | (−10.56, 96.35) | (11.62, 6873) | (−7.979, 13.1) | 0.0648 | 75 |
| LO | Mountain | (−0.3055, 0.5293) | (48.98, 186.7) | (−90.43, 250.5) | (47.98, 156.6) | (−10.56, 96.35) | (11.62, 6873) | (−7.979, 13.1) | 0.0648 | 75 |
| LO | Northeast | (−0.3055, 0.5293) | (48.98, 186.7) | (−90.43, 250.5) | (47.98, 156.6) | (−10.56, 96.35) | (11.62, 6873) | (−7.979, 13.1) | 0.0648 | 75 |
| LO | Pacific | (−0.3055, 0.5293) | (48.98, 186.7) | (−90.43, 250.5) | (47.98, 156.6) | (−10.56, 96.35) | (11.62, 6873) | (−7.979, 13.1) | 0.0648 | 75 |
| LO | Southeast | (−0.3055, 0.5293) | (48.98, 186.7) | (−90.43, 250.5) | (47.98, 156.6) | (−10.56, 96.35) | (11.62, 6873) | (−7.979, 13.1) | 0.0648 | 75 |
| LO | Southwest | (−0.3055, 0.5293) | (48.98, 186.7) | (−90.43, 250.5) | (47.98, 156.6) | (−10.56, 96.35) | (11.62, 6873) | (−7.979, 13.1) | 0.0648 | 75 |
| LO | WestNorth-Central | (−0.3055, 0.5293) | (48.98, 186.7) | (−90.43, 250.5) | (47.98, 156.6) | (−10.56, 96.35) | (11.62, 6873) | (−7.979, 13.1) | 0.0648 | 75 |
| LO | Other | (−0.3055, 0.5293) | (48.98, 186.7) | (−90.43, 250.5) | (47.98, 156.6) | (−10.56, 96.35) | (11.62, 6873) | (−7.979, 13.1) | 0.0648 | 75 |
| MF | EastNorth-Central | (0.0166, 0.0996) | (3.998, 33.16) | (−9.819, 44.96) | (−2.813, 28.61) | (6.447, 17.54) | (6.523, 4.059) | (−3.184, 3.68) | 0.2098 | 75 |
| MF | Medeast | (0.0313, 0.0437) | (−3.743, 14.56) | (5.203, 19.74) | (1.481, 12.56) | (−1.325, 7.7) | (2.564, 1.781) | (−3.07, 1.616) | 0.5038 | 75 |
| MF | Mountain | (0.7792, 1.014) | (−95.55, 337.8) | 231, 458.10 | (−216, 291.4) | (95.98, 178.7) | (−70.08, 41.35) | (56.17, 37.49) | 0.0676 | 75 |
| MF | Northeast | (0.0304, 0.06501) | (−10.67, 21.65) | (11.14, 29.35) | (9.934, 18.68) | (−9.706, 11.45) | (−3.588, 2.65) | (3.879, 2.402) | 0.3543 | 75 |
| MF | Pacific | (−0.0103, 0.0504) | (32.94, 16.79) | (−36.35, 22.76) | (0.9312, 12.48) | (4.945, 8.878) | (−5.162, 2.055) | (3.543, 1.863) | 0.4603 | 75 |
| MF | Southeast | (0.0439, 0.04579) | (−14.77, 15.25) | (19.41, 20.68) | (−1.474, 13.16) | (−2.416, 8.066) | (−1.468, 1.867) | (1.816, 1.863) | 0.5323 | 75 |
| MF | Southwest | (0.0059, 0.03051) | (−7.006, 10.16) | (9.437, 13.78) | (3.987, 8.765) | (−4.617, 5.374) | (−2.145, 1.244) | (1.353, 1.127) | 0.6830 | 75 |
| MF | WestNorth-Central | (0.2548, 0.232) | (−39.65, 77.27) | (60.05, 104.8) | (−14.63, 66.66) | (−1.378, 40.87) | (−14.81, 9.458) | (11.77, 8.574) | 0.1224 | 75 |
| MF | Other | (0.0139, 0.02974) | (7.54, 9.903) | (−9.377, 13.43) | (1.104, 8.543) | (1.843, 5.238) | (−0.5301, 1.212) | (0.4456, 1.099) | 0.6890 | 75 |
| OF | EastNorth-Central | (1.56, 1.739) | (−168.6, 576) | (306.1, 776.8) | (−345.9, 489.8) | (206.5, 300.7) | (66.74, 90.17) | (−60.42, 97.56) | 0.0265 | 75 |
| OF | Medeast | (0.0206, 0.0572) | (12.96, 18.94) | (−4.756, 25.55) | (−28.49, 16.11) | (21.65, 9.888) | (−2.503, 2.965) | (2.194, 3.208 ) | 0.4341 | 75 |
| OF | Mountain | (1.813, 1.692) | (−1679, 560.5) | (241.5, 756) | (−686.4, 476.7) | (−85.75, 292.6) | (−34.3, 87.75) | (76.26, 94.94) | 0.2327 | 75 |
| OF | Northeast | (0.4016, 0.3279) | (−53.1, 108.6) | (85.2, 146.5) | (−59.94, 92.39) | (29.44, 56.71) | (10.1, 17.01) | (−9.823, 18.4) | 0.0591 | 75 |
| OF | Pacific | (0.05555, 0.2091) | (45.13, 69.25) | (−23.62, 93.4) | (−81.17, 58.9) | (60.6, 36.15) | (9.168, 10.84) | (−8.922, 11.73) | 0.1157 | 75 |
| OF | Southeast | (0.1444, 0.09013) | (−25.81, 29.86) | (47.97, 40.27) | (−43.38, 25.39) | (22.24, 15.59) | (1.457, 4.674) | (−1.099, 5.057) | 0.3187 | 75 |
| OF | Southwest | (−0.4247, 0.3109) | (105.4, 103) | (−184.7, 138.9) | (143.9, 87.59) | (−70.08, 53.77) | (4.7, 16.12) | (0.8652, 17.45) | 0.0668 | 75 |
| OF | WestNorth-Central | (−0.5166, 0.2543) | (192.6, 84.26) | (−252, 113.6) | (31.49, 71.65) | (21.07, 43.98) | (17.8, 13.19) | (−11.13, 14.27) | 0.1718 | 75 |
| OF | Other | (−0.8069, 0.7254) | (114.6, 240.3) | (−166, 324.1) | (80.64, 204.3) | (−32.13, 125.4) | (−26.85, 37.62) | (29.09, 40.07) | 0.0114 | 75 |
| OT | EastNorth-Central | (−0.1071, 0.1256) | (16.68, 44.31) | (−36.02, 59.45) | (44.1, 37.16) | (−26, 22.86) | (0.3296, 1.631) | (1.695, 3.11) | 0.1069 | 75 |
| OT | Medeast | (0.0504, 0.04711) | (−9.753, 16.62) | (24.34, 22.3) | (−16.63, 13.94) | (4.015, 8.575) | (0.6139, 0.6117) | (−1.468, 1.166) | 0.5308 | 75 |

TABLE B2c-continued

Regression coefficients of expression (14). Numbers in parentheses are standard errors.
Observation period is from June 1998 to October 2004. The property types are: industry
(IN), lodging (LO), multifamily (MF), office (OF), other (OT), and retail (RT).

| Property | Region | Intercept, ($\alpha_1$, stderr) | ($\alpha_2$, stderr) | ($\alpha_3$, stderr) | ($\alpha_4$, stderr) | ($\beta$, stderr) | ($\gamma$, stderr) | $R^2$ | N |
|---|---|---|---|---|---|---|---|---|---|
| OT | Mountain | (0.0893, 0.06231) | (−11.83, 21.98) | (32.22, 29.49) | (−38.08, 18.43) | (19.91, 11.34) | (0.8232, 0.8091) | (−1.872, 1.543) | 0.4150 | 75 |
| OT | Northeast | (0.0359, 0.04572) | (1.489, 16.13) | (−3.133, 21.64) | (4.219, 13.53) | (−1.666, 8.322) | (0.8749, 0.536) | (−0.7265, 1.132) | 0.4971 | 75 |
| OT | Pacific | (0.0352, 0.03767) | (5.212, 13.29) | (−7.672, 17.83) | (2.533, 11.15) | (1.391, 6.857) | (1.397, 0.4891) | (−1.789, 0.9327) | 0.6140 | 75 |
| OT | Southeast | (0.09568, 0.0567) | (−24.86, 20) | (34.44, 26.83) | (−11.8, 16.77) | (3.631, 10.32) | (1.725, 07362) | (−1.907, 1.404) | 0.4792 | 75 |
| OT | Southwest | (0.0231, 0.02352) | (2.555, 8.296) | (−6.806, 11.13) | (10.19, 6.958) | (−4.944, 4.281) | (0.9165, 0.3054) | (−0.851, 0.5823) | 0.7918 | 75 |
| OT | WestNorth-Central | (0.5689, 0.461) | (−146.2, 162.6) | (212.5, 218.2) | (−91.69, 136.4) | (22.28, 83.92) | (1.491, 5.986) | (3.833, 11.41) | 0.0612 | 75 |
| OT | Other | (0.0493, 0.04046) | (−1.259, 14.27) | (1.192, 19.15) | (0.564, 1197) | (0.9337, 7.365) | (1.5440, 0.5254) | (−1.871, 1.002) | 0.5950 | 75 |
| RT | EastNorth-Central | (−0.1237, 0.1823) | (−19.97, 56.76) | (6.537, 77.06) | (42.19, 49.07) | (−33.09, 29.95) | (1.767, 4.592) | (3.329, 5.446) | 0.1132 | 75 |
| RT | Medeast | (0.05518, 0.0548) | (15.2, 17.06) | (−20.3, 23.17) | (3.289, 14.75) | (2.871, 9.003) | (−1.254, 1.38) | (1.327, 1.637) | 0.4591 | 75 |
| RT | Mountain | (0.07726, 0.1049) | (48.03, 32.68) | (−35.57, 44.36) | (−53.32, 28.25) | (42.29, 17.24) | (−0.7357, 2.644) | (0.6266, 3.135) | 0.3269 | 75 |
| RT | Northeast | (0.0435, 0.05892) | (−8.798, 18.35) | (10.85, 24.91) | (3.574, 15.86) | (−4.864, 9.68) | (0.3216, 1.484) | (0.01607, 1.76) | 0.4191 | 75 |
| RT | Pacific | (0.0773, 0.07086) | (20.35, 22.07) | (−27.72, 29.96) | (7.292, 19.08) | (1.526, 11.64) | (−1.254, 1.785) | (0.9626, 2.117) | 0.3458 | 75 |
| RT | Southeast | (0.0302, 0.03475) | (−10.24, 10.82) | (11.88, 14.69) | (1.244, 9.355) | (−2.465, 5.709) | (−0.2228, 0.8754) | (0.9028, 1.038) | 0.6752 | 75 |
| RT | Southwest | (0.03112, 0.0646) | (−10.25, 20.12) | (5.724, 27.31) | (23.99, 17.39) | (−18.56, 10.61) | (0.0410., 1.628) | (0.09903, 1.93) | 0.3572 | 75 |
| RT | WestNorth-Central | (0.1936, 0.1661) | (−54.22, 51.72) | (53.45, 70.22) | (27.01, 44.72) | (−23.14, 27.29) | (1.965, 4.185) | (−3.587, 4.963) | 0.1782 | 75 |
| RT | Other | (0.0627, 0.05639) | (2.414, 17.56) | (−4.474, 23.84) | (7.736, 15.18) | (−4.581, 9.265) | (0.1454, 1.421) | (−0.0771, 1.685) | 0.4661 | 75 |

3. Default and Prepayment Intensity Processes

The Database includes a history of defaults, prepayments, and loan characteristics on over 50,000 commercial loans. The data provides monthly observations of the relevant commercial loan variables over the time period June 1998 to November 2004. In the Database, defaults are distinct from delinquencies. Delinquencies are classified in as 30-59 days, 60-89 days, and greater than 90 days. For the intensity process estimation, the loan specific characteristics included are: (1) the DSCR, (2) the LTV at securitization, (3) the prepayment restriction (normalized, monthly), (4) a foreclosure survivor bias variable (this is the average foreclosure rate since 1992 for each propertyXregion, constructed from a foreclosure database), (5) the original loan balance, (6) the loan coupon at securitization (only for fixed-rate loans), (7) the loan spread at securitization (only for fixed-rate loans), (8) a dummy variable for property type (Industrial, Lodging, Multifamily, Office, Other), and (9) a dummy variable for geographical location. (There are six property types and nine regions. For the dummy variables, as required, the last property type and region are omitted.)

In addition to the state variables $$\{\overline{H}(t), H_i(t), h_i(t) \text{ for all } i\}$$

discussed above, included in the set of state variables is the spot rate of interest $\{r_t\}$ and a measure of the slope of the yield curve $\{f(t,10 \text{ years}) - r_t\}$. The hazard rate estimation is done separately for fixed-rate and floating-rate loans. As indicated, the loans are further divided into two categories, loans that are rated CTLs and non-CTLs. (All unrated CTLs are treated as non-CTLs.) Rated CTL loans may be treated differently in the default intensity process estimation.

For rated CTL loans, if the name of the parent is unknown, then the loans are treated as before, i.e., as non-CTLs. If the name of the parent is known, then the default process intensity of the loan is replaced by the default process intensity of the known parent. If credit default swap quotes are available, then the default process intensity of the parent is obtained from credit default swap data using the formula $c^{ds}(T)=(1-\delta)\lambda$ where $c^{ds}(T)$ is the default swap spread for tenor T, and where $\delta, \lambda$ are assumed to be constants. If credit default swap quotes are not available, the default. probability estimate supplied by Moody's 2003, Default and Recovery Rates of Corporate Bond Issuers, Feb., Moody's Investors Service, N.Y are used for the parent's credit rating. Recovery rates for senior secured debt of the parent are obtained from Moody's 2003 as well. TABLE B3 contains a summary of the loans contained in the estimation.

TABLE B3

Database Loan Summary

| | CTL = 0 | | CTL = 1 | | All Loans | |
|---|---|---|---|---|---|---|
| | Fixed | Floating | Fixed | Floating | Fixed | Floating |
| Prepaid | 6,701 | 2,177 | 77 | 4 | 6,778 | 2,181 |
| Default | 1,785 | 113 | 48 | — | 1,833 | 113 |
| Total | 53,113 | 2,850 | 1,322 | 6 | 54,435 | 2,856 |

The parameter estimates for the intensity processes (excluding CTLs) are given in TABLES B4a1 and B4a2 for fixed-rate loans and B4b1 and B4b2 for floating rate loans. The signs of these coefficients are as expected. For fixed-rate loans: (i) the higher the loan to value at securitization or prepayment penalties, the higher the likelihood of default and the lower the likelihood of prepayment, (ii) the higher the net operating income, the lower the likelihood of default and the higher the likelihood of prepayment, (iii) the higher the weighted average coupon, the higher the likelihood of both prepayment and default, and (iv) as historical foreclosures increase, the likelihood of future defaults decrease while the likelihood of prepayment increases. Continuing with fixed-rate loans, as the spot rate ($r_t$) increases or the term structure becomes more steep $f(t,10)-r_t$, default is more likely and prepayment is less likely. Lastly, as the property index increases ($H_t(t)$), the likelihood of default declines, and the likelihood of prepayment increases. For floating-rate loans, similar interpretations follow for many of the coefficients. However, because of the smaller sample size (see TABLE B3), less of the coefficients are significantly different from zero. As can be seen in the Tables B4a2 and B4b2 the coefficient related to the current delinquency status for fixed-rate loans was 5.0947 with a standard error of 0.0725 and the coefficient related to the current delinquency status for floating-rate loans was 5.0559 with a standard error of 0.3570 indicating a strong explanatory relationship between the current delinquency status of a CREL and its probability of default in the model embedded in one embodiment of the invention.

TABLE B4a1

Fixed-Rate Prepayment Estimation

| Parameters | CTL = 0 Fixed Rate Prepay | |
|---|---|---|
|  | Estimate | Stderr |
| Intercept (R0 - Retail) | (8.98170) | 0.40260 |
| Current Delinquency Status | (3.36830) | 0.44830 |
| DSCR (at securitization) | (0.00000) | 0.00003 |
| LTV (at securitization) | (0.00476) | 0.00083 |
| NOI (at securitization) | 0.00052 | 0.00163 |
| Normalized Prepay Penalties | (0.00261) | 0.00006 |
| Loan Coupon | 0.52340 | 0.01440 |
| NCREIF Total Return Index | 0.00727 | 0.00413 |
| REIT Index (total) | (0.01100) | 0.00159 |
| REIT Index (property specific) | 0.00504 | 0.00078 |
| ACLI Foreclosure Index | 13.13050 | 1.95750 |
| Loan Coupon Spread | (0.09390) | 0.01510 |
| Loan Balance (at origination) | (0.01720) | 0.01490 |
| Spot Rate | (0.33210) | 0.02620 |
| 10 yr forward Tresury minus Spot | (0.13730) | 0.03610 |
| P1 - Industrial | (0.14910) | 0.07200 |
| P2 - Lodging (a.k.a Hotels) | 0.22020 | 0.12180 |
| P3- Multifamily (a.k.a. Apartments) | 0.82960 | 0.04480 |
| P4 - Office | (0.18890) | 0.06930 |
| P5 - Other | 0.89450 | 0.09070 |
| R1 - East North Central | 1.01350 | 0.19560 |
| R2 - Mideast | 1.44860 | 0.19300 |
| R3 - Mountain | 1.23610 | 0.19390 |
| R4 - Northeast | 1.17210 | 0.19180 |
| R5 - Pacific | 0.99620 | 0.19120 |
| R6 - Southeast | 1.25410 | 0.19250 |
| R7 - Southwest | 1.00860 | 0.19340 |
| R8 - West North Central | 0.97850 | 0.20570 |

TABLE B4a2

Fixed-Rate Default Estimation

| Parameters | CTL = 0 Fixed Default | |
|---|---|---|
|  | Estimate | Stderr |
| Intercept (R0 - Retail) | (9.45090) | 0.79470 |
| Current Delinquency Status | 5.09740 | 0.07250 |
| DSCR (at securitization) | (0.00637) | 0.03510 |
| LTV (at securitization) | (0.01900) | 0.00137 |
| NOI (at securitization) | (0.21860) | 0.07380 |
| Normalized Prepay Penalties | 0.00037 | 0.00006 |
| Loan Coupon | 0.09580 | 0.04240 |
| NCREIF Total Return Index | (0.00040) | 0.00411 |
| REIT Index (total) | 0.00727 | 0.00311 |
| REIT Index (property specific) | (0.01090) | 0.00150 |
| ACLI Foreclosure Index | (2.34450) | 2.90640 |
| Loan Coupon Spread | (0.07500) | 0.04940 |
| Loan Balance (at origination) | 0.03560 | 0.02970 |
| Spot Rate | 0.23760 | 0.04900 |
| 10 yr forward Tresury minus Spot | 0.29340 | 0.06720 |
| P1 - Industrial | 0.68700 | 0.17170 |
| P2 - Lodging (a.k.a Hotels) | (0.04760) | 0.15670 |
| P3- Multifamily (a.k.a. Apartments) | 0.23420 | 0.09150 |
| P4 - Office | 1.02020 | 0.14890 |
| P5 - Other | (1.62100) | 0.16590 |
| R1 - East North Central | 0.36990 | 0.25010 |
| R2 - Mideast | 0.54830 | 0.24790 |
| R3 - Mountain | 0.35070 | 0.25420 |
| R4 - Northeast | 0.05520 | 0.24910 |
| R5 - Pacific | (0.49550) | 0.25780 |
| R6 - Southeast | 0.33160 | 0.24550 |
| R7 - Southwest | 0.41450 | 0.24670 |
| R8 - West North Central | 0.64230 | 0.25930 |

TABLE B4b1

Floating-Rate Prepayment Estimation

| Parameters | CTL = 0 Floating Rate Prepay | |
|---|---|---|
|  | Estimate | Stderr |
| Intercept (R0 - Retail) | (6.3671) | 0.6394 |
| Current Delinquency Status | (13.1326) | 139.8000 |
| DSCR (at securitization) | (0.0177) | 0.0155 |
| LTV (at securitization) | 0.0083 | 0.0015 |
| NOI (at securitization) | 0.1830 | 0.0328 |
| Normalized Prepay Penalties | (0.0037) | 0.0006 |
| NCREIF Total Return Index | 0.0032 | 0.0076 |
| REIT Index (total) | (0.0018) | 0.0033 |
| REIT Index (property specific) | 0.0028 | 0.0016 |
| ACLI Foreclosure Index | (16.6845) | 4.9199 |
| Loan Balance (at origination) | 0.0159 | 0.0216 |
| Spot Rate | 0.0638 | 0.0457 |
| 10 yr forward Tresury minus Spot | 0.1522 | 0.0597 |
| P1 - Industrial | (0.5183) | 0.1501 |
| P2 - Lodging (a.k.a Hotels) | 0.0722 | 0.2051 |
| P3- Multifamily (a.k.a. Apartments) | 0.3268 | 0.0803 |
| P4 - Office | (0.3564) | 0.1498 |
| P5 - Other | 0.1907 | 0.1547 |
| R1 - East North Central | 0.3783 | 0.3011 |
| R2 - Mideast | (0.1640) | 0.3105 |
| R3 - Mountain | 0.6889 | 0.2906 |
| R4 - Northeast | 0.4695 | 0.2883 |
| R5 - Pacific | 0.5151 | 0.2818 |
| R6 - Southeast | 0.7817 | 0.2853 |
| R7 - Southwest | 0.8556 | 0.2904 |
| R8 - West North Central | (0.1363) | 0.4007 |

TABLE B4b2

Floating-Rate Default Estimation

| Parameters | CTL = 0 Floating Rate Default | |
| --- | --- | --- |
| | Estimate | Stderr |
| Intercept (R0 - Retail) | (12.9789) | 3.0905 |
| Current Delinquency Status | 5.0559 | 0.3570 |
| DSCR (at securitization) | (0.2236) | 0.3282 |
| LTV (at securitization) | 0.0095 | 0.0062 |
| NOI (at securitization) | (4.8221) | 2.7889 |
| Normalized Prepay Penalties | 0.0001 | 0.0005 |
| NCREIF Total Return Index | (0.0064) | 0.0217 |
| REIT Index (total) | (0.0330) | 0.0239 |
| REIT Index (property specific) | 0.0224 | 0.0105 |
| ACLI Foreclosure Index | (27.8053) | 14.0505 |
| Loan Balance (at origination) | 0.3518 | 0.1144 |
| Spot Rate | (0.1993) | 0.2654 |
| 10 yr forward Treasury minus Spot | (0.1129) | 0.3519 |
| P1 - Industrial | (0.9416) | 1.2115 |
| P2 - Lodging (a k.a. Hotels) | 3.8788 | 1.2837 |
| P3 - Multifamily (a.k.a. Apartments) | 1.9533 | 0.6686 |
| P4 - Office | 0.4966 | 0.7241 |
| P5 - Other | 3.8361 | 1.2302 |
| R1 - East North Central | (0.6333) | 0.8363 |
| R2 - Mideast | (0.1607) | 0.7603 |
| R3 - Mountain | 0.3260 | 0.7959 |
| R4 - Northeast | 0.1599 | 0.7367 |
| R5 - Pacific | (1.0960) | 0.7786 |
| R6 - Southeast | (0.8201) | 0.7436 |
| R7 - Southwest | (0.0144) | 0.7577 |
| R8 - West North Central | 1.6108 | 0.8022 |

FIGS. 39-42 give the one year default and prepayment probabilities, respectively, for the various loans by property types and geographic location on September 2004. As indicated, for fixed-rate loans: (i) lodging (LO) has the largest likelihood of default across all regions and industrial (IN) has the smallest, while (ii) there is less of a pattern for prepayments—perhaps multifamily (MF) has the largest likelihood of prepayment across all regions. For floating-rate loans, there is no discernable pattern for prepayments, although office properties (OF) appear the most likely to default across most regions.

The intensity process estimations for delinquency and current states are given in the following two tables EE1 and EE2.

TABLE EE1

Current State Intensity Process
Estimation for Fixed-Rate Loans

| Parameters | CTL = 0 Fixed Current | |
| --- | --- | --- |
| | Estimate | Stderr |
| Intercept (R0 - Retail) | 7.1719 | 0.1893 |
| DSCR (at securitization) | 0.0000 | 0.0107 |
| LTV (at securitization) | (0.0169) | 0.0005 |
| NOI (at securitization) | 0.0252 | 0.0056 |
| Normalized Prepay Penalties | 0.0000 | 0.0000 |
| Loan Coupon | (0.4492) | 0.0104 |
| NCREIF Total Return Index | (0.0058) | 0.0012 |
| REIT Index (total) | (0.0048) | 0.0007 |
| REIT Index (property specific) | (0.0010) | 0.0003 |
| ACLI Foreclosure Index | (3.9063) | 0.8085 |
| Loan Coupon Spread | (0.4460) | 0.0122 |
| Loan balance (at origination) | 0.2114 | 0.0071 |
| Spot Rate | 0.7402 | 0.0116 |
| 10 yr forward Treasury minus Spot | 0.2664 | 0.0163 |
| P1 - Industrial | 1.2155 | 0.0461 |
| P2 - Lodging (a k.a. Hotels) | (0.7852) | 0.0422 |
| P3 - Multifamily (a.k.a. Apartments) | 1.0908 | 0.0272 |
| P4 - Office | 1.0598 | 0.0385 |
| P5 - Other | (1.1731) | 0.0340 |

TABLE EE1-continued

Current State Intensity Process
Estimation for Fixed-Rate Loans

| Parameters | CTL = 0 Fixed Current | |
| --- | --- | --- |
| | Estimate | Stderr |
| R1 - East North Central | (1.4579) | 0.0847 |
| R2 - Mideast | (1.0244) | 0.0864 |
| R3 - Mountain | (1.2299) | 0.0860 |
| R4 - Northeast | (0.6132) | 0.0852 |
| R5 - Pacific | (0.1341) | 0.0874 |
| R6 - Southeast | (1.7051) | 0.0840 |
| R7 - Southwest | (1.0288) | 0.0849 |
| R8 - West North Central | (1.6286) | 0.0857 |

TABLE EE2

Delinquent State Intensity
Process Estimation for Fixed-Rate Loans

| Parameters | CTL = 0 Fixed Deliquency | |
| --- | --- | --- |
| | Estimate | Stderr |
| Intercept (R0 - Retail) | (7.1719) | 0.1893 |
| DSCR (at securitization) | (0.0000) | 0.0107 |
| LTV (at securitization) | 0.0169 | 0.0005 |
| NOI (at securitization) | (0.0252) | 0.0056 |
| Normalized Prepay Penalties | (0.0000) | 0.0000 |
| Loan Coupon | 0.4492 | 0.0104 |
| NCREIF Total Return Index | 0.0058 | 0.0012 |
| REIT Index (total) | 0.0048 | 0.0007 |
| REIT Index (property specific) | 0.0010 | 0.0003 |
| ACLI Foreclosure Index | 3.9063 | 0.8085 |
| Loan Coupon Spread | 0.4460 | 0.0122 |
| Loan Balance (at origination) | (0.2114) | 0.0071 |
| Spot Rate | (0.7402) | 0.0116 |
| 10 yr forward Tresury minus Spot | (0.2664) | 0.0163 |
| P1 - Industrial | (1.2155) | 0.0461 |
| P2 - Lodging (Hotels) | 0.7652 | 0.0422 |
| P3 - Multifamily (Apartments) | (1.0908) | 0.0272 |
| P4 - Office | (1.0598) | 0.0385 |
| P5 - Other | 1.1731 | 0.0340 |
| R1 - East North Central | 1.4579 | 0.0847 |
| R2 - Mideast | 1.0244 | 0.0854 |
| R3 - Mountain | 1.2299 | 0.0860 |
| R4 - Northeast | 0.6132 | 0.0852 |
| R5 - Pacific | 0.1341 | 0.0874 |
| R6 - Southeast | 1.7051 | 0.0840 |
| R7 - Southwest | 1.0288 | 0.0849 |
| R8 - West North Central | 1.6266 | 0.0857 |

4. The Recovery Rate

The final parameter, related to the default intensity, needed for valuation is the recovery rate. Based on the one-thousand nine-hundred and forty-six (1.946) defaults in the Database, the average recovery exhibited was 0.65. The Generic Engine in this embodiment also requires a time to recovery; this time to recovery is set as 12 months which was slightly less than the average time to recovery exhibited in the Database for the defaulted loans of 15.42 months, The recovery rate process is estimated using a linear regression $1-\delta_t^i = \alpha_0 + \alpha_1 U_t^i + \alpha_2 X_t$ where $\alpha_0, \alpha_1, \alpha_2$ are vectors of constants. Table FF1 gives the estimates of the Loss Severity Model and Table FF2 summarizes the average simulation results across all fixed-rate loans across all property types from July 2001 thru September 2004.

TABLE FF1

| | Loss Severity Model | | |
|---|---|---|---|
| Variable | Estimate | StdError | t-Value |
| Intercept (P0 - Retail) | 0.1591 | 0.2290 | 0.6900 |
| LTV (at securitization) | 0.0009 | 0.0003 | 3.3500 |
| NCREIF Total Return Index | 0.0013 | 0.0017 | 0.7900 |
| REIT Index (total) | 0.0011 | 0.0012 | 0.8900 |
| REIT Index (property specific) | 0.0019 | 0.0007 | 2.7900 |
| Loan Balance (at origination) | −0.0016 | 0.0027 | −0.6000 |
| Spot Rate | −0.0562 | 0.0205 | −2.7400 |
| 10 yr forward Tresury minus Spot | −0.0115 | 0.0301 | −0.3800 |
| P1 - Industrial | −0.0386 | 0.0702 | −0.5500 |
| P2 - Lodging (a.k.a. Hotels) | 0.3389 | 0.0787 | 4.3100 |
| P3 - Multifamily (a.k.a. Apartments) | 0.0821 | 0.0414 | 1.9800 |
| P4 - Office | 0.0445 | 0.0528 | 0.8400 |
| P5 - Other | 0.2637 | 0.0805 | 3.2800 |
| R1 - East North Central | −0.2301 | 0.1734 | −1.3300 |
| R2 - Mideast | −0.3295 | 0.1726 | −1.9100 |
| R3 - Mountain | −0.2536 | 0.1743 | −1.4600 |
| R4 - Northeast | −0.3231 | 0.1735 | −1.8600 |
| R5 - Pacific | −0.2695 | 0.1756 | −1.5300 |
| R6 - Southeast | −0.2069 | 0.1717 | −1.2000 |
| R7 - Southwest | −0.2761 | 0.1721 | −1.6000 |
| R8 - West North Central | −0.0118 | 0.1741 | −0.0700 |

TABLE FF2

Average Simulated Loss Severities based on
Loss Severity (July 2001 thru September 2004)

| Property Type | Avg. Loss Severity |
|---|---|
| P1 - Industrial | 33.18% |
| P2 - Lodging (a.k.a. Hotels) | 46.18% |
| P3 - Multifamily (a.k.a. Apartments) | 25.77% |
| P4 - Office | 38.43% |
| P5 - Other | 43.69% |
| P0 - Retail | 27.35% |

(c) The Simulation

Given the parameter estimates from the previous section, the next step is to compute the values of the CML and the CMBS bonds using expressions (3) and (4). As illustrated in below, the state contingent cash flow allocations to the various CMBS bond tranches is quite complicated, and it differs depending upon the CMBS trust. Furthermore, at any given date, the future cash flows will also depend on the history of the previous payments for each of the existing CMBS trusts. To circumvent these obstacles, a generic scenario generating software is used. This software tracks all CMBS trusts (archiving the loan pool history), and it provides a method for modifying the loan pool payments in order to determine its influence on the CMBS bond cash flows.

In particular, for each existing CMBS trust, this software enables the user to input a scenario for each of the underlying loans. The outputs are the cash flows to the various bond tranches (including changes in yields due to the scenario modification). As such, this provides the intermediate step in the simulation algorithm (discussed below). Using the above modeling structure and parameter estimates, 10,000 different scenarios are generated to input into the software, (10,000 scenarios were selected because the standard error of a simulation converges to zero at the rate $$1/\sqrt{N}.$$

For N=10,000, the error will be no larger than 1 percent of the resulting values.) The resulting cash flows to the loans and bonds, enable the computation of expressions (3) and (4) as discounted averages over the set of simulated scenarios. The simulation algorithm is now described in more detail.

Step 1. Generate sample paths for $$W_1(t), \ldots, W_4(t), Z^H(t), Z_1^H(t), \ldots, Z_6^H(t), Z_1^h(T), \ldots, Z_{54}^h(t)$$

over a time period t=0, ..., T representing thirty-seven (37) years. These sample paths are generated under the martingale measure.

Step 2. Given the Brownian motion paths, generate sample paths for the term structure of interest rates using expressions (5)-(7) and the state variables using expressions (8)-(10).

Step 3. Given the state variables and term structure of interest rate paths, compute $$\lambda(t, U_t^i, X_t), \eta(t, U_t^i, X_t).$$

Step 4. Generate E for i=1, ..., 2×(number of loans in database) independent unit exponential random variables. Compute $$\tau_d = \inf\left\{t > 0: \int_0^t \lambda(s, U_s^i, X_s) \geq E_i\right\}$$

for i=1, ..., (number of loans in database) and $$\tau_p = \inf\left\{t > 0: \int_0^t \eta(s, U_s^i, X_s) \geq E_i\right\}$$

for i=(number of loans in database)+1, ..., 2×(number of loans in database). Set δ=0.79 and set the time to recovery to six (6) months.

Step 5. Input $$(r_t)_{t=1}^T,$$

min($\tau_d,\tau_p$), and δ into the software.

Step 6. Collect the cash flows in expression (1) for the CRELs and expression (4) for the CMBS bonds. Denote the cash flows for any of these securities by $$(V_t(\omega))_{t=1}^T$$

for the scenario ω.

Step 7. Repeat Steps 1-6 ten-thousand (10,000) times. Compute time 0 values of the securities using $$\sum_\omega \left( \sum_{t=1}^T V_t(\omega) e^{-\int_0^t r_s(\omega) dx} \right) \frac{1}{10{,}000}.$$

In another embodiment, the simulation process includes the simulation of the delinquency status of the loan, a stochastic recovery rate, and the inclusion of rated CTLs. The following additional steps are inserted.

Step 2a. This step is added after step 2. Given the state variables and term structure of interest rate paths, compute $\lambda_c(t,U_t,X_t), \lambda_l(t,U_t,X_t)$. Generate $E_i$ for i=1, ..., 2×(number of loans in database) independent unit exponential random variables. Assuming the loan starts in the current status. Compute $$\tau_l = \inf\left\{t > 0 : \int_0^t \lambda_l(s, U_s^i, S_s) ds \geq E_i\right\}$$

for i=1, ..., (number of loans in database). Generate $E_i$ for i=1, ..., 2×(number of loans in database) independent unit exponential random variables. If $\tau_l \geq T$, then stop. If $\tau_l < T$, then starting at $\tau_l$, generate $E_i$ for i=1, ..., 2×(number of loans in database) independent unit exponential random variables. Compute $$\tau_c = \inf\left\{t > \tau_l : \int_0^t \lambda_c(s, U_s^i, S_s) ds \geq E_i\right\}$$

for i=1, ..., (number of loans in database).

If $\tau_c \geq T$, then stop. If $\tau_c < T$, repeat the process for $\tau_l$. Continue in this fashion until time T is reached. This simulation generates the point process $N_t^i$ used in the default and intensity process simulation in step 3.

Step 4. The recovery rate process is simulated differently in this step. On the default date of the loan, if default occurs, the formula $\delta(\tau, U_\tau, X_\tau)$ is used.

Step 4a. This step is added after step 4. Check to see if the loan is a rated CTL with a known parent. If yes, then replace the default intensity of the loan as obtained in step 4 with the default intensity as determined by either credit default swap data or loan default rate data made available to the public by the rating agencies. If yes, then replace the recovery rate process as obtained in step 4 with the recovery rate from recovery rate data relating to CRELs made available to the public by the rating agencies.

Step 4b. This step is added after step 4a. Before running the data through the generic software engine in this embodiment of the invention, stratified sampling is used to reduce the number of simulations runs from 10,000 to 2,000. The sample is stratified based on the number of loans defaulting in any deal. Then, from this stratification of the scenarios, one fifth (⅕) of the elements are randomly sampled in each stratified subset, taking into account discreteness of the observations.

Step 4c. Run the 0/0 scenario (no defaults, no prepayments) through the generic software engine in this embodiment of the invention to determine the cash flows to all loans as if they cannot default or prepay. Call these cash flows at time t, $X_t$. Using forward rates compute the present value of these cash flows, call this PV(X).

Step 5. This step is enhanced due to step 4b. Instead of running the simulation 10,000 times, the simulation is run only 2,000 times.

Step 6. Input $(r_t)_{t=1}^T$, $\min(\tau_d^i, \tau_p^i)$, and $\delta^i$ into the generic software engine in this embodiment of the invention.

Step 7. This step is enhanced due to step 5 and a variance reduction technique using step 4c. Due to step 5, only the cash flows over 2000 simulation trials are averaged. From step 4c, the time 0 estimate is replaced with a control variate estimate:

$$\sum_\omega \left( \sum_{t=1}^T V_t(\omega) e^{-\int_0^t r_s(\omega) ds} - b\left[X_t e^{-\int_0^t r_s(\omega) ds} - PV(X)\right] \right) \frac{1}{2000}$$

where b is obtained from the regression $$V_t(\omega) e^{-\int_0^t r_s(\omega) ds} = a + b\left[X_t e^{-\int_0^t r_s(\omega) ds}\right] + e_t \text{ for } t = 1, \ldots, T.$$

Figure 43:
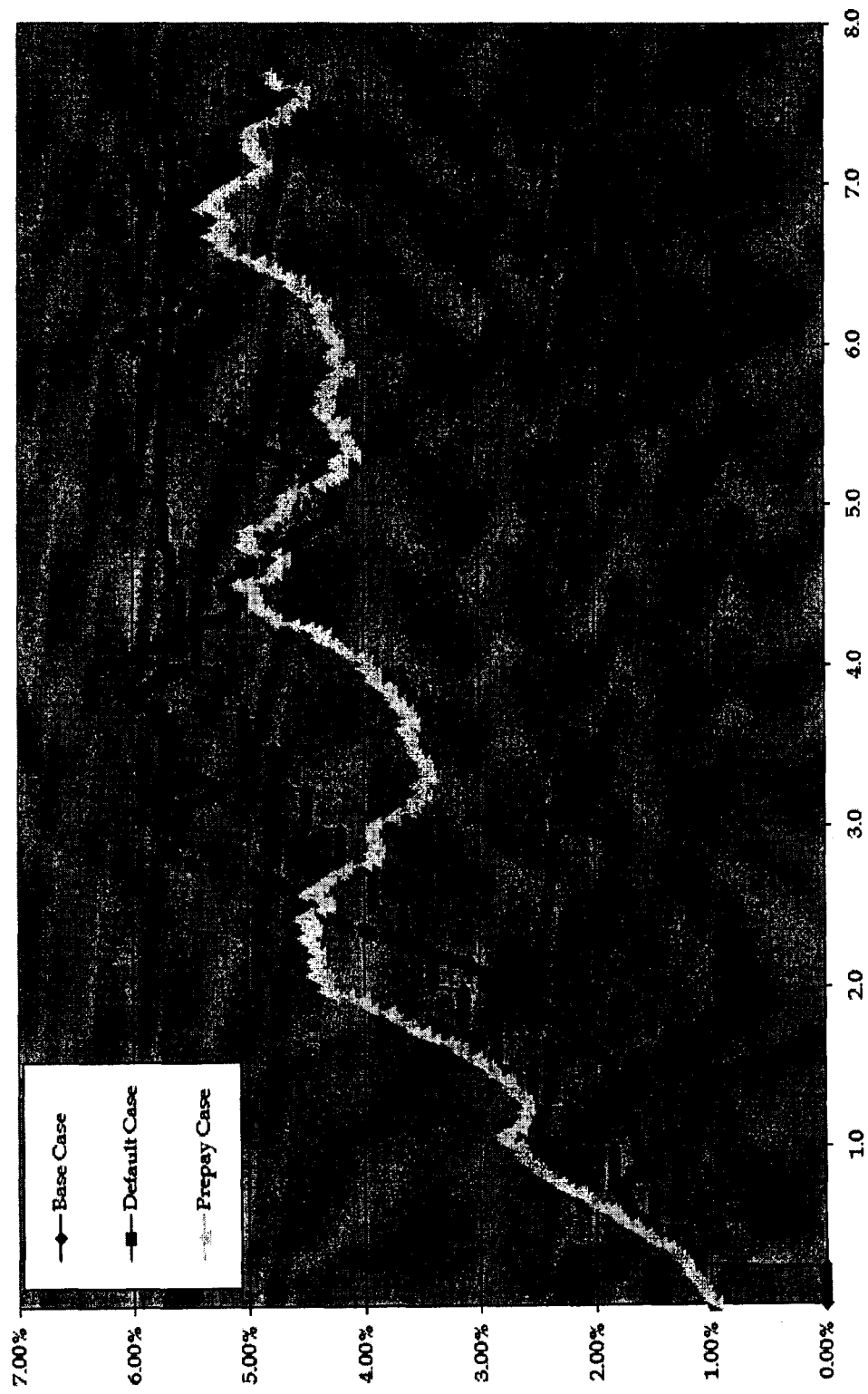
FIGS. 43 and 44 are schematic graphical representations three path evolutions and the associated cashflows for a single loan under each of the three paths.
Figure 44:
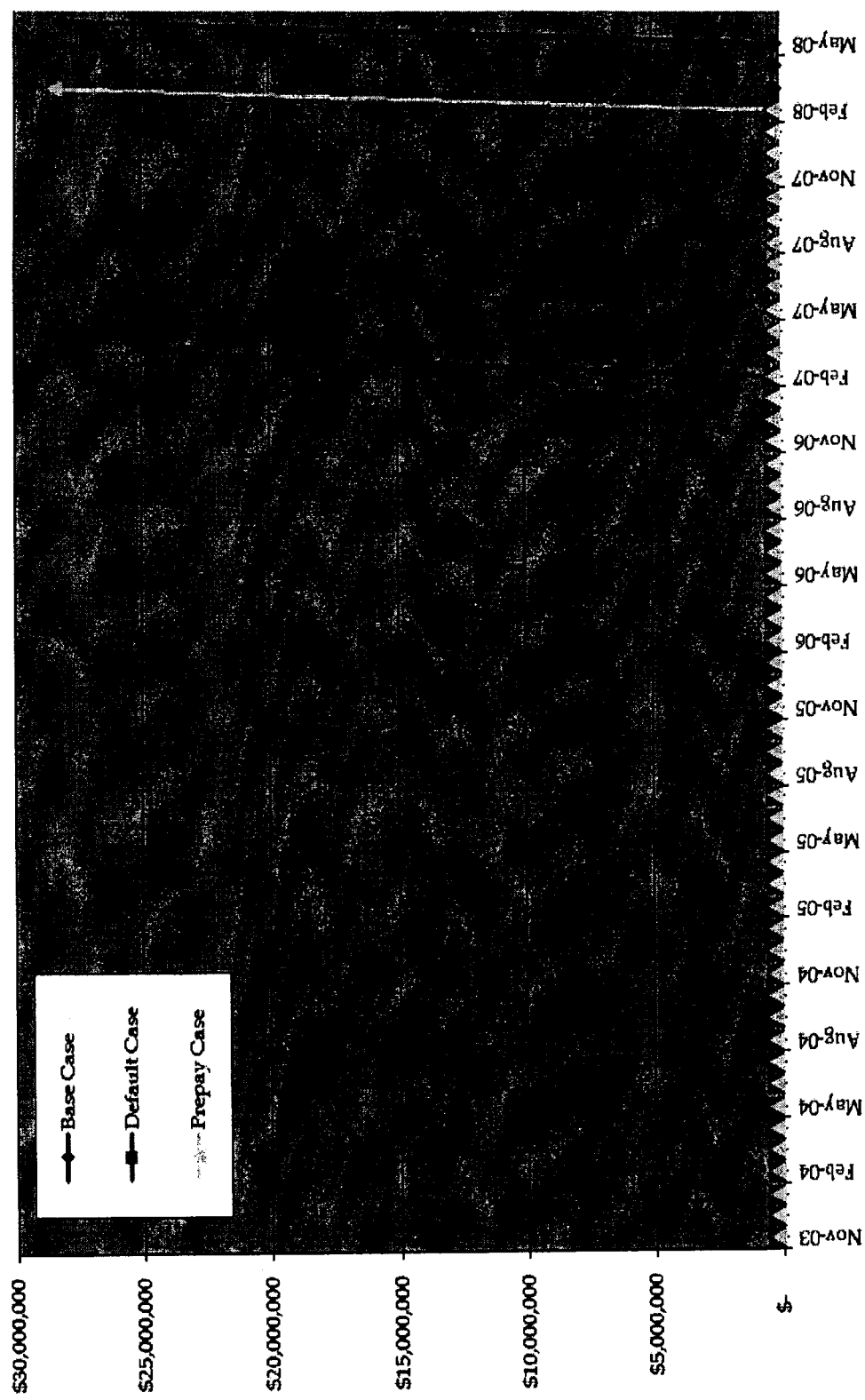

Given that the above simulation is done for each loan in a CMBS loan pool, aggregating to generate the loan pool's cash flow (approximately one-hundred and fifty (150) loans per pool), then generating the all bond tranches cash flows (approximately ten (10) bonds per trust), across all CMBS trusts (approximately three-hundred and fifty (350) trusts), this simulation results in a large computational exercise. To facilitate this computation, this simulation is performed on a cluster of PCs using parallel processing. Because the traded objects are independent from one another, they are ideally suited to a parallelizable computational approach versus a sequential approach vis a vis traditional supercomputing, discussed more fully in Section V.d.1. For the entire Database, Steps 1-7 take approximately 7.5 hours to complete with a 16 node 4.0 GhZ cluster. FIG. 43 and FIG. 44 each give a summary representation of three path evolutions and the associated cashflows for a single loan under each of the three paths.

(d) Valuation Results

This section investigates the performance of the CMBS pricing model using historical data and market prices for the CMBS bonds from July 2001 to January 2003. For each month over this observation period, starting with July 2001, the model's parameters are estimated using only data available to the market at that time. With these estimates, the CMBS bond prices (denoted $b_i(t)$ from expression (4)) are computed as explained above and compared to the market prices at that date (denoted $m_i(t)$).

The market prices were obtained from the Database. This procedure is repeated for every month in the back-testing period. For this back-testing, there are a total of 850 bonds from 54 distinct trusts (the bond index is i=1, ..., 850 and the monthly time index is t=0, ..., 21). In addition to computing CMBS bond prices, the CMBS bonds' deltas, convexity, duration and weighted average lives were also computed.

(The formulas are at time 0: $\text{delta}_i = \partial b_i(0)/\partial r_0$, $$\text{convexity}_i = \frac{\frac{\partial \text{delta}_i(0)}{\partial r_s}}{b_i(0)},$$

$$WAL_t = \frac{1}{\text{principal}} \sum_\omega \left( \sum_{t=1}^T t \cdot \text{principal payments}_t(\omega) \right) \frac{1}{10{,}000},$$

, and $$\text{Duration}_i = \sum_{t=1}^T \frac{t \cdot \text{promised } cashflow_1}{(1+y_i/2)^i} \frac{1}{b_i(t)} \frac{1}{(1+y_t/2)}$$

where $y_i$ is the CMBS bond's yield at time 0. The yield is determined as that rate that equates the present value (semi-annual compounding) of the bond's promised cash flows to the model price.) These computations generate the data for the subsequent analyses.

1. Goodness of Fit

For evaluating the model performance, a time series of the pricing differences $$\theta_i(t) = m_i(t) - b(t) \text{ for all } i \text{ and } 1. \tag{19}$$

was computed.

These differences are summarized in TABLES B5a and B5b. TABLE B5a groups the average $\theta_i(t)$ across time based on ratings, while TABLE B5b groups the average $\theta_i(t)$ across time based on the weighted average life (WAL). Since the par value of the bond is 100, these errors can be interpreted as percentages. For example, for "a1" in TABLE B5a, the "percentage" pricing error is −10.3543. As indicated, for either grouping of the bonds, there is a significant bias in the model's price. The model appears to overvalue the bonds.

TABLE B5 a

| rating | N | avg(θ) | std(θ) |
|---|---|---|---|
| a1 | 20 | −10.3543 | 1.7323 |
| a2 | 20 | −10.3611 | 1.6796 |
| a3 | 20 | −11.5547 | 1.9094 |
| aa1 | 20 | −8.0416 | 1.8921 |
| aa2 | 20 | −9.1116 | 1.4585 |
| aa3 | 20 | −10.1901 | 1.6823 |
| aaa | 20 | −3.8830 | 0.7804 |
| ba1 | 12 | −29.8503 | 3.6382 |
| baa1 | 20 | −13.1644 | 1.9293 |
| baa2 | 20 | −14.0172 | 1.7902 |
| baa3 | 20 | −16.9070 | 2.0302 | b

| WAL | N | avg(θ) | std(θ) |
|---|---|---|---|
| 2.5< | 20 | −1.4419 | 0.3520 |
| 2.5-5.5 | 20 | −3.6332 | 0.6020 |
| 5.5-7.5 | 20 | −6.5782 | 0.8208 |
| 7.5-11 | 20 | −11.2644 | 1.4057 |
| >11 | 20 | −19.4378 | 2.4476 |

This bias can be due to either market mispricing or model error. To understand the possible causes of any model error, it is necessary to recall the specifics of the model structure. The model structure explicitly incorporates interest rate, credit, and prepayment risk. However, due to the frictionless and competitive market assumption, it excludes liquidity risk. Consequently, the $\theta_i(t)$ differences could be due to this omission. As shown in Cetin, Jarrow, Protter (U. Cetin, R. Jarrow, P. Protter, 2003, "Liquidity Risk and Arbitrage Pricing Theory," working paper, Cornell University), liquidity risk can generate such a bias between model prices, based on the classical model with no liquidity risk, and market prices.

In addition, there are two alternative potential sources of model error. The first is related to the recovery rate and the second is related to the default intensity. In one testing of the model data limitations required the use of a recovery rate on each bond is approximated by the average recovery rate across all loans over the observation period ($\square = 0.65$). Although this provides an unbiased estimate of the recovery rate, this estimate does not reflect the different bonds' characteristics. Although for any particular bond the recovery rate will be in error, on average it is expected that this assumption leaves $\theta_i(t)$ unbiased. Secondly, in valuing the CMBS bond's cash flows, the intensity process estimated under the statistical measure (and not the intensity process under the martingale measure) is used. If default risk is not diversifiable, then this would introduce a positive pricing error in $\theta_i(t)$.

Given the complexity of the model construction and the inherent limitations of the CMBS database, the procedure discussed in by Jacquier and Jarrow (E. Jacquier and R. Jarrow, 2000, "Bayesian Analysis of Contingent Claim Model Error," journal of Econometrics, 94, 145-180) is used to generate an extended pricing and hedging model. The extended model, denoted $$[\hat{b}_i(t),$$

is obtained via the expression $$\hat{b}_i(t) = b_i(t) + \bar{\theta}_{rating}(t) \tag{20}$$

where $$\bar{\theta}_{rating}(t) \equiv \frac{\left( \sum_{j \in rating\ class} \theta_j(t) \right)}{N(t)}$$

and N (t) equals the number of bonds at time t in the same rating class to which bond i belongs.

The intuition underlying this extended model is that any model error due to liquidity risk, non-diversifiable default risk, and/or the recovery rate is captured by the average mispricing with respect to the bond's rating. It is conjectured that the bond's rating will be correlated with all of these model misspecifications. Indeed, market liquidity is related to a bond's rating because institutions often restrict their investments to investment grade bonds. Furthermore, empirical studies have documented a correlation between a bond's rating and its recovery rate and default risk premium (see Moody's Special Report, 1972, "Corporate Bond Defaults and Default Rates," Moody's investors Service, N.Y.) and S. Chava and R. Jarrow, 2002, "Default Event Risk, Conditional Diversification and Expected Returns on Defaultable Bonds; A Comparison of Historical and Bond-Implied Estimates," working paper, Cornell University).

Using this extended model, the relevant pricing differences for model performance are now given by $$\varepsilon_i(t) = m_i(t) + \hat{b}_i(t) \text{ for all } i \text{ and } t \quad (21)$$

By construction, the average pricing error $\epsilon_i(t)$ for a rating class is zero, i.e., the new model prices the rating classes correctly.

TABLE B5c contains summary statistics for $\epsilon_i(t)$ grouped by WAL. As indicated, the percentage pricing error is reduced from that in TABLE B5b, although it is still significantly different from zero for all WAL groupings. This difference could be due to remaining model error, or the market could be systematically mispricing the bonds. The next section, where the existence of trading profits based on these pricing errors is explored, distinguishes between these two possibilities.

TABLE B5c

| WAL | N | avg($\epsilon$) | std($\epsilon$) |
|---|---|---|---|
| 2.5< | 20 | 2.3911 | 0.4698 |
| 2.5-5.5 | 20 | 0.4029 | 0.1659 |
| 5.5-7.5 | 20 | 1.3652 | 0.3177 |
| 7.5-11 | 20 | −0.6862 | 0.2692 |
| >11 | 20 | −5.5279 | 1.314 |

Before that, however, as a robustness check a time series regression was performed on the pricing errors for each bond i as given in the following expression.

$$\epsilon_i(t) = c_0 + c_1 r_t + c_2 \cdot \mathrm{conv}_i(t) + c_3 \cdot \mathrm{WAL}_i(t) \quad (22)$$

where $\mathrm{conv}_t(t)$ is bond is convexity at time t, and $\mathrm{WAL}_i(t)$ is bond i's weighted average life at time t. TABLE B6 contains the average coefficients, the average t-scores, and the average $R^2$ from these regressions, grouped by rating categories. On average, almost all of the coefficients have insignificant t-scores (less than 2). It appears that the remaining pricing errors are not correlated with spot interest rates or the bonds' characteristics. In contrast to TABLE B5a where the pricing errors appear to be exhibit a relationship to WAL, the coefficients of $\mathrm{WAL}_i(t)$ in this regression are, on average, insignificantly different from zero.

TABLE B6

| Rating | N | intercept | 3m spot | conv | wal | t(int) | t(3mspot) | t(conv) | t(wal) | $\hat{R}^2$ |
|---|---|---|---|---|---|---|---|---|---|---|
| a1 | 14 | −35.9695 | 2.4291 | −0.9070 | 9.4464 | −0.051 | −0.125 | 0.140 | −0.108 | 0.57 |
| a2 | 138 | −7.5780 | −1.1642 | −0.0762 | 2.0668 | −0.148 | 0.028 | −0.822 | 0.528 | 0.70 |
| a3 | 107 | −16.1717 | 0.0852 | −0.3174 | 4.0252 | −0.4358 | 0.085 | −0.270 | 0.168 | 0.76 |
| aa1 | 8 | −9.0329 | −0.0090 | −0.3302 | 3.0836 | −2.889 | −1.665 | −1.528 | 2.013 | 0.93 |
| aa2 | 140 | −5.3694 | 0.6549 | −0.1685 | 1.5563 | −0.219 | −0.171 | −0.611 | 0.460 | 0.78 |
| aa3 | 18 | −2.5098 | 0.6459 | −0.1620 | 0.9650 | −1.898 | 0.837 | −1.061 | 1.124 | 0.84 |
| aaa | 142 | −0.5402 | 0.9300 | −0.2459 | 0.8051 | 0.0538 | 1.712 | −15.535 | 7.303 | 0.88 |
| ba1 | 6 | 3.5131 | 6.9361 | 1.0917 | −0.9437 | −1.377 | 0.945 | −0.310 | 0.195 | 0.97 |
| baa1 | 44 | 0.9414 | 2.2790 | 0.2400 | −1.7880 | 1.226 | 0.880 | 0.642 | −1.246 | 0.72 |
| baa2 | 137 | −14.9488 | 0.1165 | −0.2362 | 3.0938 | 0.902 | 0.680 | 0.109 | −0.804 | 0.70 |
| baa3 | 130 | −2.0563 | 0.3526 | −0.0238 | 0.4405 | 1.524 | −0.223 | 0.339 | −1.021 | 0.77 |

2. Trading Strategy Profits

Figure 45:
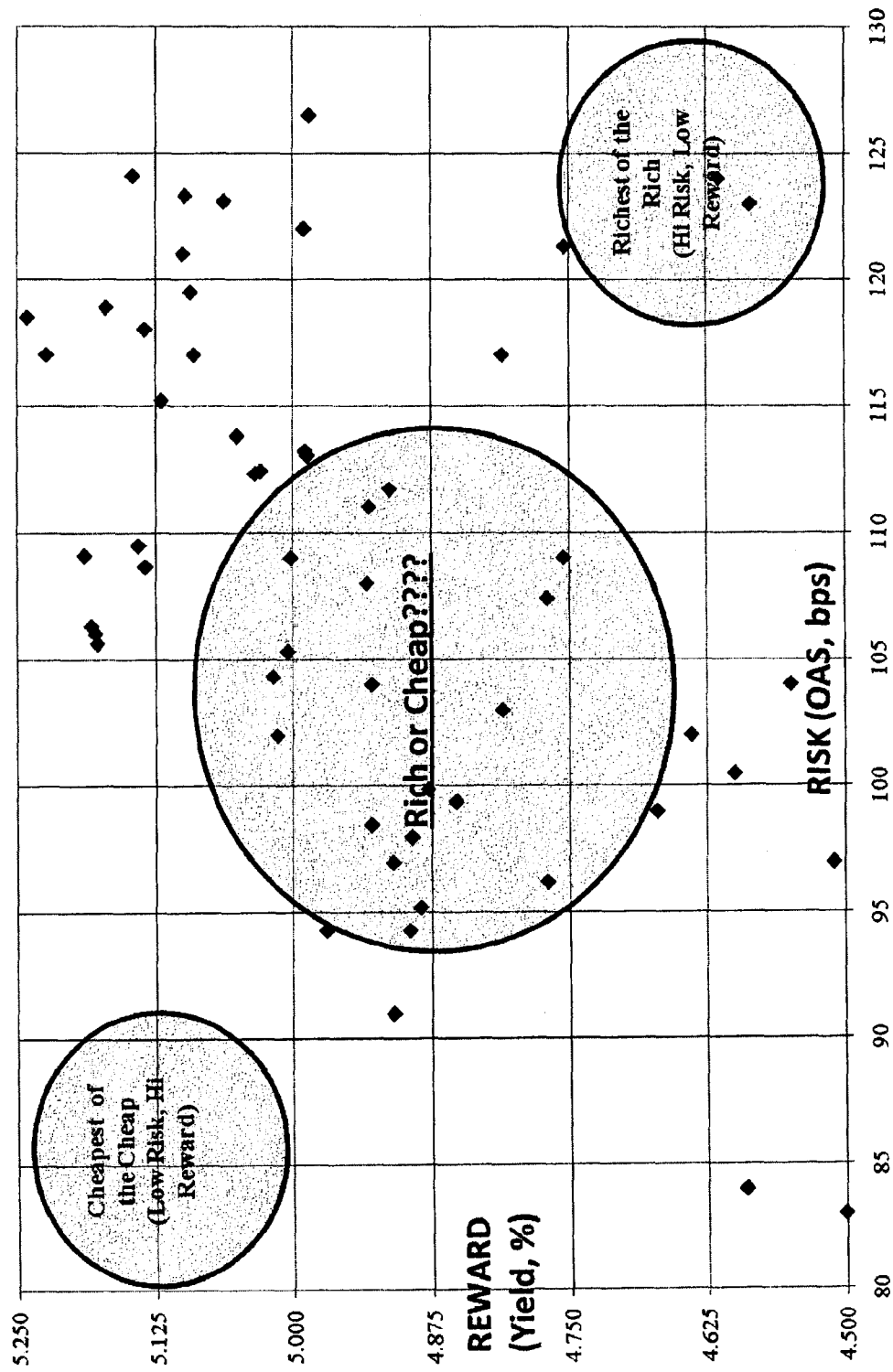
FIG. 45 is a schematic graphical representation of the need for a scientific approach.
Figure 46:
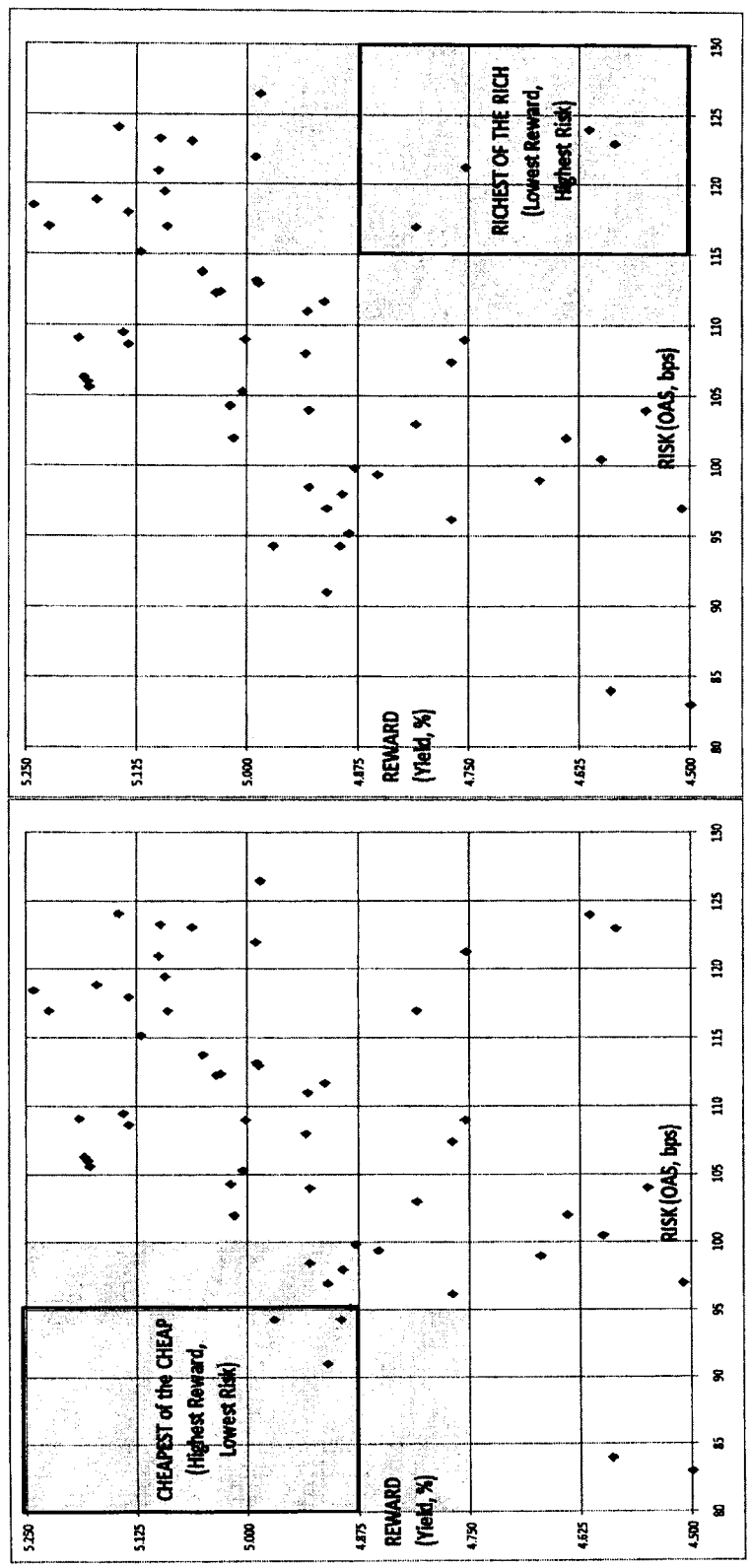
FIG. 46 is a schematic graphical representation of the Double Sort Method.

FIG. 45 shows the quandary investors are in when they need to pick bonds outside of the extrema and the need for a scientific approach. FIG. 46 shows the Double Sort Method as a useful approach to integrate Zero Volatility Spread minus Option Adjusted Spread (ZY-OAS) and Yield to find relative value in the marketplace.

This section generates trading strategies based on $\epsilon_i(t)$ to determine if the model correctly identifies over- and undervalued bonds. The ideal trading strategy for this determination is to construct an arbitrage opportunity that involves going long undervalued bonds and shorting overvalued bonds. Unfortunately, there is no well-organized market for shorting CMBS. Consequently, the relative performance of undervalued and overvalued portfolios is investigated, pairwise matched to control for risk. In this matching, credit risk is measured by the bond's credit rating and interest rate risk by the bond's weighted average life.

A. Procedure

This section describes the procedure utilized to construct the over- and undervalued CMBS bond portfolios. At time 0 (July 2001), first the bonds are grouped into roughly "equal risk" categories based on credit rating (for credit risk) and WAL (for interest rate risk). The seven groupings selected were:

1. {aaa, WAL 2.0<6.0},
2. {aaa, WAL>6.0},
3. {(a1,a2,a3,aa1,aa2,aa3), WAL<7.0},
4. {(a1,a2,a3,aa1,aaaa3), WAL>7.0},
5. {(ba1,baa1,baa2,baa3), WAL<7.0},
6. {(ba1,baa1,baa2,baa3), WAL>7.0},
7. {IOs (all tenors and ratings)}.

Note that IO bonds are separate from the remaining CMBS bonds because i.) their cash flows are distinctly different from all the other bonds in the CMBS capital structure as they receive only interest payments (no principal) and ii.) they are exposed at all time steps to both prepayment and default risk as their balance is notional, a reflection, as it were, of the entire balance of the entire CMBS capital structure.

For each of these "equal risk" groupings, $\epsilon_i(0)$ is sorted across i from highest to lowest. Those with the highest $\epsilon_i(0)$ represent overvalued bonds and those with the lowest $\epsilon_i(0)$ represent undervalued bonds. $100 million are invested split equally among the bonds in the top decile and $100 million split equally among the bonds in the bottom decile. That is, let $$N_j^{high}(0) =$$

the total number of different bonds in the highest decile for the jth grouping j=1, 2, . . . , 7) at time 0. $100 million are invested divided equally among these $$N_j^{high}(0)$$

different bonds. Because of discreteness in bond prices, the number of bonds in the highest and lowest decile is rounded down so that the investment does not exceed $100 million.

These 14 portfolios are held until time t=1 (one month later). Denote the value of the jth high decile portfolio at time 1 by $$V_j^{high}(1)$$

for j=1, 2, ..., 7, and the value of the jth low decile portfolio at time 1 by $V_j^{low}(1)$ for j=1, 2, ..., 7. Given the initial $100 million investment in each portfolio, the returns on the 14 portfolios (marking-to-market) were computed taking into account all cash flows obtained over the first time period.

At time 1, the two portfolios were rebalanced by performing the same procedure. This time, however, the number of dollars to invest in the top decile and bottom deciles for the jth grouping differs from $100 million and it equals $$V_j^{high}(1)$$

and $$V_j^{low}(1),$$

respectively. Note that the total number of bonds in each grouping $$N_j^{high}(1), N_j^{low}(1)$$

may also differ. This procedure is repeated until the end of the sample period time T (January 2003).

Figure 33:
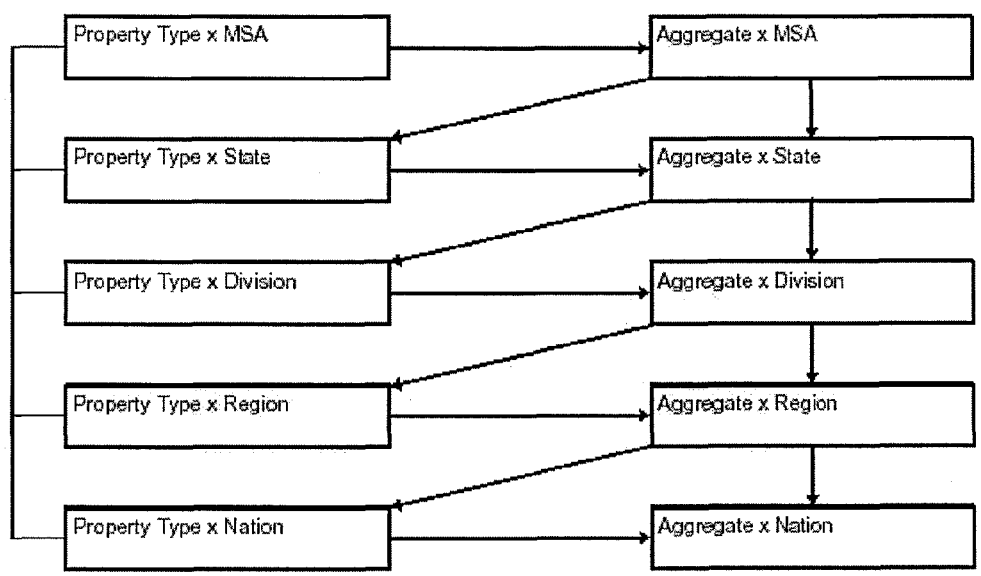
FIG. 33 shows a schematic block diagram representation of an embodiment of a database function of this invention.

Referring again to FIG. 4, in the back-end structure 40, the relational database 50 includes economic/Market Data yields 53, indices of commercial property values 55 (in the embodiment where CRELs and CMBS are considered), and structured finance product (CRELs and CMBS in one embodiment) data 51. The data from the back-end relational database 50 is selected and processed for calculating the estimates by the estimator 62. In one embodiment, the processing of the data includes first combining such data through a cascading technique into a linear algebraic matrix where the 2 value dimensions are property crossed with geographic region (i.e. the property values of Hotels in the Southwest in the $3^{rd}$ quarter of 1999, or the property values of Offices in the Northwest in the $1^{st}$ quarter of 2002, etc. . . . ) and then combining with other property information and data. The cascading techniques are depicted in FIG. 33. This depiction represents the selection of the most granular regional information given a selected property type. The function of this selection process within the database of this invention is to provide the model with the most accurate information about property values. For example, from the model's perspective, property values of Hotels in the New York City represent more valuable information than property values of Hotels in New York State, which represent more valuable information than property values of Hotels in the Northeast, which represent more valuable information than property values of Hotels in the United States.

The processed data is provided to the estimator 62. The estimator 62 generates a set of information (P×R (Property by Region) Estimates) derived through the implementation of The Empirical Processes (See, the previous section, "The State Variables", specifically expression 13). The implementation of the processes may, in one embodiment, be accomplished by computer readable code. The estimates are dynamic weightings of raw data that are utilized in the discrete process of estimating the probabilities of default and prepayment on specific loans in the Database.

The interest-rate risk calculator 60 receives data from the back-end relational database 50. The prepayment restriction calculator 61 receives specific loan prepayment restriction information from the back-end relational database 50. The output of the estimator 62 and the output of the interest-rate risk calculator 60 are provided to the default and prepayment (credit) risk calculator 64. The output values obtained from the default and prepayment (credit) risk calculator 64 include the probabilities of default and prepayment on the loans derived from the successful implementation of the Hazard Rate Process. The processes that generate the output values of the default and prepayment (credit) risk calculator 64 include the processes set-forth in The Empirical Processes (See, the previous section, "The Default and Prepayment Intensity Process").

The probabilities of default and prepayment on the loans derived from the successful implementation of the Hazard Rate Process obtained from the default and prepayment (credit) risk calculator 64, the outputs from the interest-rate risk calculator 60, and the restrictions obtained from the prepayment restriction calculator 61 are provided to the simulator 66. The simulator 66 performs Monte Carlo simulations to obtain cashflow paths for loan objects subject to both interest-rate risk and credit risk. Although the generic form of Monte Carlo simulations is well documented and in the public domain, the specific implementation of Monte Carlo (as set forth above using the unique combination of Hazard Rate Estimates in conjunction with interest-rate evolution as per HJM 60) requires repeated call procedures to the Generic Engine; furthermore, such call procedures (which, in one embodiment are written in, but not limited to, the computer languages of C and C#) must use the Hazard Rate Estimations at each time step, and, when required by the Hazard Rate Estimations, cause a simulated default or prepayment to occur based on a trigger condition scripted as a multivariate function partially dependent on the interest-rate evolution (as per HJM 60) and partially dependent on the instruction set embodied within the Hazard Rate Estimations. As the 10,000 cashflow paths (an embodiment of statistically significant number of cash flow data) for each loan in the Database subjected to the simulation process are generated, they are stored in temporary memory and, via an allocation procedure in the Generic Engine, are appropriately allocated to tranches in the deal of which they are a part (at the given time step on the given simulation path). This procedure of simulating state of the world paths for loan objects subject to both interest-rate risk and credit risk is described fully in the previous section, "The Simulation."

The (10,000 in one embodiment) Probabilistically Weighted Monte Carlo Default and Prepayment Intensity Simulation Paths are inputs to the loan pricing and hedging calculator 68. The Probabilistically Weighted Monte Carlo Default and Prepayment Intensity Simulation Paths are aggregated, valuated, and priced in the loan pricing and hedging calculator 68 and the results are used by the Generic Engine 42 to simulate the actual cashflows for each of the loans of interest. In this step, in one embodiment, values are derived for the CRELs and CMBS. The values for the loans and the bonds that are derived are included in The Quick Definitions below and described further herein above. The generated values (delta, gamma, theta, epsilon, OAS, etc. . . . ) are then populated into the Database 50. These values can be obtained from the method of this invention.

The techniques of CREL pricing as set forth in the previous section, "Commercial Mortgage Loans" as well as the procedure for hedging loans in the commercial mortgage pipeline (prior to securitization) are utilized in a Mock Securitization Procedure, which uses market information as well as values derived from the method of this invention (including Subordination Levels, Ratings, and Fair Values produced by this invention, as defined in the Quick Definitions below) to comparatively price non-securitized loans in the pipeline in their summed aggregate form by first using calls to the Generic Engine 42 to generate promised cash flow paths and then using additional information about the loans from the Monte Carlo Simulation to derive option adjusted hedge estimations on such promised cashflows generated from the call to the Generic Engine 42. By applying Monte Carlo simulated loan information to a non-securitized set of loans (specifically, Subordination Levels, Ratings, and Fair Values produced by this invention, as defined in the Quick Definitions below) in a theoretical securitized framework and then subjecting such theoretical bonds to the hedging process 68 of this invention using option adjusted hedge ratios, this component of the method of this invention enables users to more effectively hedge their pipeline risk by combining theoretical and market values.

A set of analytical tools is available to the user of the method of this invention in the current embodiment. These tools enable the users of the method of this invention, by means of the graphical user interface of this invention, to analyze visually the composition of risks, to make seamless buy and sell decisions based on such analysis (or some other user developed analysis), and to populate and track the performance of portfolios of bonds and hedged instruments based on the execution of such decisions. The conception of the designs as well as the functionality (and future functionality surrounding more user flexibility) that can be currently enjoyed by users of the architecture of this invention are described below.

In one embodiment, the present invention includes a graphical user interface. In particular embodiments, the graphical user interface of this invention can either be installed in the form of software or provided to users over the Internet through a variety of frameworks (including, but not limited to, a MS ASP.NET enabled password-protected framework) that allows users to (1.) analyze the Structured Finance Product information in meaningful graphical and tabular form, (2.) create, price, and hedge entire portfolios of structured finance products and generic hedge instruments from information in the Structured Finance Product Database (the "User Structured Finance Product Portfolios"), and (3.) track the performance of the User Structured Finance Product Portfolios. In both (1.) and (2.) the user is granted the latitude to select certain risk measures from a range of values that are reflective of different fundamental assumptions regarding the volatility and severity of economic events that enable such users to observe a range of personalized values.

The user interface of this invention includes, in one embodiment, a structured collection of data including criteria for viewing candidate structured finance products, a component capable of selecting criteria from the structured collection of data, another structured collection of data including structured finance products satisfying the selected criteria, another component capable of selecting a portfolio of structured finance products from the structured finance products satisfying the selected criteria, further components capable of displaying valuation parameters for the portfolio of structured finance products, and means for enabling transactions for the portfolio of structured finance product. Other embodiments of the user interface of this invention include an additional component capable of presenting analysis results for the portfolio of structured finance products and an additional component capable of presenting a number of portfolios of structured finance products and data for each portfolio.

A "structured collection of data" as used herein includes, but is not limited to, lists, pull down menus containing a variety of options, dialog boxes with options, and other means for providing a number of choices.

"Component" as used herein refers to means for selecting options in graphical user interfaces (GUIs) such as, but not limited to, menus, drag and drop between dialog boxes, and other selecting means (see, for example, C. Petzold, Programming Windows, ISBN 1-57231-995-X, Ch. 9, Ch, 10, Ch. 11, pp. 357-566).

Figure 6:
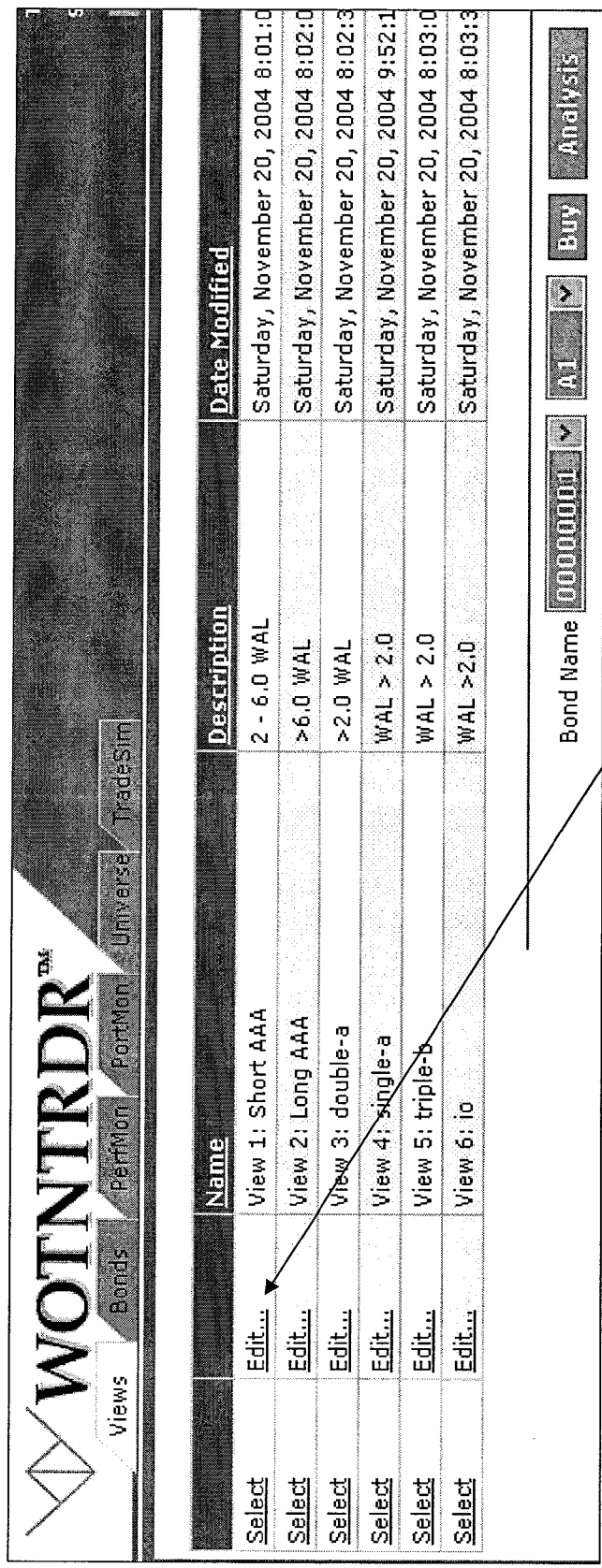
Figure 7:
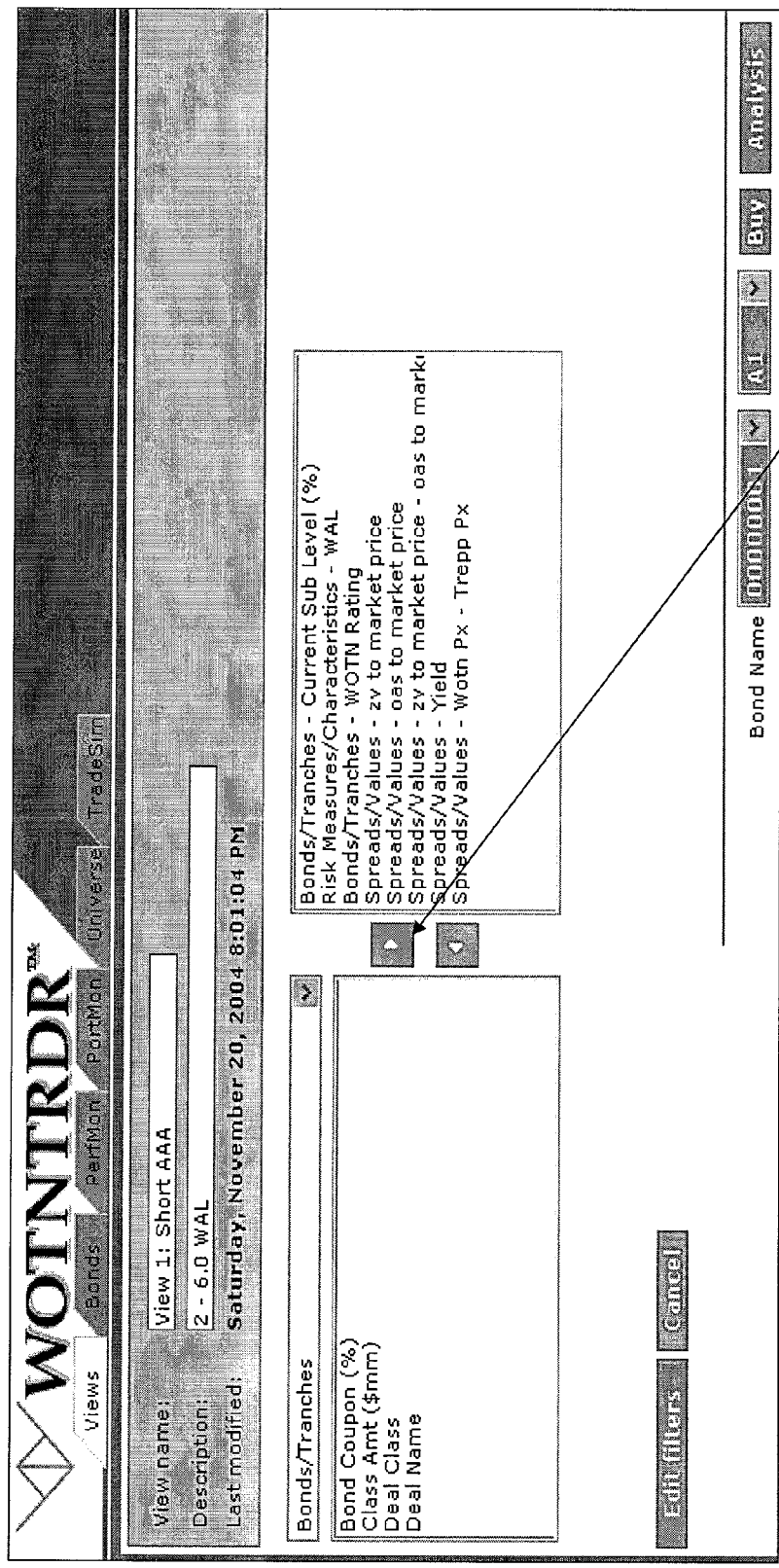
Figure 8:
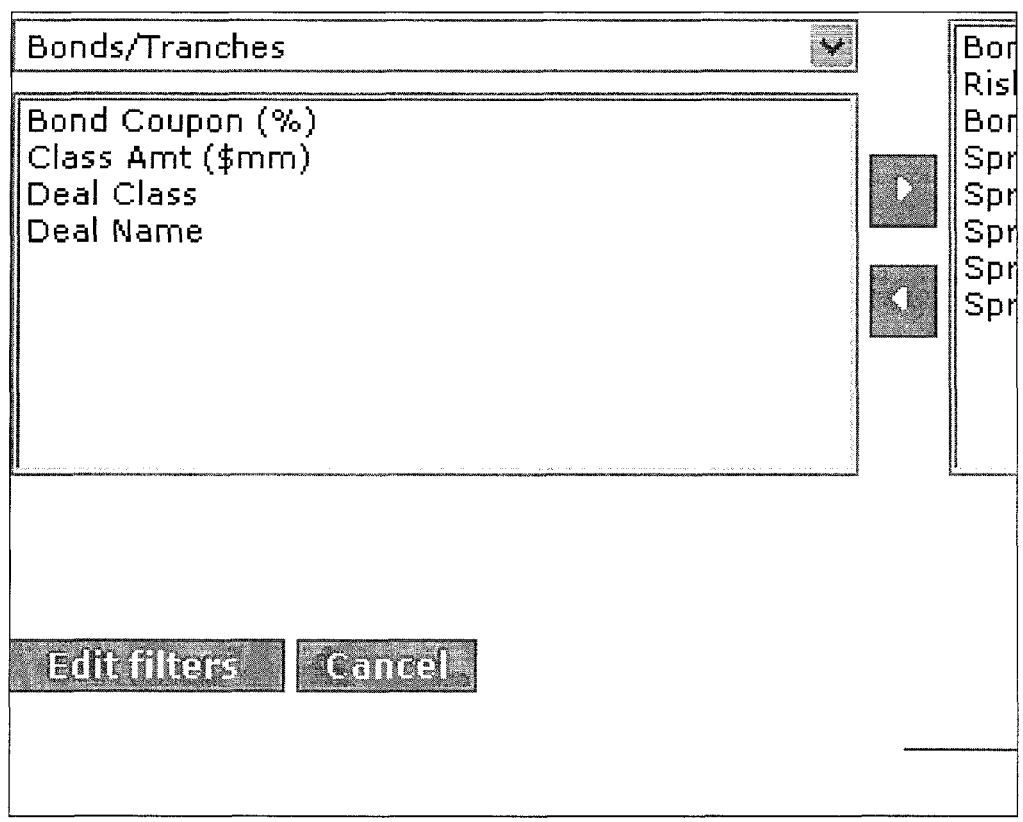

In order to better illustrate the graphical interface of this invention, a detailed embodiment is presented hereinbelow and the use of the graphical user interface is described. The embodiment described below enables a user to (1) analyze the Information of this invention in meaningful graphical and tabular form, (2) create, price, and hedge entire portfolios of CMBS and generic hedge instruments from information in the Database of this invention (the "User Portfolios"), and (3) track the performance of the User Portfolios. One embodiment of the user interface of this invention, as shown in FIG. 6, is "View" driven and, in one embodiment, provides users with the ability to see the terrain of relative risk/reward profiles of over 6,500 CMBS and gives them the ability to act on the insights gained in a robust trading system. Users are defaulted to "View". From View the users select Edit (108, FIG. 6) to select the database criteria through which they would like to filter the CMBS universe (criteria for viewing candidate structured finance products). They can choose from four (4) primary groups of filters including i) Bonds/Tranches; ii) Pools/Deals; iii) Spreads/Values; and iv) Risk Measures/Characteristics. The users make specific view choices by highlighting the criterion and then porting them, after such selection, with the center arrows to the view repository (112, FIG. 7, selecting criteria from the structured collection of data). Clicking on "Edit filters", as shown in FIG. 8, lets the user set the upper and lower parameters of the user's view, as shown in FIG. 9, on each of the criteria that constitute the View. This is needed because different practitioners have different segments of the market in which they prefer to (or are required to) participate. The user interface of this invention lets users look at as small or as large a subset of the universe of CMBS as is relevant to their business. In one example, the parameters are set for a user interested in the segment of CMBS with a WOTN Rating of w1 that corresponds to a rating agency rating of AAA) and tenors of short weighted average life (aka WAL) of between 2 and 6 years. The other values are set wide, as the user in this example wants the largest number of bonds to find the best deal in the marketplace, and thus it might not desirable, in some instances, to further restrict the number of bonds that will be selected through the criteria selected. After setting the parameters, the user presses "Save."

Figure 10:
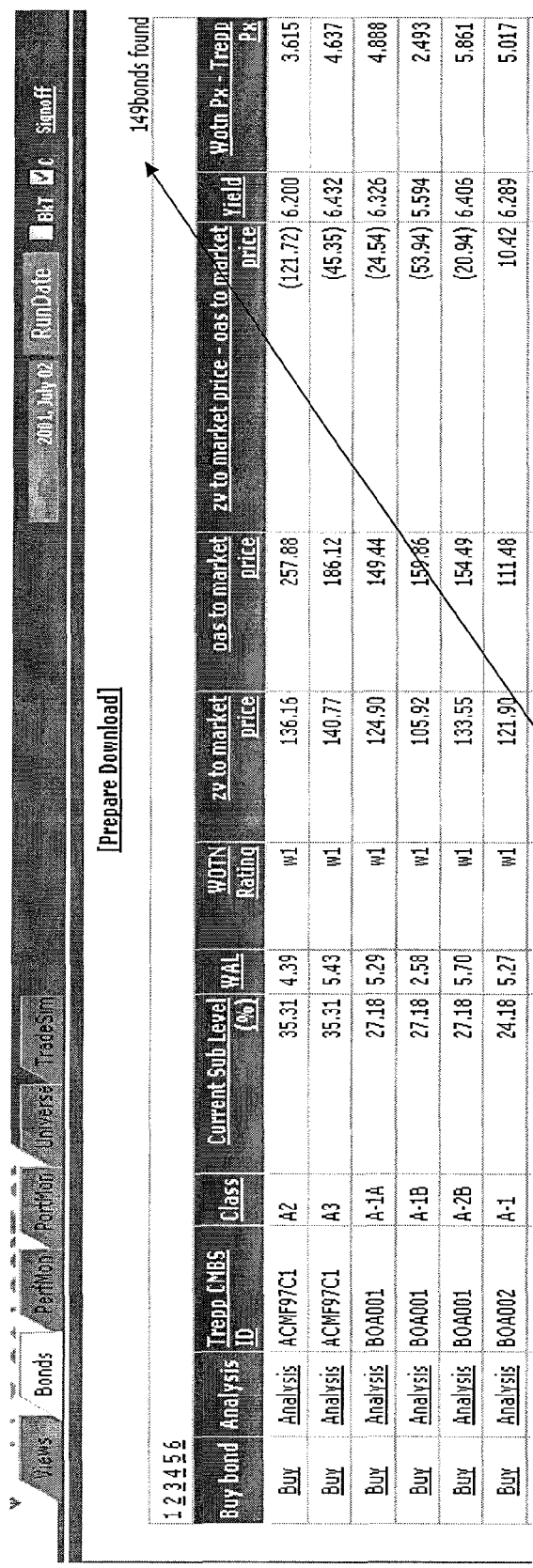

The result of this query to the Database (FIG. 10) show that on Jul. 2, 2001 there were one hundred and forty-nine bonds in the CMBS universe that met the user's criteria of interest set in the user's View (structured collection of data including structured finance products satisfying the selected criteria, 114, FIGS. 10, 11). On Nov. 5, 2004, using the same View there were one hundred and ninety-two bonds that met the user's criteria of interest. So while the user can maintain the selected View in the View storage, the bonds that correspond will change due to new issuance, credit events, prepayment events, and normal aging events within the life of the bonds in the CMBS universe. To change dates the user can use the "Rundate" drop-down menu. At this point, once the user has selected the bonds that reflect the criteria of interest (component capable of selecting a portfolio of structured finance products), the user can either go to the Buy Page (38, FIG. 5*b*) or perform Analysis (36, FIG. 5*b*) first. In order to perform Analysis, the user selects a date, July 2001 (FIG. 12*a*), and clicks on "Analysis" next to Chase982 A1 (FIG. 12*b*).

Figures 12A, 12B:
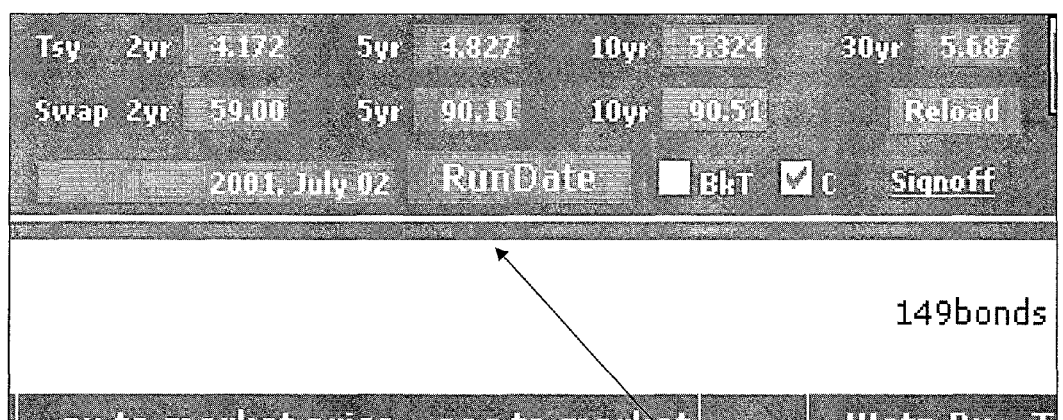
Figure 13:
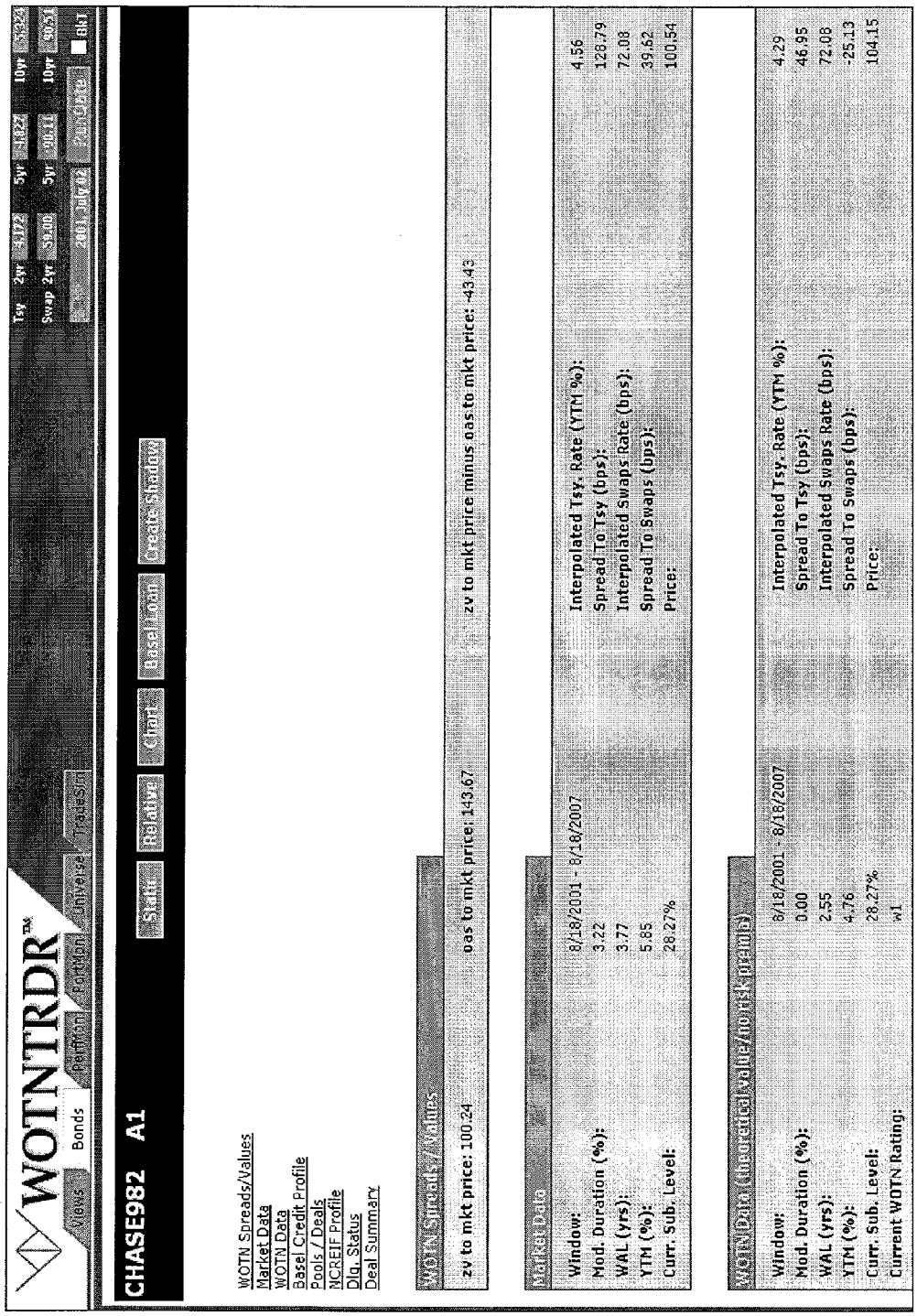
Figure 14:
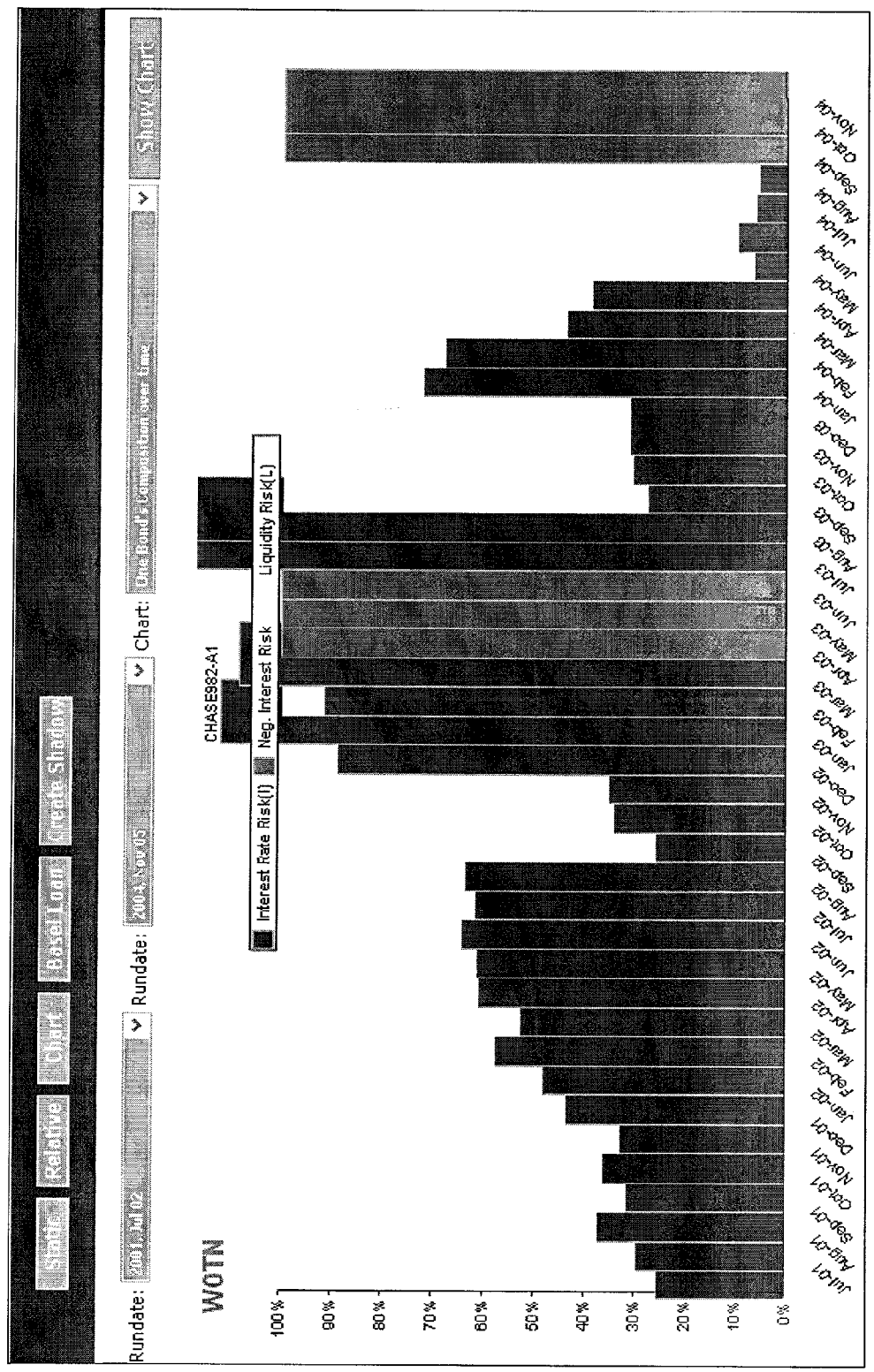

After selecting "Analysis," (additional component capable of presenting analysis results for the portfolio of structured finance products) as shown in FIG. 12*b*, the user is presented a staging area wherein the user is permitted to navigate to five primary areas (FIG. 13): (i.) a Static area that serves as the primary area from which the user must navigate to other primary areas; this area consists of static deal and bond summary tables that are updated nightly with new market and simulation information; (ii.) an area that includes dynamic relative value tables (end, not shown); (iii.) an area for charting with pull-down menus accommodating two run dates to define a time series analysis period, a chart selector pull down menu and a "Show Chart" activation button (see top); (iv.) a Basel Loan area; and (v.) a Create Shadow area. Assume that the user wants to examine the composition of risk of Chase982 A1. This can be done by selecting at the top of the screen under the second rundate pulldown "2004, Nov. 5", so the user can see the composition of interest rate risk, liquidity risk, and option risk change over time based on the simulation model of this invention and the paydown history of Chase982 A1. The chart can be obtained by pressing (or clicking on) "Show Chart." As is evident, from FIG. 14, as market conditions change, the composition of Chase982 A1's risks change. From the navigation area at the top of the chart ((i.) Static; (ii.) Relative; (iii.) Chart; (iv.) Basel Loan; and (v.) Create Shadow) the user can press any of the buttons to go to any area associated with Analysis. For example, selecting "Static" will enable the user to return to the default staging area shown in FIG. 13.

Figure 15A:
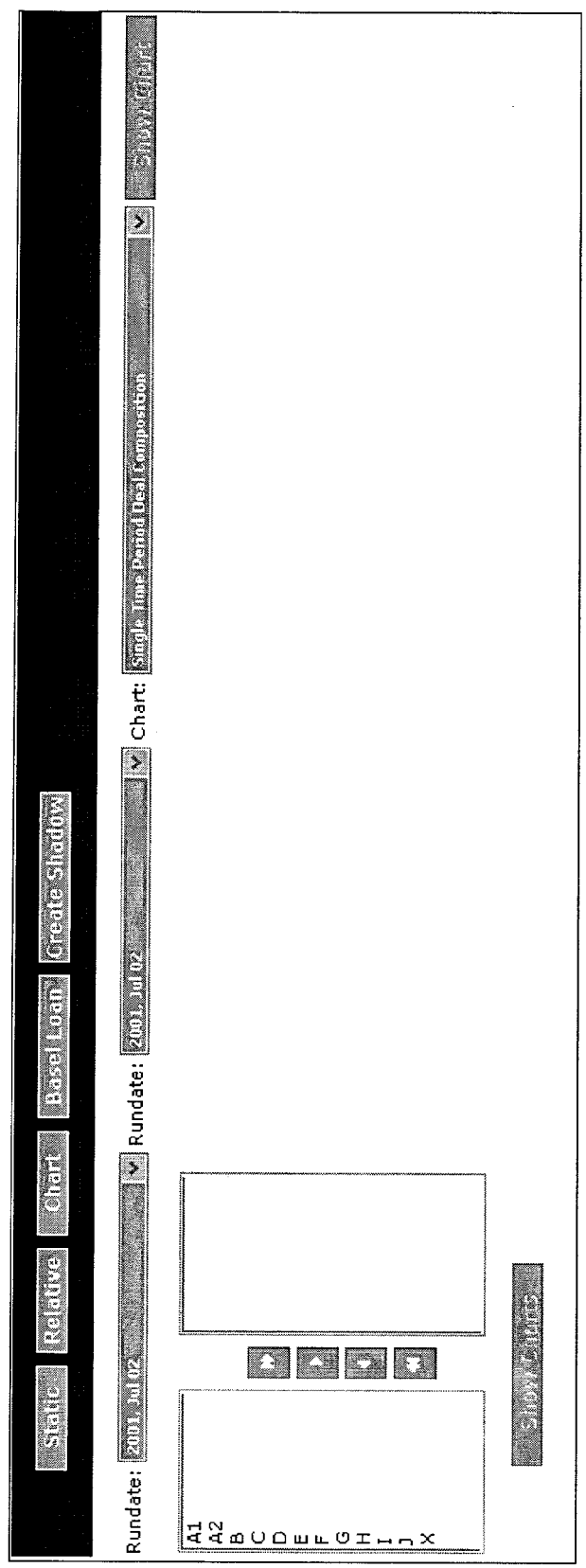
Figure 15B:
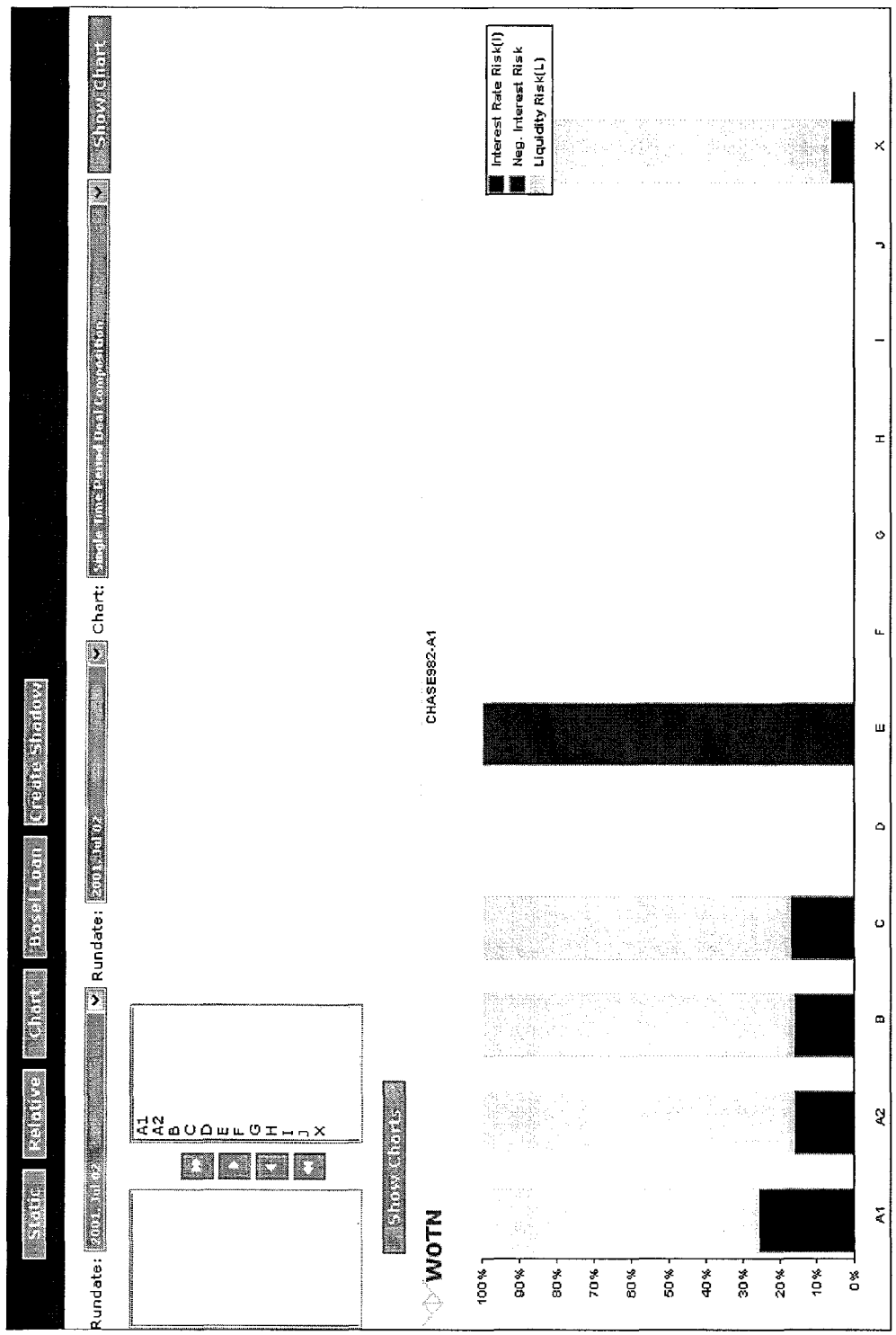

To see the composition of an entire deal's risk at a single point, as shown in FIG. 15*b*, the user can select "Single Time Period Deal Composition" from the chart selector pulldown menu (see FIG. 15*a*), then a pair of Class name windows pop up. The user can select the double headed right arrow to migrate all the classes to the activation window. This results in the charting function drawing the risk profile of the entire deal (components capable of displaying valuation parameters for the portfolio of structured finance products).

Figure 16:
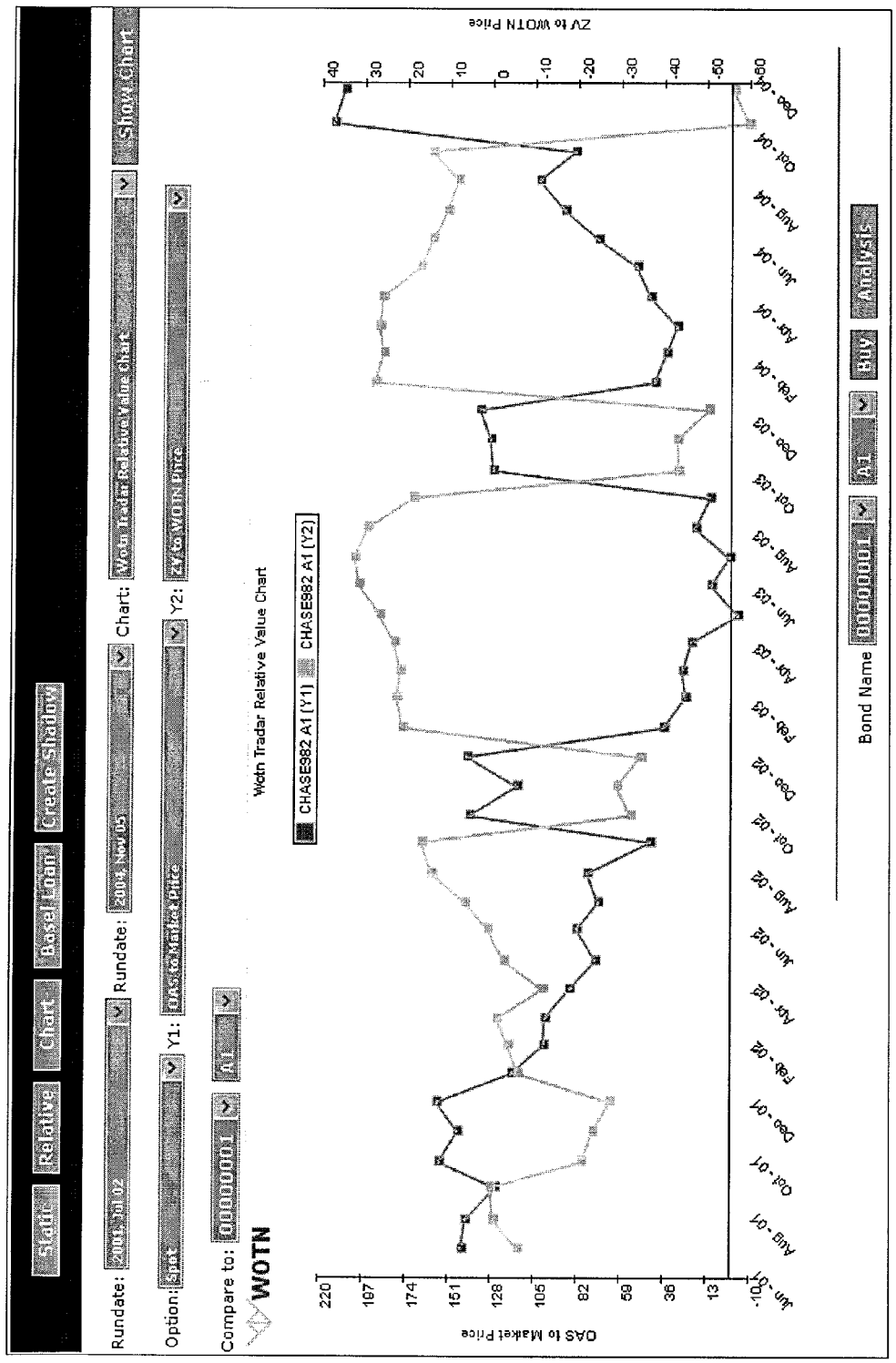
Figure 17:
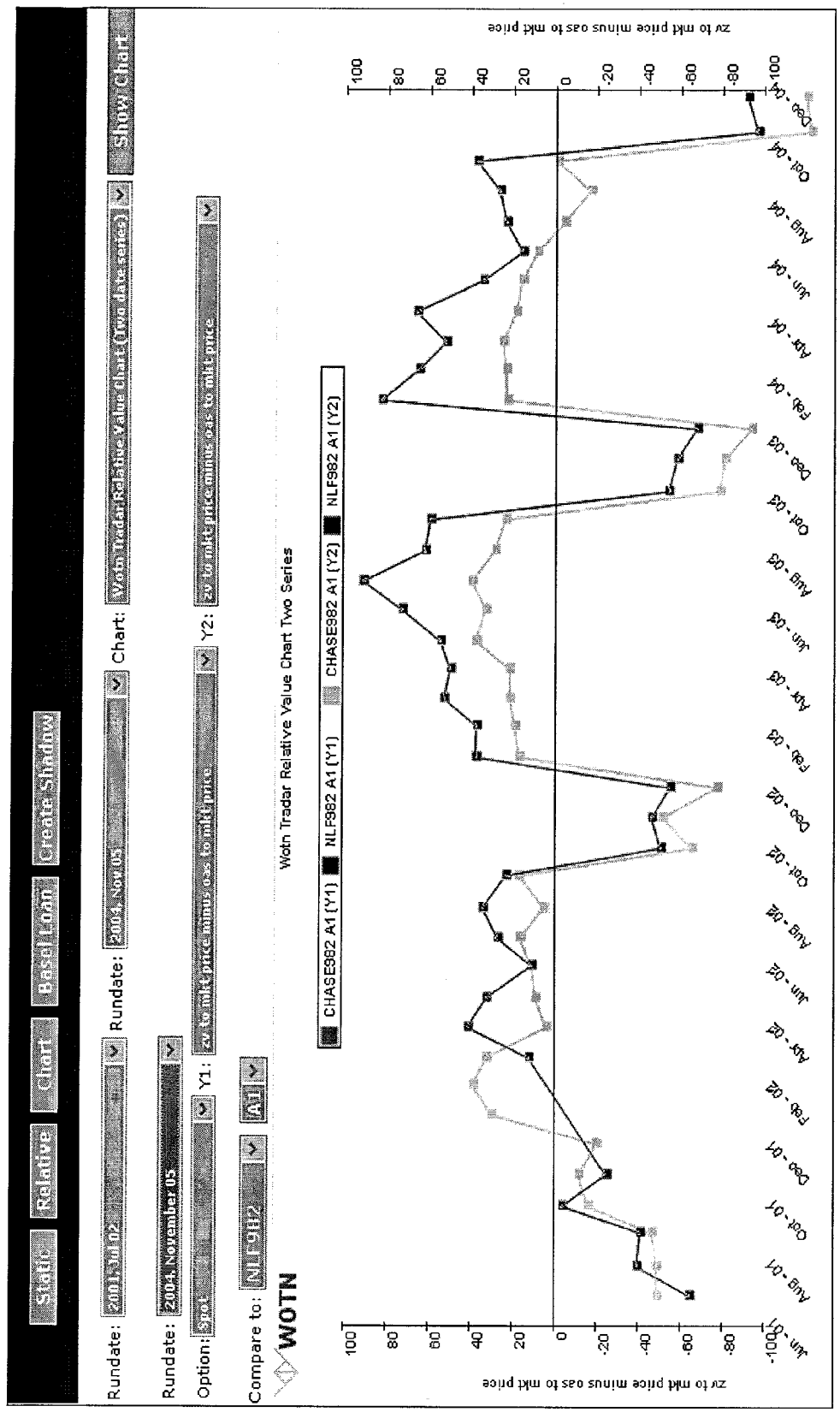

Risks are definitely different across the CMBS' capital structure and, as indicated in FIG. 15*b*, change through time. Often market participants are more interested in comparing the relative value of securities rather than querying their value(s) isolated from other CMBS in the universe. The user interface of this invention accommodates both types of inquiry, and, in FIG. 16, an example of the relative valuation of securities is shown. First, the users are given the ability to look at one bond across several (two in one embodiment of the invention) measures (for example, a user could compare the OAS & Zero-Volatility Spread of a single CMBS through time). Second, users are provided with the ability to compare two bonds across the net differences between two measures (an exemplary component capable of presenting a number of structured finance products and data for each structured finance product). So, for example, the Chase bond exhibits a wider market spread than the option values would indicate that it is worth. But this is not nearly as relevant as comparing it to the NLF982 A-1 bond of the same duration, rating and origination year. As shown in FIG. 17, it can be seen that based on the differential between OAS and Zero Volatility Spreads comparing the two bonds shows that the Chase bond on an option adjusted basis (the lighter line) trades on average about 20 bps tighter than the NU' bond over the time period July 2001 film November 2004. However, small changes of 1 bp or less are critical to managers of risk and such tools help managers disclose such small changes in relative valuation visually.

With the exception of the residential pass-through market, the remaining 2.0+ trillion of the structured finance market operates primarily as an over-the-counter negotiated marketplace. The vehicle for transactions is the bid list. The buy-side client provides the sell-side market maker with bid lists of individual bonds in which the buy-side wants the sell-side market maker to make a market (a $20 mm round lot, for example). Similarly, the sell-side provides the buy-side with offering sheets that indicate the bonds they are offering to the marketplace. The analysis as set forth in this invention in evaluating the risks of these bonds is rigorous and, in the case of billions to trillions of dollars of securities, absent in conventional products.

Figure 18:
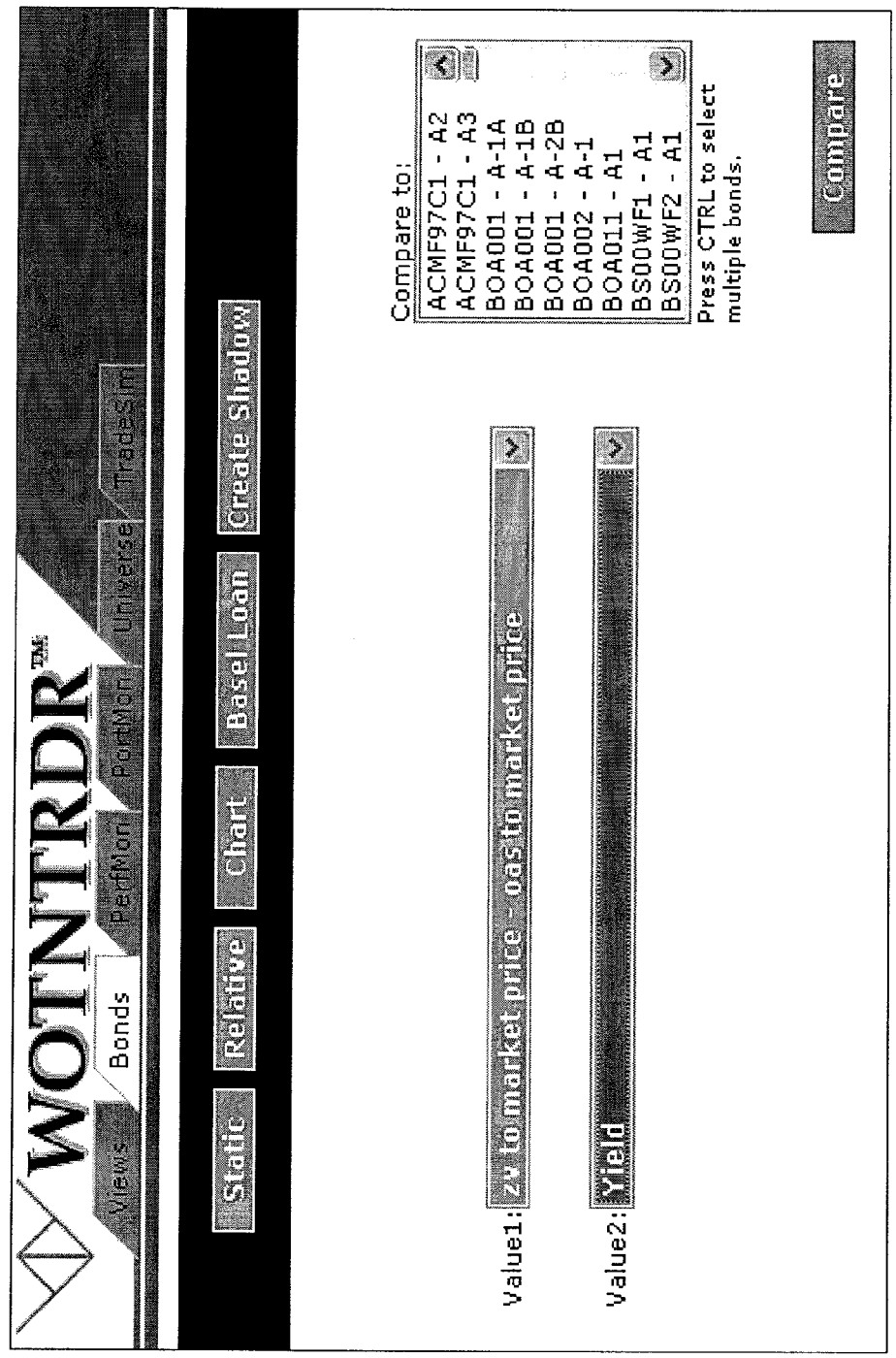

The user interface of this invention provides tabular assistance to evaluate relative risk rapidly to enable the user to make a judgment about a primary bond vs. many satellite bonds of comparison. To navigate to this "Bid List/Decision Mode" users can go back to the Bonds tab (FIG. 10) and reselect Analysis next to the primary bond of inquiry (in this example, Chase 98-2 A1) and, once migrated to the default Static staging area, the user selects "Relative" which bring the user to a bond Bid List/Decision Mode screen. FIG. 18 shows the pull downs and Bond Comp Table (which reflects all bonds corresponding to the user's criteria of interest, except for the primary bond associated with the current "View" in place).

Figure 19:
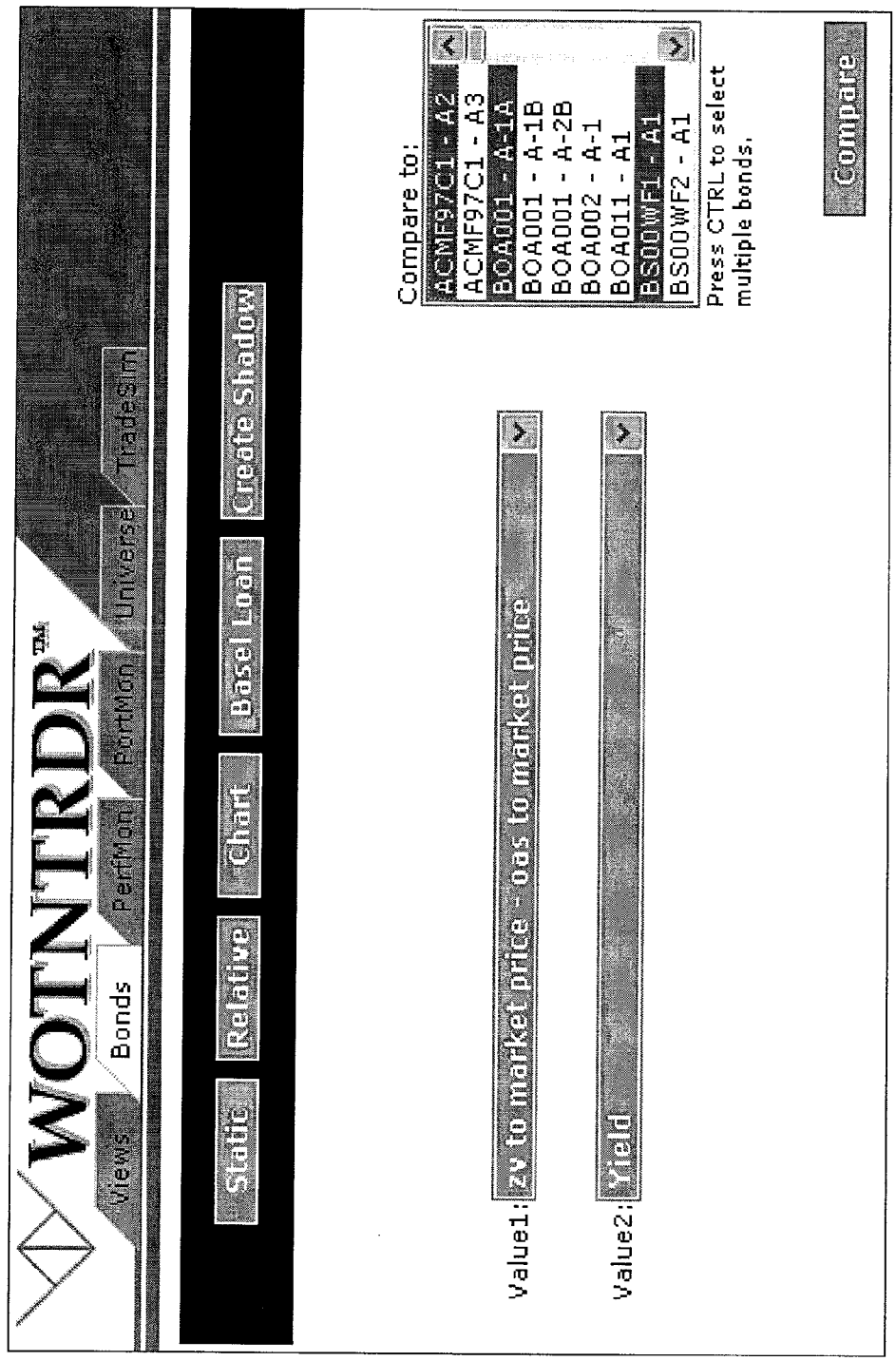
Figure 20:
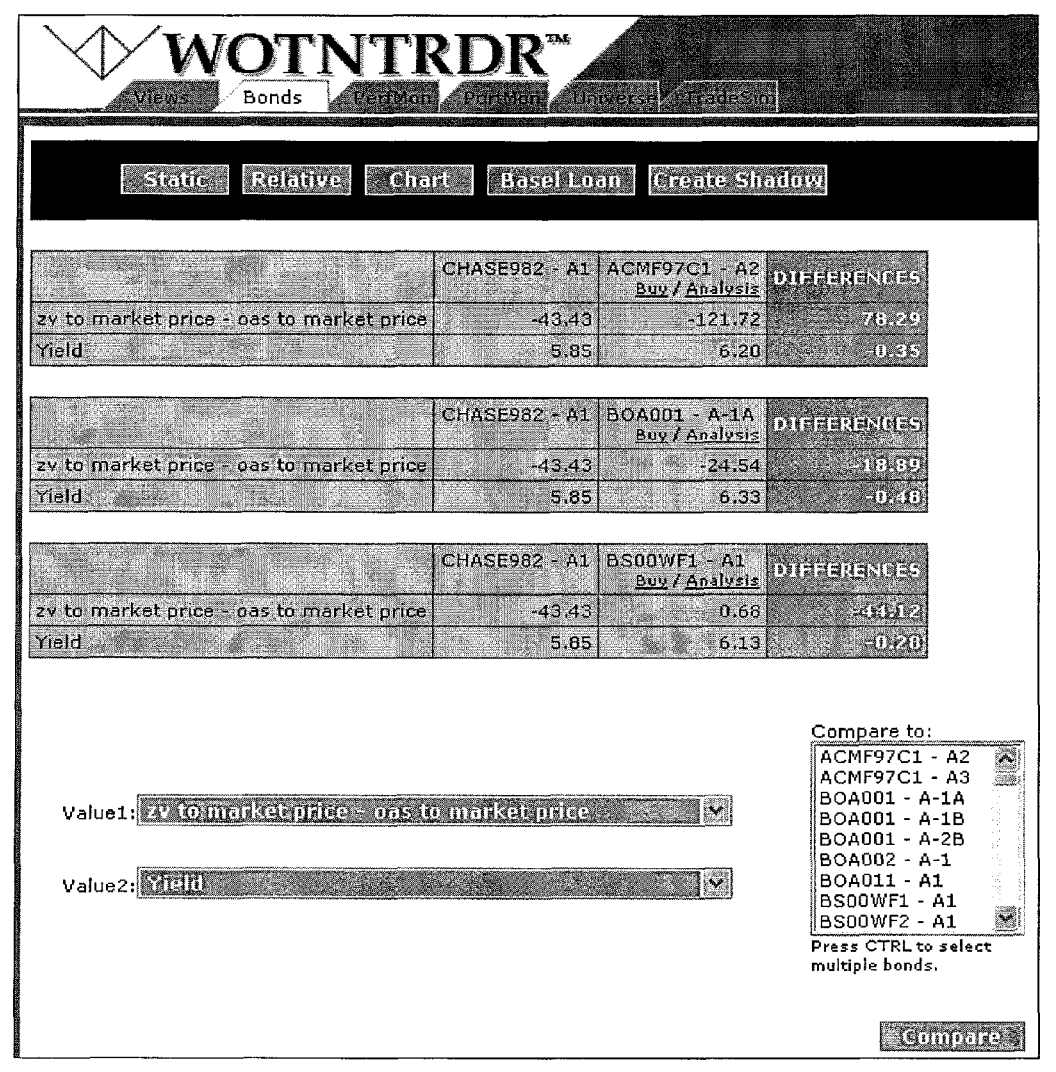

To begin the analysis in the "Bid List/Decision Mode" in July 2001, the user can, as shown in FIG. 19, select from Value 1 and Value 2 the criteria against which the user would like to compare the bonds (in this example Value 1 is 'ZV to Market Price minus OAS to Market Price'; and Value 2 is 'Yield'). The user then highlights in the comparison window the bonds the user would like to compare against the primary bond (in this case Chase 982 A1) while holding down the 'CTRL' button on the user's keyboard. Finally, after the bonds have been appropriately highlighted, the user presses "Compare" (component capable of presenting a number of structured finance products and data for each structured finance product). When the site finishes refreshing, the user scrolls to the bottom of the page and has several bonds to choose from in a series of like tables with two values (FIG. 20). In the analysis conducted it has been seen that although ACMF97C1 A2 and BOA001 A1 each afford greater nominal compensation relative to CHASE982 A1 on a Yield to Maturity (aka Yield) basis (35 and 48 bps, respectively) than BS00WF1 A1. (only affording 22 bps relative to CHASE982 A1), the price of the relative option risks of each of ACMF97C1 A2 and BOA001 A1 were substantially riskier at +78.29 and −18.89 bps respectively, were substantially more expensive than the price of the option risk shown in the BS00WF1 A1 bond at −44.12 bps. So, the user can conclude that each of the comparison bonds are cheaper nominally to the primary CHASE bond on a Yield basis, but of the three alternative purchases to the CHASE bond, the BS00WF1 A1 bond affords the optimal mix of risk and reward on an option adjusted basis. The purchase of the BS00WF1 A1 bond is 28 bps cheaper than CHASE982 A1 on Yield to Maturity basis, and is still 0.68 bps cheap relative to its underlying optionality as disclosed by the simulation technology in this embodiment of the invention. The user can buy the bond by clicking "Buy" in Buy/Analysis in FIG. 20. (Note that all references to transactions of Buy, Sell, Hedge, Gain, Loss, Profit, etc. . . . in this embodiment are meant to refer exclusively to risk management practices of the user and are not meant to indicate actual transactions as might be implemented through electronic over-the-counter technology.)

Figure 22B:
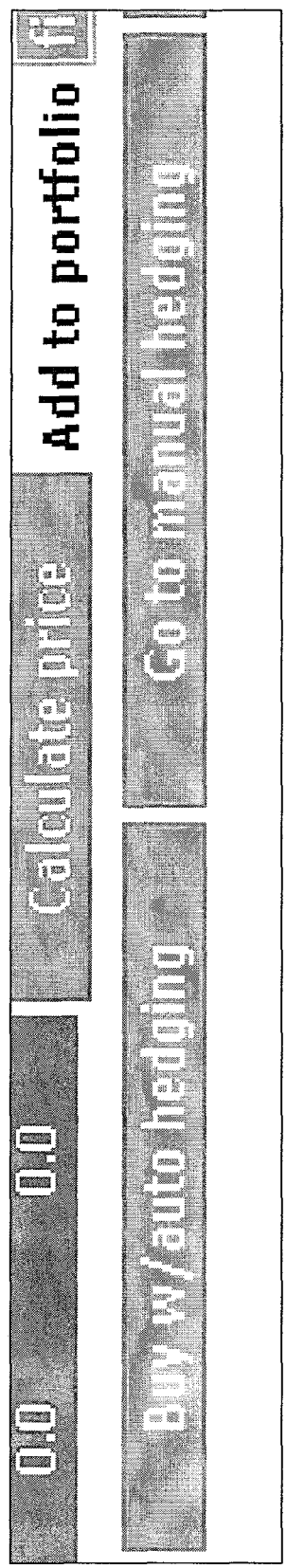

The buy page, shown in FIG. 21, has familiar functionality of several conventional products in use in the market today, plus many other important features available only on the user interface of this invention including: I.) VALUES: a.) Hedge Info of this invention, b.) Values of this invention (some of the Risk Measures), c.) 10-Year Equivalent Exposure (% & Sinn)) and d.) Hedge Allocation (optimized across Upper and Lower Instruments); and II.) FUNCTIONS: a.) Add to Portfolio, b.) Calculate Hedges, c.) Buy with Auto Hedge, and d.) Buy with Manual Hedging Cashflows identical to other conventional user interfaces. The Option-Adjusted Risk Measures duration and convexity ($\partial$ and $\gamma$ respectively) of this invention and Values (FairValue, $\theta_{generic}$, $\theta_{specific}$, ZV, OAS, Equilibrium Yield, and many real time dynamic values) of this invention, shown in FIG. 22.*a*., provide users with insights into their risk. One of the most immediate implications of the measures of this invention can be observed in the differences in Hedge Ratios & Allocations. The 10-Year Equivalents automatically express risk in familiar terms to managers. The Hedge Allocations provide suggestions to optimize the allocation of hedges in both Swaps and Treasuries for upper and lower boundary instruments, minimizing curve exposure. The user can choose to use these suggestions by clicking the appropriate radio button and then selecting Auto Hedging shown in FIG. 22.*b*. and populating a user defined and selected portfolio. Alternatively the user can choose to use Manual Hedging shown in FIG. 22.*b*. which takes the user to an area where the user can manually select the hedges of their choosing as shown in FIG. 22*c*. In the embodiment shown in FIGS. 6-31, a user can use Auto Hedge and "purchase" the security by clicking "Buy w/auto hedging." This action will "Buy" the security into a portfolio "yourfirstportfolio", but as noted earlier, this is not an actual transaction in this embodiment, but rather for internal portfolio/risk management purposes and convenience of users (component capable of emulating transactions for the portfolio of structured finance products).

Figure 23:
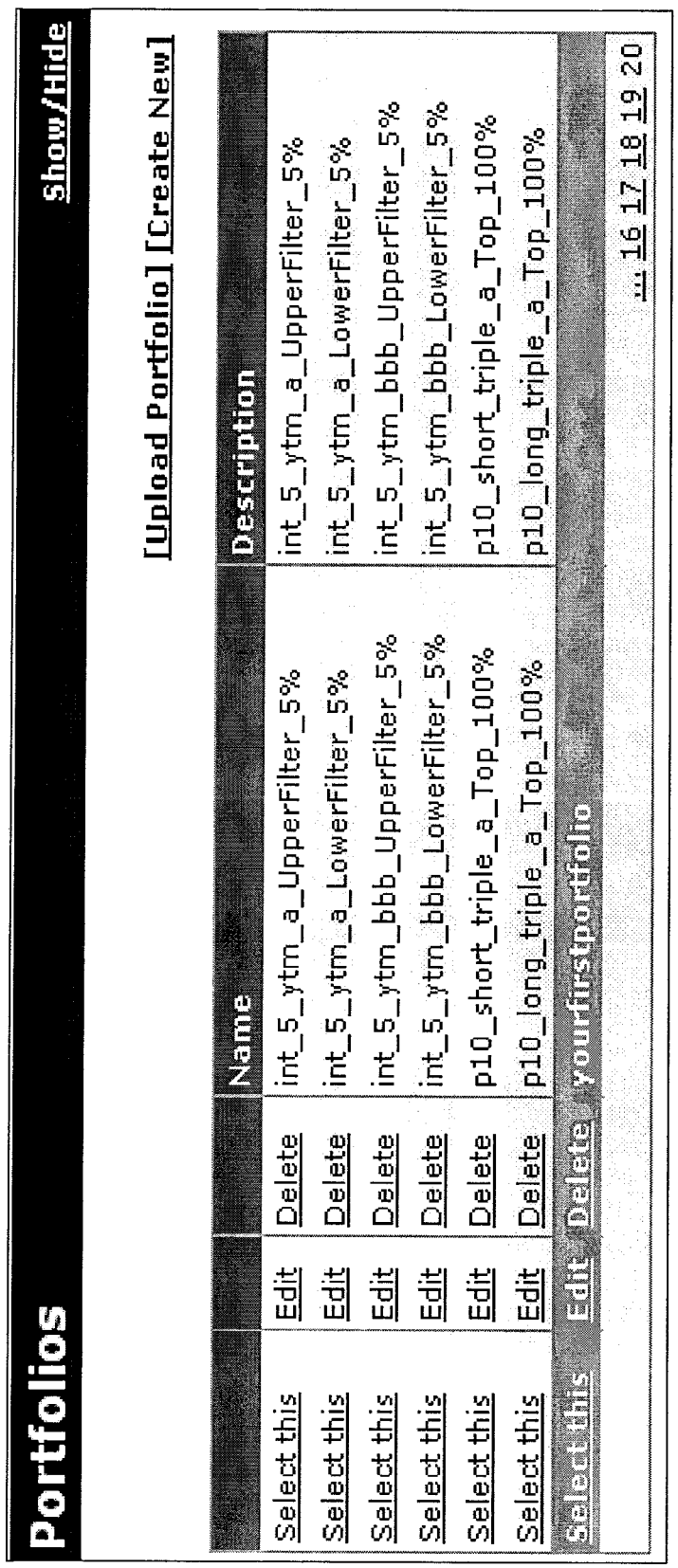
Figure 24:
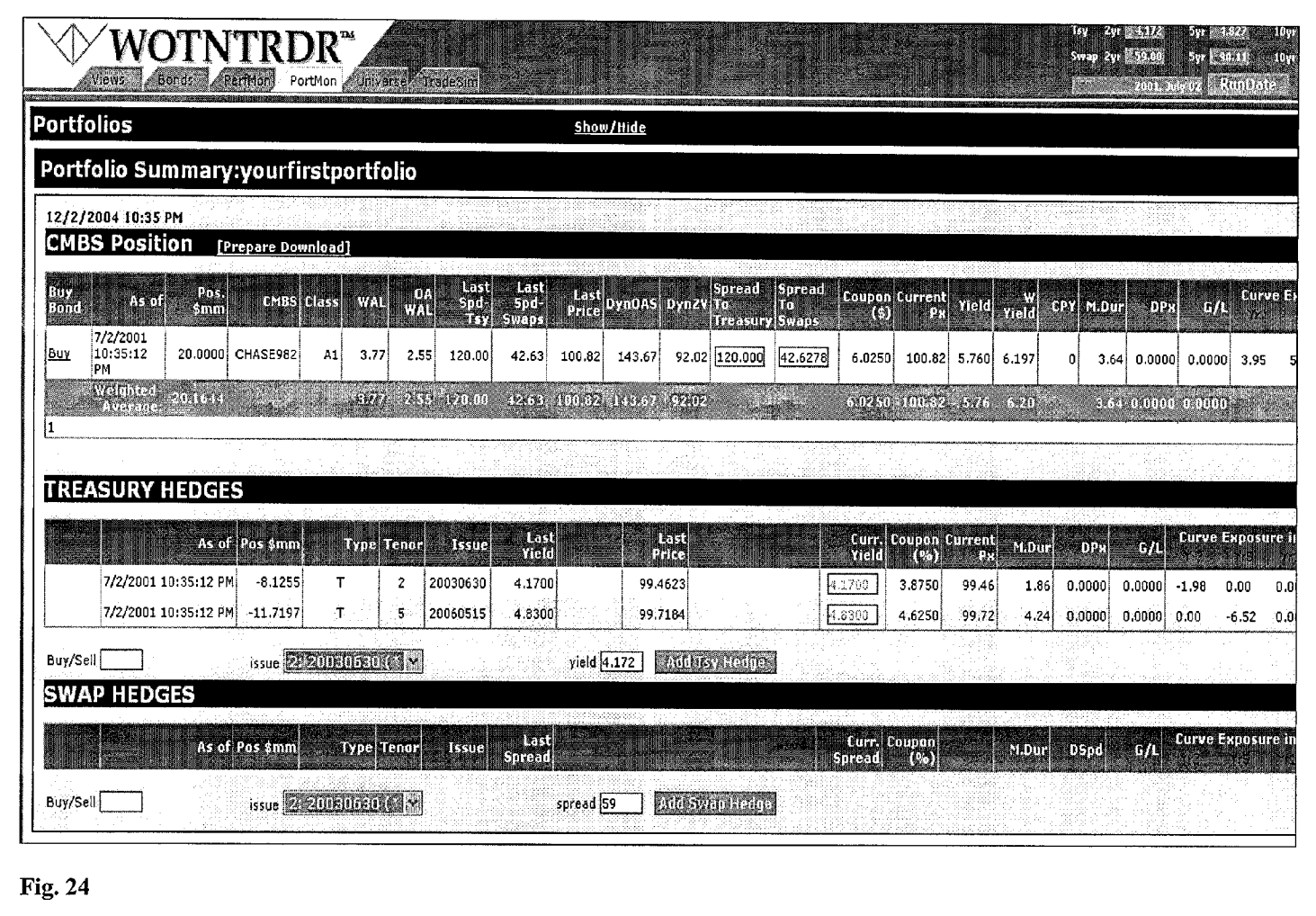

In the Portfolio Monitor screen, shown in FIGS. 23 and 24, the user will at first see all the portfolios that the user has created to date. The user can access them at will and make trades to any of them individually. To streamline the interface, the Show/Hide feature has been added to enable the user to collapse the list of all portfolios, such that the user will only see the current portfolio activated from the Buy Screen shown in FIG. 21. Once bonds are in the Portfolio Monitor, you can buy and sell directly using the embedded buy/sell and mark-to-market features. With the Portfolio Monitor the user can efficiently and consistently monitor the risk of the user's position. The design, with some modification, can accommodate live data enabling continuous-time risk monitoring. If the user wants to see the performance of a portfolio over time, the user clicks on the Performance Monitor Tab.

Figure 25:
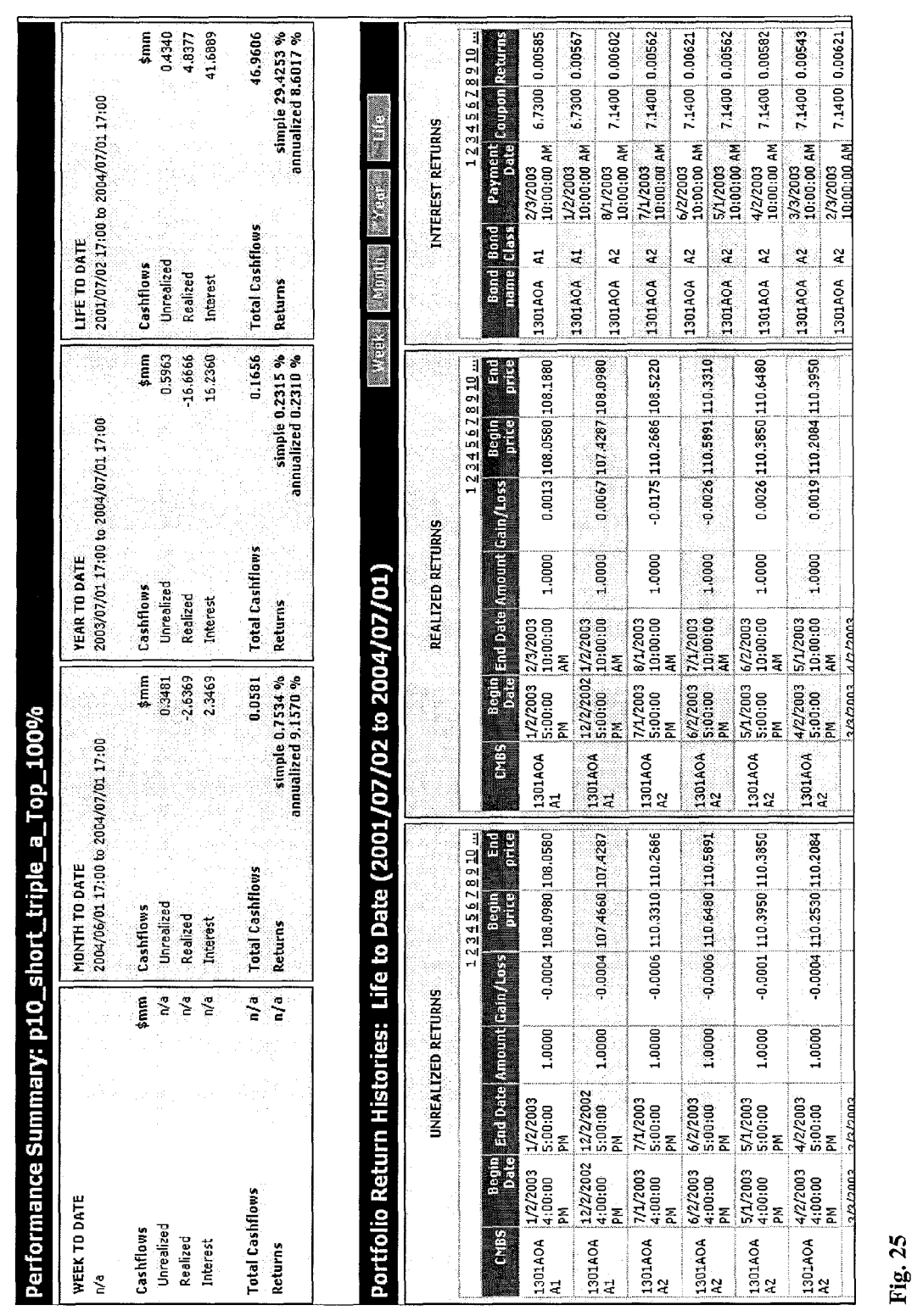

Similarly to the Portfolio Monitor, in the Performance Monitor, shown in FIG. 25, the user can utilize the file system in the Performance Monitor to monitor the performance of any number of portfolios. The Performance Monitor registers and time stamps all trades to the portfolio. Changes to the portfolio on a mark-to-market basis are captured in Unrealized Returns. Principal paydowns and erosions, as well as buys and sells are captured in the Realized Returns. Interest receipts and payments are captured in Interest Returns. The return measures are captured on an annualized basis, month to date or user defined periods.

Figure 26:
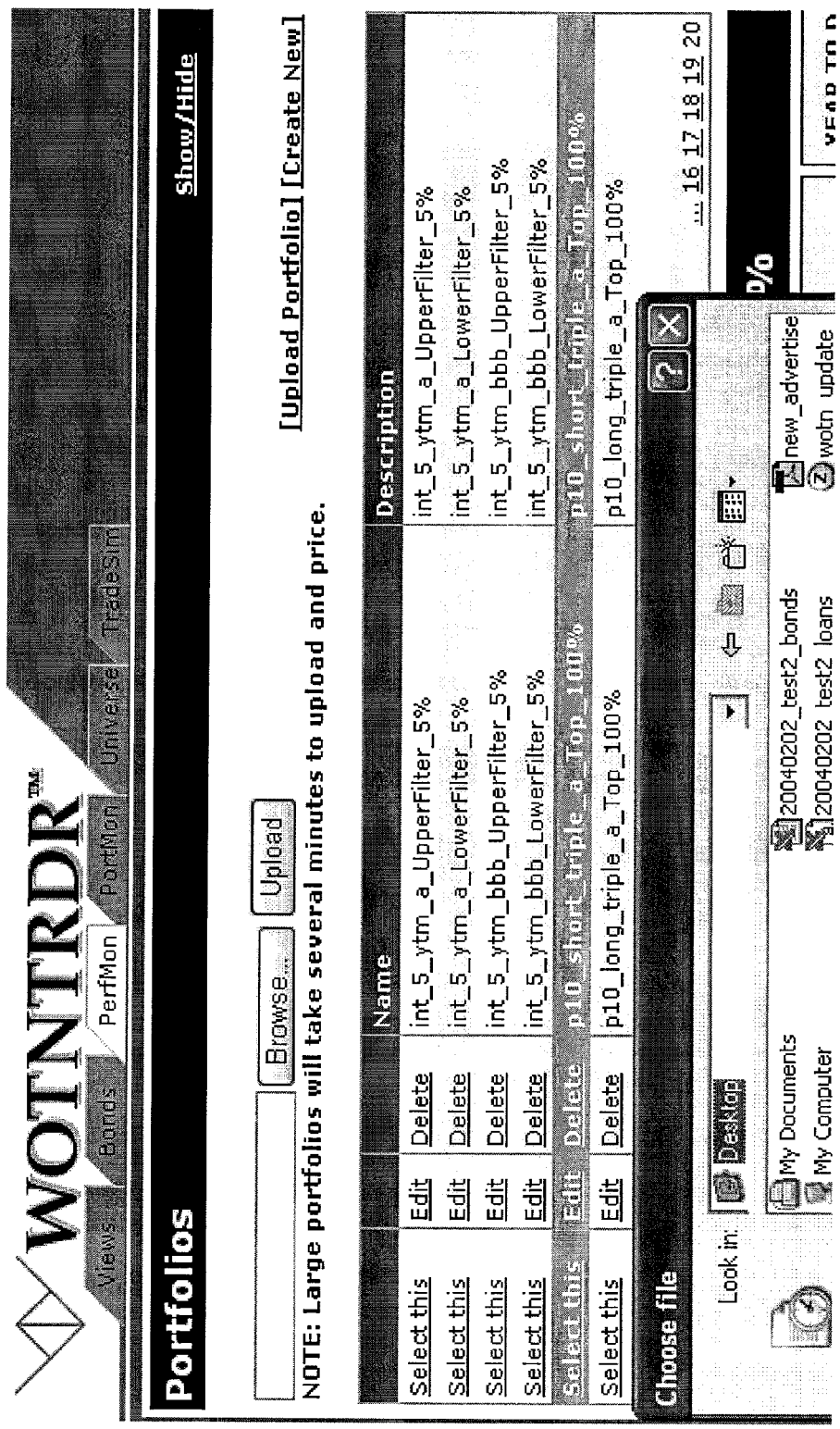

The Multibond Upload Feature of the user interface of this invention, shown in FIG. 26, gives risk managers the ability to upload a portfolio of any number of bonds and to price and hedge that portfolio automatically with the Portfolio Monitor at speeds between 0.50 and 1.50 seconds per bond.

The Universe Feature in FIG. 27 provides an instantaneous rank order of the CMBS universe embedded in the Database of this invention ranked by the deal level expected deal loss in ascending order from least risky to most risky. Another embodiment of this invention could use the deal level probability of default as the variable for rank ordering. The deal level probability of default and expected deal loss are both outputs of the simulation.

Figure 28:
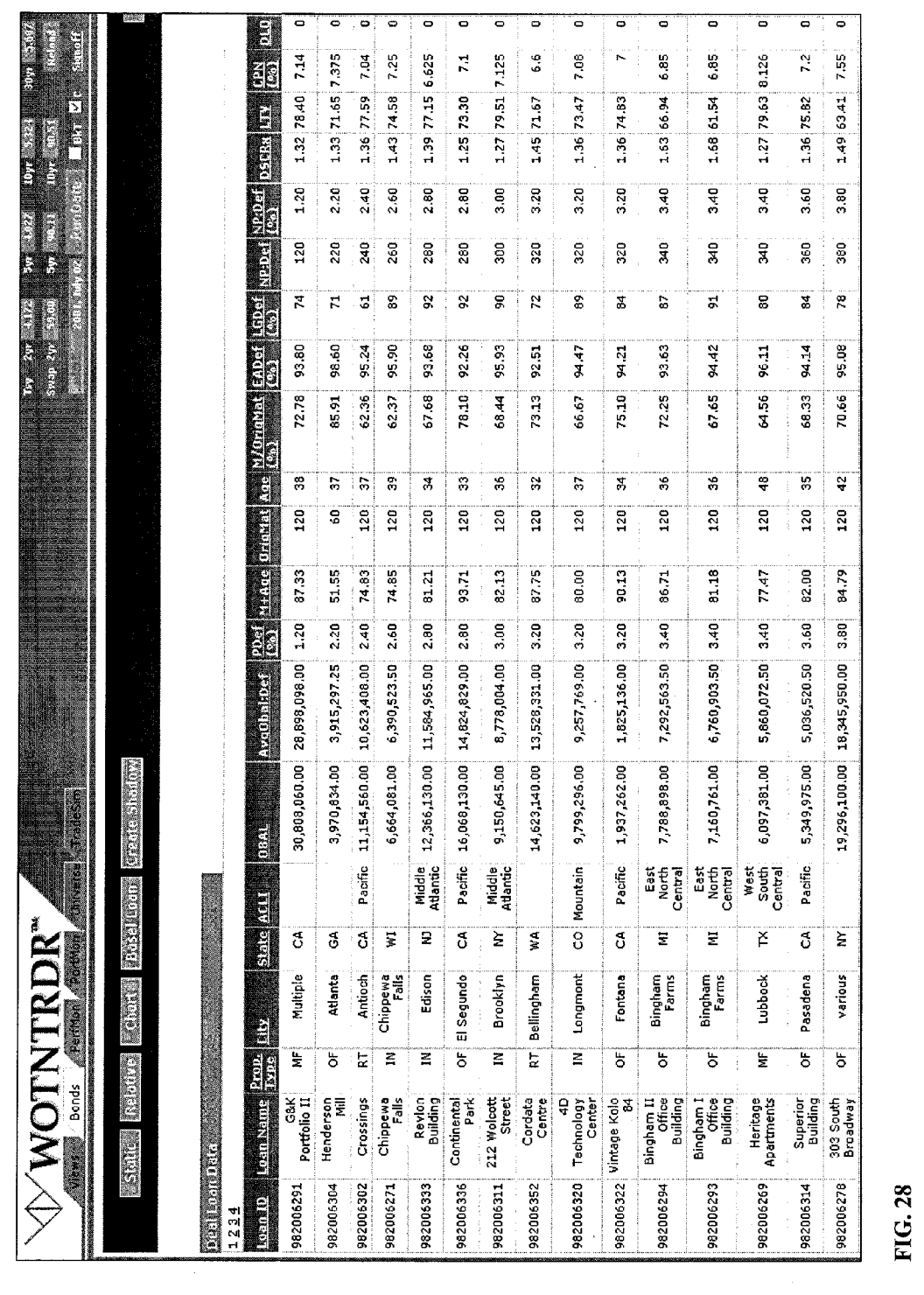

The deal level statistics depicted in FIG. 27 are aggregated values derived directly from simulated values calculated at the loan level. The values of the loan level probabilities of default, expected loss, time to default and exposure at default (all of which are currently being required to be provided by an internal ratings based model for such model to be in compliance with Basel II) can be shown to the user in the Basel Loan Page, which is shown in FIG. 28. The user simply selects a bond from the view in FIG. 10, and from the primary Static staging area, the user selects "Basel Loan" and is brought to an area of the site that summarizes the loan level statistics calculated for the selected deal in the nightly simulation.

Figure 29:
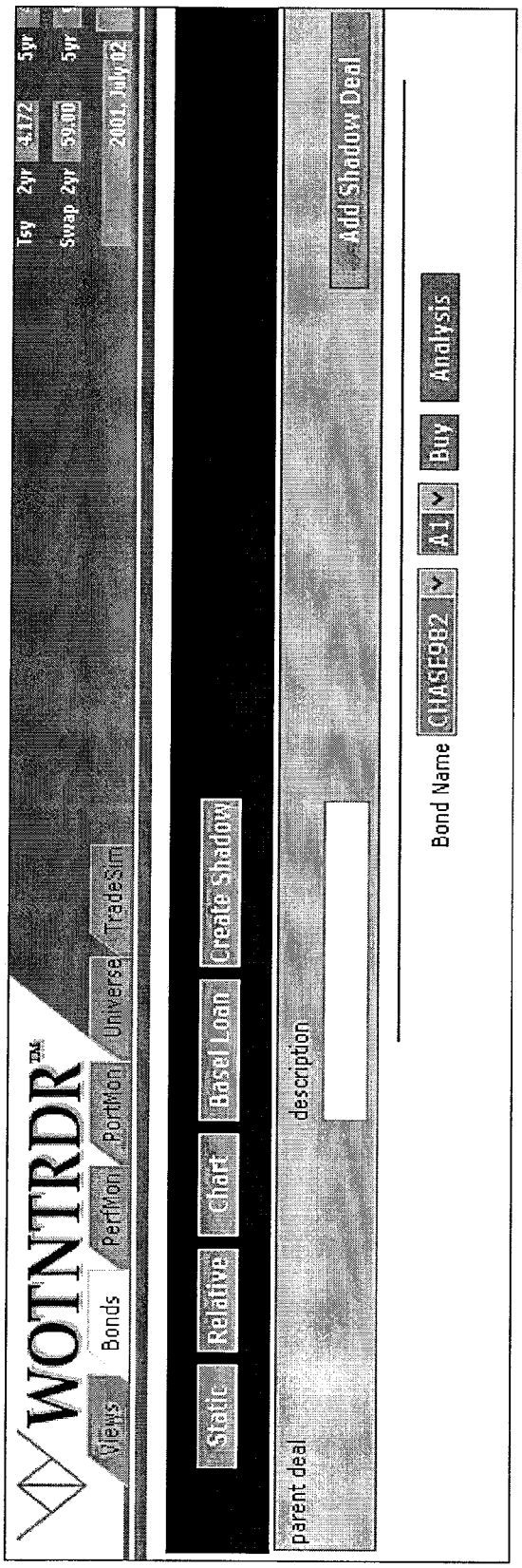

If a user wishes to create a clone or shadow deal of an already existing deal, for the purpose of engaging the loan override system (discussed below), the user selects the navigation selection button within the Analysis area of the invention called "Create Shadow," shown in FIG. 29. This will bring the user to a staging area where they input an identification of the deal, which is then given a registration number by the database of this invention. When the user exits the staging area, the Shadow deal number is revealed in the pull down menus throughout the site. The Shadow deal is treated as an existing, or natural deal, in all aspects of the simulation process, and is fully functional with all aspects of the functionality within this embodiment of the invention.

The user may have insights that they would like to impart upon the analysis that are outside the parameters and scope of the model embedded within this invention. This embodiment of the invention provides a functionality to accommodate this user requirement. As can be seen in FIG. 30, the user, upon creating a shadow deal, can navigate to a special Loan Override navigational tool that brings up the listing of loans underlying the shadow deal which are identical to those in the Shadow's natural deal. The prepayment and default profile of any loan within the Shadow deal can be assigned by the user an instruction set related to its timing, severity and likelihood of expected prepayment and/or default profile. This functionality enables users to fuse individualized expertise related to local knowledge of specific CRELs with robust statistical simulation technology provided by the model in this embodiment of the invention. As a result users may gain even more control over their risk exposure.

A user of this embodiment of the invention may wish to backtest their own trading strategies for the purpose of analysis. This embodiment of the invention provides a Trade Simulator which gives users the ability to create automated trading strategies based on measures of relative value and risk measurements (see FIG. 31). Once the user decides on the measures to be used and the time period over which the merits of the trade strategy are to be analyzed, the user inputs such parameters into the Trade Simulator and the invention creates customized portfolios automatically and runs through pricing and mark to market exercises until the period has concluded. The user then may evaluate the results in the way they would evaluate the results of any other portfolio created in the invention. This functionality enables the user to hypothesize and then test the merits of different risk-management techniques.

The Database of this invention provides the data for view through the user interface and for use in the method of this invention. Data used in the method of this invention come from several sources:

(a) Loan Data: For every structured finance product securitization ("Securitization"), there are likely to be several data files ("Loan Data Files") containing information about the loans and the tranches in the Securitization. These Loan Data Files are typically updated once a month to reflect the frequency of payments made by borrowers to the loan/mortgage servicer (the "Servicer"), by the Servicer to the trust collateralizing the Securitization (the "Trust"), and by the manager of the Trust (the "Trustee") to the bondholders of tranches in the Securitization. Although, suboptimal, in some cases, the method of this invention will require that the Structured Finance Product Database of this invention be updated with older data to reflect changes to the historical files by the Trustee or the Servicer;

(b) Economic Data: With a minimal frequency of daily and a maximum frequency of real/continuous time, the Generic Structured Finance Product Data related to economic data (the "Economic Data") from publicly available and substantially generic sources is incorporated into the Structured Finance Product Database of this invention. The Economic Data shall include, but is not limited to, prices and yields on US Treasury securities, London Interbank Offering Rates, and interest rate swap spreads, each of different tenor;

(c) Bond Price Data: With a minimal frequency of daily and a maximum frequency of real/continuous time, the Generic Structured Finance Product Data related to structured finance bond prices (the "Bond Price Data") provided either directly from market practitioners or obtained from a third-party vendor through a subscription based service, a publicly available data source, or some combination thereto is incorporated into the Structured Finance Product Database of this invention. The Bond Price Data shall be equivalent to the market prices of the bonds at the specified point in time; the Bond Price Data is typically available at a minimum at the end of every business day (closing prices);

(d) Bond Ratings: Bond Ratings related to the structured finance products and as provided by the independent rating agencies or other third-party vendors from sources considered to be reliable are incorporated into the Structured Finance Product Database of this invention. The Bond Ratings are updated sporadically in accordance with the procedures established by the independent rating agencies;

(e) Estimated Prepayment Penalties: To the extent that the right to prepay the loans that collateralize the structured finance products are restricted with some form of prepayment penalties, such prepayment restrictions on the loans (the "Loan Prepay Restrictions") need to be computed in advance and populated into the database. The calculation of Loan Prepay Restriction requires, at minimum, a simulated parallel shift in the term structure of interest rates, a query to the Loan Data files for the purpose of obtaining the loan prepay restriction schedule and/or conditions thereof, and, finally, a call to the Generic Loan Pricing Engine (FIG. 4) to calculate the Loan Prepay Restrictions for every loan that is subject to prepayment restrictions within the Structured Finance Product Database of this invention;

(f) Independent Property or Borrower Regional Information: To the extent that it is deemed necessary for the purpose of reducing the finance theory to a form commensurate with the definition of the Structured Finance Product Finance Theory of this invention, certain information associated with, but not limited to, property values, rent, occupancy, and borrower credit information, which information is derived and/or provided by sources independent of the sources for the Loan Data and organized/segmented by regions within the United States (or some other country), may be required to be incorporated in the Structured Finance Product Statistical Analysis of this invention. Such data shall be updated frequently as it is made available, but typically this information is available at maximum with daily and at minimum with quarterly frequency.

(g) Independent Delinquency, Default and Prepayment Information: To the extent that it is deemed necessary by the managers of the method of this invention for the purpose of reducing the finance theory to a form commensurate with the definition of the Structured Finance Product Finance Theory of this invention, certain information associated with, but not limited to, historical delinquency, default, and prepayment information arranged by property or borrower type and further segmented by region and possibly by other loan characteristics may be required to be incorporated in the Structured Finance Product Statistical Analysis of this invention. Such data shall be updated frequently as it is made available, but typically this information is available at maximum with daily and at minimum with quarterly frequency.

Using the above data, a relational database can be constructed, and if appropriately cast and maintained, shall serve as the primary source and repository for updated information required for the method of this invention. The data in one embodiment of the database of this invention is presented in a data structure, where the data structure includes a number of data objects, stored in the memory, each data object comprising information from the database, where the data objects include a reliability class of data objects, each data object in the reliability class comprising a structured collection of finance products with substantially reliable data, a variability class comprising a static data object and a dynamic data object, the static data object comprising static finance product characteristics and the dynamic data object comprising variable finance product characteristics, a structured finance product data object comprising structured finance product financial characteristics and a source of the structured finance product financial characteristics, and a regional class of data objects comprising region objects of different precision and relationships between the region objects.

Much care must be taken to ensure that quality control procedures are implemented to maintain the integrity of the database as it becomes the source of raw material organized for the Structured Finance Product Statistical. Analysis of this invention, which ultimately governs a substantial portion of the method of this invention. In particular, some of the areas to be aware of are:
i) missing data;
ii) inconsistent data (including changes to upper versus lower case, abbreviations, and changes of quotes or commas, etc) within frequency periods; and
iii) incorrect data (typically because of typographical errors) between frequency periods.

The description below addresses these areas and provides embodiments that account for these areas.

Figure 32:
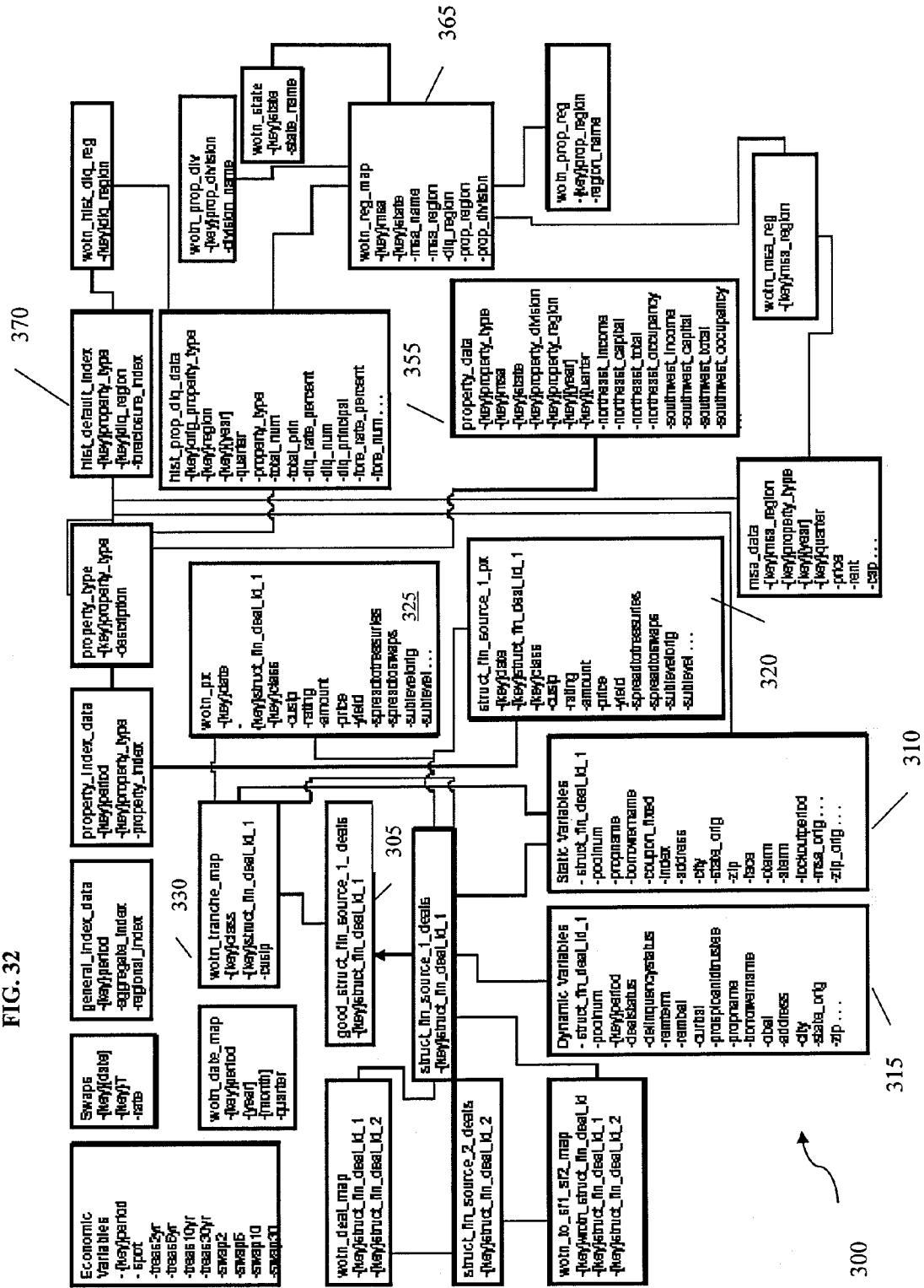
FIG. 32 shows a schematic block diagram representation of an embodiment of the database and data structures of this invention.

The Structured Finance Product Database of this invention can be implemented with any robust database program. FIG. 32 shows an embodiment 300 of the database and data structures of this invention. Some data structures such as Dynamic Variables, may have more than 200 fields in all, and thus cannot be shown in the diagram, so only a few are shown. A brief description of some of the data objects is given below:

i) struct_fin_source_1_deals: This data object contains a list of names of all deals as given by the Loan Data and Bond Data provider. Additional third-party deal names (such as those provided by third-party vendors) require mapping between these deal names and the primary deal names provided by the primary Loan Data and Bond Data provider. This is done through the tables struct_fin_source_1_deals, wotn_deal_map, and wotn_to_sf1_sf2_map.

ii) good_struct_fin_source_1_deals: If missing data from the primary loan and bond data provider makes it impossible to use these loans in parameter estimation, they must be separated from the deals that have loan and bond information that is intact and reliable. A list of deals 305 (a member of the reliability class of data objects) that are known for accurate reporting is located in the table good_struct_fin_source_1_deals.

iii) Static Variables: This data object 310 (a member of the variability class) contains a list of all "static" fields of all loans. Static fields are those fields that do not change (or at least are not supposed to change) with time. Some examples are property type, name of property, address, and securitization amount. However, in the raw data, often because of typographical errors or missing fields, fields may change from one month to the next. To accommodate this invalid data change, the most "popular" value of the field is used. So, among all the records that correspond to a particular loan, the field value which repeats most often is chosen. Blank fields are ignored. In addition to these fields, a few derived fields are also computed and stored in this table.

iv) Dynamic Variables: This data object 315 (another member of the variability class) contains a list of all fields (those that change from month to month as well as those that are not supposed to change from one month to the next) for all the loans for every month. In addition to all the fields from the loan files, a few derived fields are also present in the Dynamic Variables table. There are fields which tell whether a loan has defaulted, prepaid, or ballooned, as well as its current delinquency status. This information may be used in the Structured Finance Product Statistical Analysis of this invention.

v) struct_fin_source_1_px: This data object 320 (a structured finance product data object) contains prices, weighted average life, spread versus treasuries and swaps, ratings, yields, subordination levels, as well as other information for several tranches on a daily basis. This data comes from third-party vendors. If there is data missing from the vendors, certain fields can be populated by running the loan and bond pricing engine. For example, if one of yield, spread, or price is given by the vendor, the remaining two can be computed. The procedures to augment this process are automated in the Process of this invention and reviewed by project managers.

vi) wotn_px: This data object 325 (another structured finance product data object) contains prices which are received from actual traders. Its format is similar to struct_fin_source_1_px.

vii) wotn_tranche_map: This data object 330 maps each tranche (bond) with its cusip, class, and the deal it belongs to.

viii) property_type: To the extent that property types are a necessary component of the Structured Finance Product Database of this invention, this data object would be necessary and would contain a list of all property types. In the case of commercial real estate, for example, there are six main property types (OF—office, IN—industry, MF—multi-family apartments, LO—lodging or hotel, RT—retail, and OT—other). Additionally, a few more property types are defined for use in special cases such as ME—manufactured housing SR—small retail, RR—regular retail, and SS—self storage. Different data sources refer to property types differently and are mapped with queries into one of the six main property types.

ix) wotn_state: a list of all states in the United States.

x) wotn_prop_div: a list of all "Divisions" of the United States. In this example nine (9) divisions for the United States are used as provided for in the data. These Divisions are East North Central, Mideast, Mountain, Northeast, Pacific, Southeast, Southwest, and West North Central, and Other.

xi) wotn_prop_reg: a list of all "Regions" of the United States used in the data, These Regions are East, Midwest, South, West, and Other.

xii) property_data: For each property x region values, this data object 355 (a member of the regional class of data objects) stores several different indices every quarter (going back as far as the data history allows). The region in order of precision can be the a) entire United States; b) Division; c) Region; d) State; or e) Metropolitan Statistical Area ("MSA"). A method to compensate for sparse or skewed data would be to employ the following algorithm to provide continuity for the data in ascending order from most granular to least granular: For every (property type×MSA), if data is not available, then use data from the corresponding (AG×MSA) should be used (AG=Aggregate–a property value available for all property types) and if that is not available, then data from the corresponding (property type×state) is to be used. If that is not available, the data from the corresponding (AG× state) is used, otherwise, data from the corresponding (property type×division) should be used, and so on. That is, aggregate data can be used if property specific data is not available and data from the next larger area can be used if aggregate data is not available. Aggregate data (AG) is always available at the national level, so this data can be cascaded from the highest level to the lowest level. This is shown in FIG. 33.

xiii) Economic_Variables: Treasury prices, yields coupons and tenors, swaps spreads and tenors, zero coupon bonds tenors, prices, and yields, etc. . . .

xiv) wotn_reg_map: This data object 365 (a relationship between the region objects) contains a mapping between MSAs, states, Regions, Divisions, and foreclosure data regions.

xv) hist_default_index: This data object 370 (another relationship between the region objects) contains a foreclosure index for every (property type×foreclosure_region). The foreclosure index is computed by giving different weights to data from hist_prop_dlq_data. More recent data receives more weightage.

In one embodiment, the system of this invention includes one or more processors, a computer readable medium including a data structure, where the data structure includes information resident in a database of structured finance product data, and one or more other computer readable media having computer executable code embodied therein, the computer executable code being capable of causing the one or more processors to implement the methods of this invention. In one aspect of this invention, the computer executable code implements the user interface of this invention for display on one or more display devices.

Figure 34A:
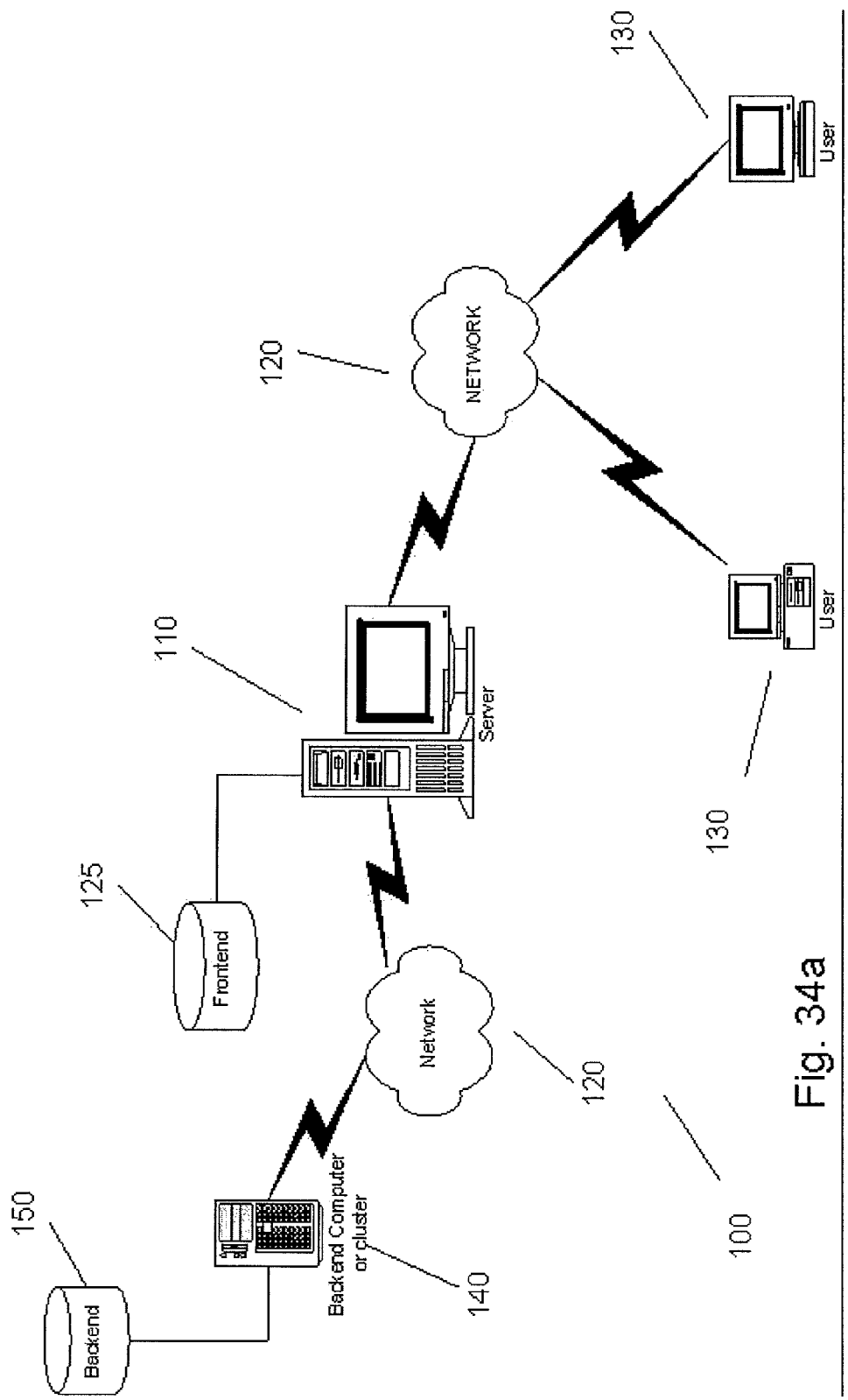
FIGS. 34a and 34b shows schematic block diagram representations of embodiments of the system of this invention.

FIG. 34a shows an embodiment of the system of this invention. Referring to FIG. 34a, a back-end computer (or computer cluster) 140 receives data from a computer readable medium 150 including a back-end database. (Hereinafter, the computer readable medium 150 including a back-end database 50 is also referred to as the database 150.) The computer readable media 150 that includes the database also includes a data structure, where the data structure includes information resident in a database of structured finance product data. The back-end computer 140 is capable of communicating via a network 120 to a server 110. The server 110 receives data from a front-end database 125 and is capable of communicating by means of the network 120 to one or more user computers 130.

Figure 34B:
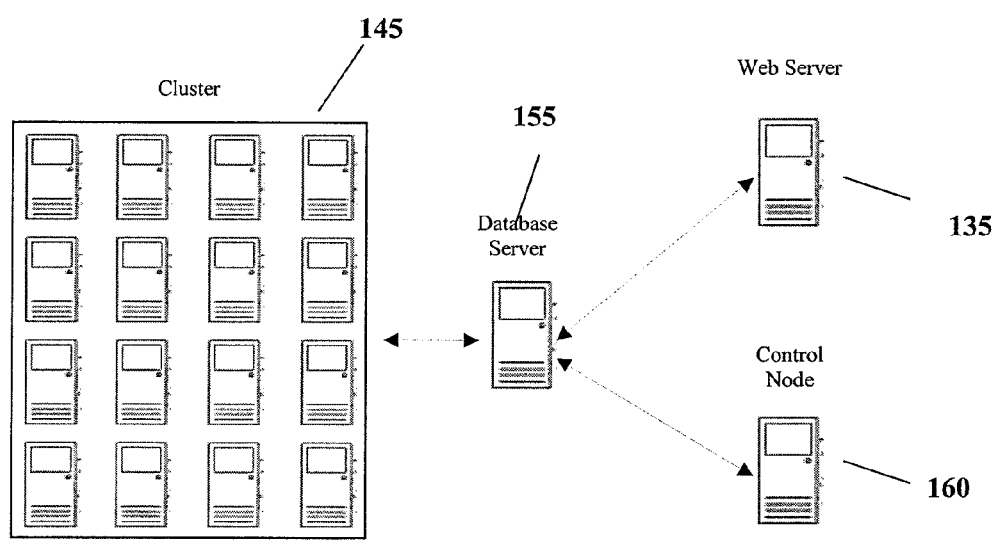

FIG. 34b shows another embodiment 102 of the system of this invention. Referring to FIG. 34b, a computer cluster 145 exchanges data with a database server 155. The database server 155 has one or more computer readable media that include the back-end and front end databases. The database server 155 communicates with a Web server 135 and a control node server 160. The Web server 135 can communicate by means of the network (not shown) with one or more user computers (also not shown).

Figure 35:
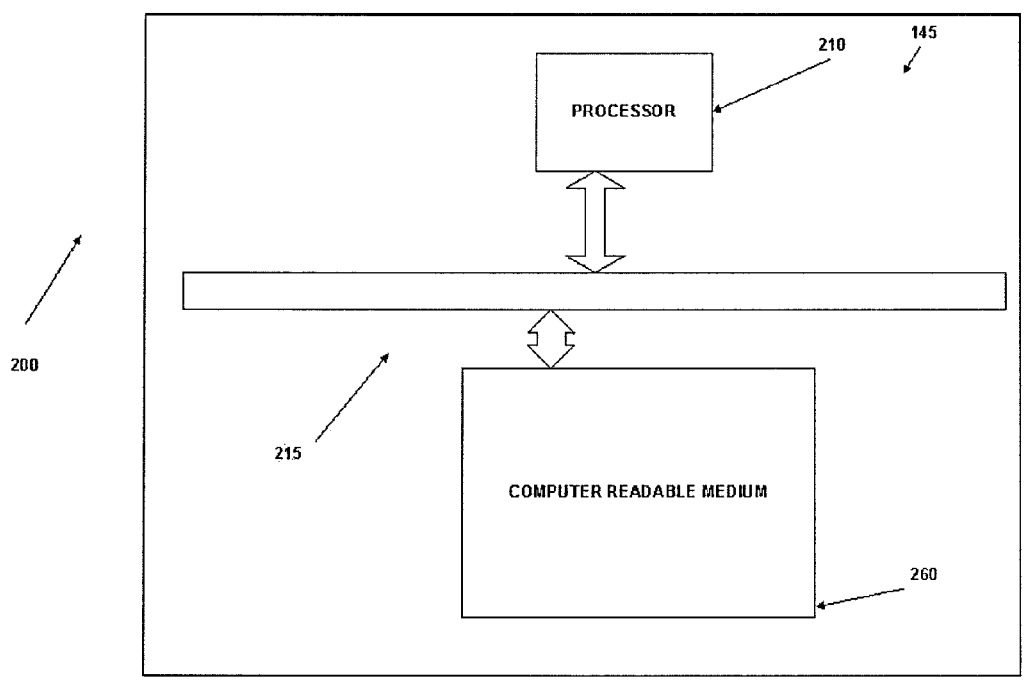
FIG. 35 shows a schematic block diagram representation of a computer system or server as used in this invention.

FIG. 35 shows a schematic block diagram representation of a computer system or server as used in this invention. Referring to FIG. 35, the embodiment 200 of the computer system or server as used in this invention includes one or more processors 210, one or more computer readable media 260 operatively connected to interconnection means 215. It should be noted that the embodiment 200 of the computer system or server as used in this invention can be, but is not limited to, a distributed embodiment and that the one or more computer readable media 260 can be, but are not limited to, several computer readable media at different locations. Similarly, the one or more processors 210 can be, but are not limited to, several processors at different locations. The interconnection means 215 can include, but are not limited to, a computer bus, a wired connection, electromagnetic carrier waves, an optical connection or a combination thereof.

In one embodiment, the back-end computer 140 includes one or more computer readable media, as shown in FIG. 35. The one or more computer readable media has computer readable code embodied therein capable of instructing one or more processors to execute the processes included in the back-end processes 40 of FIG. 4. In one embodiment, the back-end computer 140 includes a cluster of 16 4.0 GhZ clustered Intel Xeon dual micro-processors to perform the simulation runs on the three-hundred fifty (350) sample deals that were used in the development and back-testing of this particular embodiment (such as cluster 145 in FIG. 34b). This structure has the attribute of being readily scalable by simply adding additional machines to accommodate a greater number of deals because in this embodiment the technology associated with the deal files is homogenous. For six-hundred and fifty (650) deals it would take approximately two (2) clusters of this size (assuming minimal optimization) to perform daily calculations to update the databases 20 and 50 from the close of business on one day to the opening of business on the next day, which is a maximum of seven and one-half (7.5) hours. Additionally, the flexibility of the PC cluster structure enables additional optimization in memory that could further increase speeds and research flexibility and developments. The back-end computer may, but is not limited to, run under Windows and uses an MPI-framework (Message Passing Interface) to coordinate the parallelism or may use the .NET framework and Enterprise Solution 2003 queuing products. Additionally, CYGWIN emulation software may be used to facilitate the use of the clusters. In one embodiment, the code and scripts needed to execute the jobs in conjunction with the Generic Engine (FIG. 4) are written in C and C# and/or SQL scripting language. However it should be noted that other programming languages could be used.

In another embodiment, the back-end computer 140 includes a supercomputer (a supercomputer being a computer that performs at or near the currently highest operational rate for computers and is typically used for applications that must handle very large databases or do a great amount of computation or both). In a further embodiment, Linux-based servers (instead of Microsoft-based servers) could be used.

The server 110 includes one or more computer readable media (such as, but not limited to, memories, storage devices, devices to send or receive carrier waves having computer readable code). The one or more server computer readable media has computer readable code embodied. therein capable of instructing one or more processors to execute the front-end processes (FIGS. 5a and 5b) and to enable exchange of pages with the user computers 130 and the providing of a Graphical User Interface (GUI). In one embodiment, when a user requests that a web page be displayed. by a web client (typically referred to as a "web browser"), the web browser transmits a request, defined according to the Hypertext Transfer Protocol (HTTP), for the web page to the web server that hosts the web page. In response to the request, the web server transmits the requested web page to the requesting web browser in a response message that is also defined according to HTTP. The web browser displays the web page to the user based on the information contained in the response from the web server. HTTP is the language that web clients (browsers) and web servers use to communicate with each other. More specifically, HTTP defines the set of rules for exchanging information (e.g., text, graphic images, sound, or video) on the Web. Messages transmitted between web clients and web servers, therefore, are defined and exchanged according to the rules specified by HTTP. HTTP is transferred as a layer on top of the Transmission Control Protocol/Internet Protocol (TCP/IP). HTTPS (HTTP over Secure Socket Layer) or another secure variant of HTTP may be used. In this embodiment, the users do not make direct calls or contact the back-end—they interact exclusively with the Relational Database (125, FIG. 34a) via the GUI. It should be noted that alternate embodiments are possible. For example separate hardware configurations for separate users requiring partitioned or non-shared clusters and/or database and web servers can be readily implemented. In such embodiments, users may make direct calls to the back-end computational mechanism.

In one embodiment, the front-end database (125, FIG. 34a) and the back-end database (150, FIG. 34a) use the Microsoft SQL Server 2000 database. The scripts in the databases that make calls to the Generic Engine (FIG. 4) are written, in one embodiment, in C, SQL Scripting Language, and C# and are fully integrated with the GUI. In other possible embodiments, the Relational Databases 20 and 50 could utilize Oracle, and the server 110 could utilize Linux Apache Servers; other embodiments are possible.

In one embodiment presented above, the system of this invention implements communication between the server 110 and the users 130 via a password-protected subscription-based Internet portal. Users will access the output from the back-end via the Relational Database through the graphical user interface. In one embodiment, the GUI is written in MS ASP.NET and C# and is fully integrated with the Generic Engine (FIG. 4) and the Relational Database 125. The graphical user interface allows users to conduct a Trading Strategy (as set forth above) as well as gaining many other insights into the relative value of CMBS and CRELs. An embodiment of the graphical user interface is described herein above.

The following considerations guide the selection of embodiments:

i) Back-end Calculations. The back-end calculations should provide the most efficient processing time for the individual jobs that are subject to the path evolution required by the process of this invention, as well as for the aggregation and discounting of cash flows associated with such paths. Additionally, the mode of operation should be as scalable as possible for future intra- and inter-market development, Finally, the minimum frequency of update and re-running of the simulations should be nightly. Parallel clusters for individual users could be used;

ii) Relational Database. The Database should be easily integrable with the back-end calculations as well as the front-end portal from which the information shall be accessed by users, thereby providing an environment that will permit the greatest ease of use, flexibility, and scalability for developers. Parallel databases for individual users could also be included;

iii) Front-end Graphical User Interface ("GUI"). The GUI should provide a flexible code-driven framework that is easily integrated with the Relational Database and back-end calculations. Further, the GUI should be able to support multiple users accessing the information from the same database, while also providing user-specific (non-shared) points of entry into the database, thus enabling users to measure the returns of their relative value decisions through a reliable framework privately and securely. Parallel web-servers could be used for individual users.

Alternative approaches could be used to quantify interest rate, credit risk, and prepayment risk. In the embodiment presented above, an HJM model for interest rate risk was used. Alternative interest rate models would not be arbitrage free. Within the class of HJM models, the embodiment presented above utilizes a general estimation approach allowing for an arbitrary number of factors and arbitrary volatility functions. Alternative volatility structures could be assumed and then estimated, but this would result in a less general formulation. In the embodiment presented above, a reduced-form credit risk model is used. Alternative credit risk models could be used, but they would be neither arbitrage free nor consistent with the HJM model selected. In the embodiment presented above, a reduced form model for prepayment risk was used. This is consistent with industry practice for RMBS. Alternatively, one could use a "rational" model for prepayment risk, but such a model would be inconsistent with the credit component, thereby violating the necessary equivalency for competing risks. In the embodiment presented above, the credit and prepayment risk were estimated simultaneously using a competing risk model. One could alternatively estimate these processes independently, but the resulting estimates would be biased by the 'rational' assumption variables.

Alternative embodiments to the embodiment shown in FIG. 34a include installed software modules on users' desktops. One such embodiment would require an installation of the Relational Database at a central computer and, in one instance, would require an FTP download facility from the simulation back-end into each instance of such customer database to provide such customers with accurate daily information derived from the daily simulation runs. Other possible embodiments include (a) the use of an Object Request Broker architecture (such as could be implemented using COBRA or JavaBeans) and the use of "applets" or (b) parallel user clusters, database servers, and web-server configurations.

It should be noted that in alternative embodiments the server 110 and the back-end computer 140 could be replaced by one server with access to both databases 125 and 150.

Figure 36:
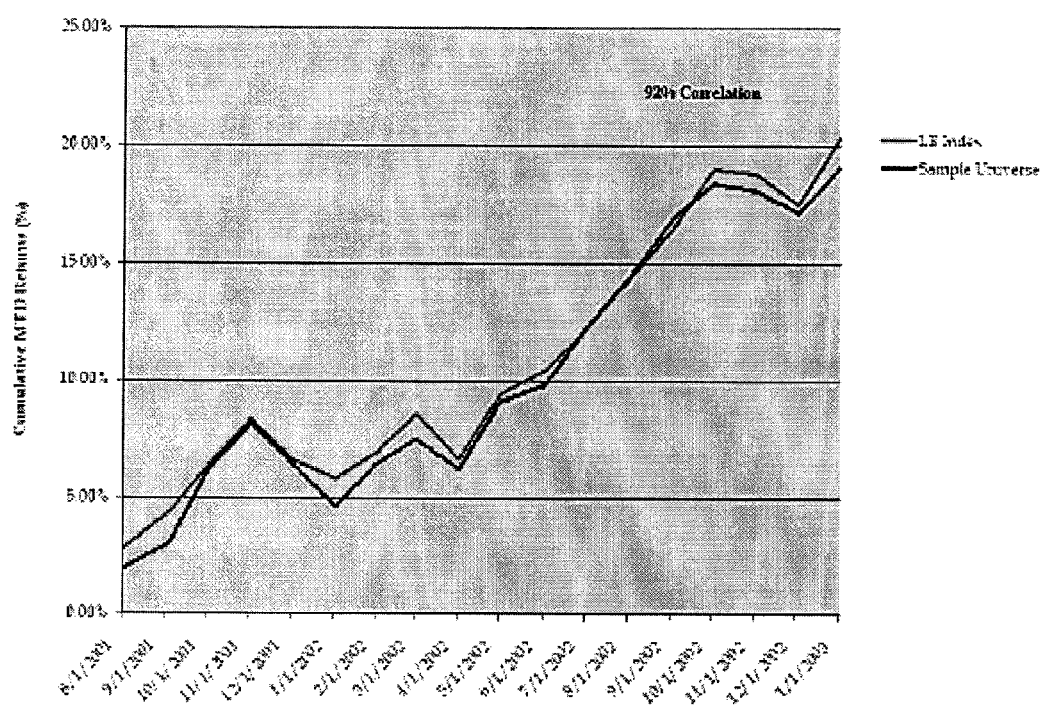
FIG. 36 is a schematic graphical representation of results from an embodiment of the method of this invention.
Figure 37:
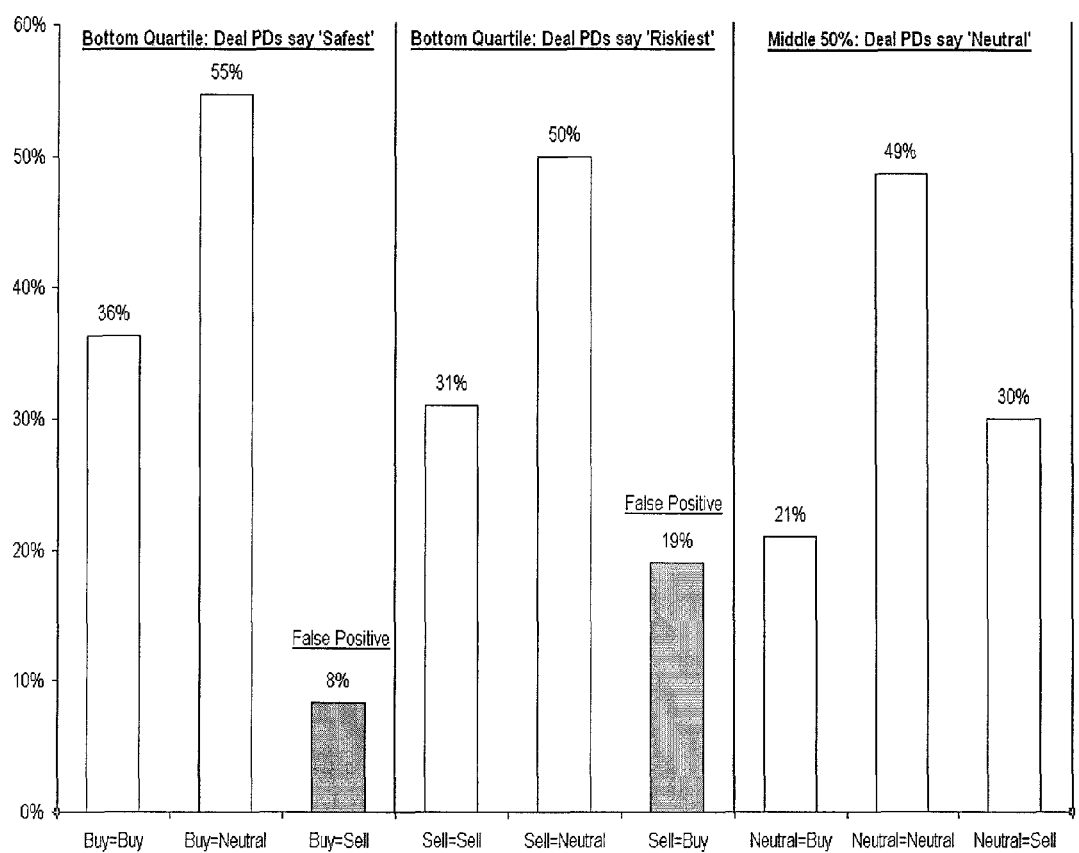
FIG. 37 is a schematic graphical representation of results of a forecasting test of an embodiment of the method of this invention.

The process of this invention has been backtested over thirty-nine (39) months to determine the validity of its trading strategy and the functionality of its relative value navigation. A CMBS Base case index is the weighted sum across credit/tenor cohorts, the weights of which are the outstanding principal balances of 100% of the bonds in such credit/tenor cohorts. In the case of this embodiment of the invention, a sample of 50% of the total fixed rate universe of CMBS was used to calculate the Base case benchmark index; and this index is 92% (results are shown in FIG. 36) correlated with the market CMBS indices of several firms. The trading strategy and relative value navigation related to CMBS and CRELs employed in the testing of one embodiment of this invention has consistently outperformed benchmark CMBS indices by about sixteen and one-half (16.5%) percent (results are shown in Table 6). One embodiment of this invention complies with the requirements for IRB Models set forth in Pillar 2 of the proposed Basel II Accord. In particular, the process of this invention provides as output Probabilities of Default (PD), Exposure Given Default (EGD), Losses Given Default (LGD), and Maturity at Default (M) over sixty (60) months at both the bond and loan level and incorporates over sixty (60) months of data in the estimation of hazard rates as necessary components to each of PD, EGD, LGD, and M (see Quick Definitions below). Finally, a forecast test over more than five years validating the predictive value of the loan level probabilities of default (and prepayment) was conducted to determine the long-term validity of the loan level default and prepayment model embodied in this invention. In the test, the loan level default probabilities were aggregated into the deal level default probabilities. Such deal level probabilities were captured at the point of securitization. All deals from a given securitization year or vintage cohort were grouped together and partitioned from other vintages. The deal level default probabilities were rank ordered in ascending order. The top quartile within each vintage cohort was considered to be a safe deal from a credit perspective indicating a "buy" signal within the cohort. The bottom quartile within each vintage cohort was considered to be a risky deal from a credit perspective, indicating a do-not buy, or "sell" signal within the cohort. This credit forecasting analysis for 1998, 1999 and 2000 vintage was conducted in order to compare the predicted performance relative to the actual cumulative credit performance as of July 2004 for a 4-6 year testing period. The actual cumulative credit performance was measured by taking the exact deals and rank ordering them by their actual cumulative default experience in ascending order, where the deals with the least number of defaults would be at the top and the most number of defaults at the bottom. The middle two quartiles were compared to adjust for error. The results are summarized in Table 1 below (and further illuminated in FIG. 37). In summary, the results show that in only 10-15% of the cases did the model provide a false positive (a buy signal that should have been a sell signal, or vice versa). These results indicate that the use of the model at the point of securitization can provide long-term insight into the relative health of different deals in the marketplace and can be of assistance to purchasers of subordinate bonds (below investment grade) in a CMBS transaction. Because of the statistical significance of the hazard rate estimations, as well as the precision with which the risk measures based on such estimates provide users (as evidenced by the outperformance of Trading Strategies, see below), the process of this invention will satisfy the substantial investor demand for unbiased analysis of their CMBS and CREL portfolios, enabling practitioners to respond effectively to crises in periods of economic difficulty and allowing them to prepare better for periods of difficulty during periods of economic stability.

TABLE 1

| Signal From Deal ProbDef | 98 in 98 | 99 in 99 | 00 in 00 | average |
|---|---|---|---|---|
| Buy = Buy | 29% | 44% | 36% | 36% |
| Buy = Neutral | 57% | 44% | 63% | 55% |
| Buy = Sell | 14% | 11% | 0% | 8% |
| Sell = Sell | 29% | 31% | 33% | 31% |
| Sell = Neutral | 57% | 60% | 33% | 50% |

TABLE 1-continued

| Signal From Deal ProbDef | 98 in 98 | 99 in 99 | 00 in 00 | average |
|---|---|---|---|---|
| Sell = Buy | 14% | 10% | 33% | 19% |
| Neutral = Buy | 29% | 22% | 12% | 21% |
| Neutral = Neutral | 43% | 50% | 53% | 49% |
| Neutral = Sell | 29% | 28% | 33% | 30% |

In an earlier embodiment, trading strategy results were captured in monthly returns on 14 different portfolios over the time period July 2001 through January 2003 and are recorded in Tables 2 and 3. As seen in the second to last row of Table 3, the difference in average returns between the undervalued portfolios (Table 2) and the overvalued portfolios (Table 3) is positive across all 7 credit/tenor cohorts, thereby providing evidence that those bonds regarded as undervalued using this embodiment of the invention have consistently outperformed those bonds considered as overvalued by this embodiment of the invention. For example, the undervalued short AAA bonds outperformed the overvalued short AAA bonds cumulatively per month, on average, by 36.6 basis points consistently in each month over this time period. Although each individual risk grouping's performance differential is not statistically different from zero, the likelihood that all 7 risk groupings' undervalued portfolios would outperform the overvalued portfolios over this time period, under the null hypothesis that the model cannot identify mispricings, is $(1/2)^7 = 0.0078$ This is strong evidence consistent with the model's ability to identify market mispricings. Over this 18 month time period, the cumulative return on all the undervalued bond portfolios outperformed the overvalued bond portfolios, using standard industry CMBS index weightings of both credit and tenor, by 468 basis points.

TABLE 2

Undervalued Portfolios

| | Short AAA | Long AAA | Short AA&A | Long AA&A | Short BBB | Long BBB | All IO's | All CMBS | Cum Return |
|---|---|---|---|---|---|---|---|---|---|
| August 2001 | 0.01805 | 0.02171 | 0.01988 | 0.02612 | 0.02085 | 0.03149 | 0.00087 | 0.01933 | 1.93% |
| September 2001 | 0.00780 | 0.01463 | 0.00871 | 0.01158 | 0.00805 | 0.00702 | 0.01270 | 0.00975 | 2.91% |
| Octover 20001 | 0.03457 | 0.03101 | 0.03120 | 0.02699 | 0.02391 | 0.02006 | 0.02348 | 0.03232 | 6.14% |
| November 2001 | 0.02087 | 0.02452 | 0.01679 | 0.02309 | 0.02294 | 0.03774 | 0.00259 | 0.02188 | 8.33% |
| December 2001 | (0.01672) | (0.01920) | (0.01226) | (0.01733) | (0.01552) | (0.02766) | (0.00592) | (0.01730) | 6.60% |
| January 20002 | (0.01653) | (0.02024) | (0.01480) | (0.02264) | (0.00642) | (0.01136) | (0.00340) | (0.01721) | 4.88% |
| Febuary 2002 | 0.01673 | 0.01977 | 0.01998 | 0.02537 | 0.01701 | 0.02106 | 0.02819 | 0.01860 | 6.74% |
| March 2002 | 0.00855 | 0.01197 | 0.01355 | 0.01343 | 0.01559 | 0.01747 | 0.02127 | 0.01092 | 7.83% |
| April 2002 | (0.01354) | (0.01857) | (0.00928) | (0.01162) | (0.00557) | (0.01098) | (0.00580) | (0.01456) | 6.37% |
| May 2002 | 0.02879 | 0.03553 | 0.03000 | 0.03363 | 0.03127 | 0.03894 | 0.03526 | 0.03198 | 9.57% |
| June 2002 | 0.00678 | 0.00940 | 0.00841 | 0.00932 | 0.00801 | 0.00978 | 0.00583 | 0.00812 | 10.38% |
| July 2002 | 0.02286 | 0.02573 | 0.02743 | 0.03172 | 0.02434 | 0.03229 | 0.02705 | 0.02506 | 12.89% |
| August 2002 | 0.02199 | 0.02151 | 0.02799 | 0.02417 | 0.02754 | 0.02531 | 0.01091 | 0.02226 | 15.11% |
| September 2002 | 0.02639 | 0.03594 | 0.03335 | 0.04187 | 0.03138 | 0.03644 | 0.01521 | 0.03203 | 18.32% |
| October 2002 | 0.01569 | 0.01554 | 0.01771 | 0.01888 | 0.01353 | 0.01654 | 0.03316 | 0.01618 | 19.93% |
| November 2002 | (0.00241) | (0.00732) | (0.00775) | (0.01728) | (0.00565) | (0.01249) | (0.00171) | (0.00623) | 19.31% |
| December 2002 | (0.00970) | (0.00766) | (0.01023) | (0.00654) | (0.01799) | (0.01495) | (0.00499) | (0.00875) | 18.44% |
| Average | 0.01001 | 0.01143 | 0.01181 | 0.01240 | 0.01137 | 0.01276 | 0.01146 | 0.01084 | |
| stdev | 0.01844 | 0.01805 | 0.01878 | 0.02016 | 0.01813 | 0.02113 | 0.01437 | 0.01748 | |

TABLE 3

Overvalued Portfolios

| | Short AAA | Long AAA | Short AA&A | Long AA&A | Short BBB | Long BBB | All IO's | All CMBS | Cum Return |
|---|---|---|---|---|---|---|---|---|---|
| August 2001 | 0.01043 | 0.01759 | 0.02051 | 0.02103 | 0.02297 | 0.02453 | (0.00258) | 0.01375 | 1.37% |
| September 2001 | 0.00670 | 0.00981 | 0.00912 | 0.00915 | 0.00794 | 0.00797 | 0.00953 | 0.00785 | 2.16% |
| October 2001 | 0.02294 | 0.03602 | 0.03035 | 0.03069 | 0.02581 | 0.02458 | 0.02369 | 0.02706 | 4.87% |

TABLE 3-continued

Overvalued Portfolios

| | Short AAA | Long AAA | Short AA&A | Long AA&A | Short BBB | Long BBB | All IO's | All CMBS | Cum Return |
|---|---|---|---|---|---|---|---|---|---|
| November 2001 | 0.01193 | 0.02250 | 0.01982 | 0.02066 | 0.02968 | 0.03012 | 0.00183 | 0.01700 | 6.57% |
| December 2001 | (0.00530) | (0.02001) | (0.01768) | (0.02021) | (0.02190) | (0.02397) | (0.00765) | (0.01279) | 5.29% |
| January 2002 | (0.00444) | (0.01340) | (0.01490) | (0.02113) | (0.01104) | (0.01345) | (0.00408) | (0.00926) | 4.36% |
| Febuary 2002 | 0.00857 | 0.01431 | 0.01873 | 0.02152 | 0.01660 | 0.01895 | 0.01486 | 0.01222 | 5.58% |
| March 2002 | 0.00366 | 0.00978 | 0.01028 | 0.01558 | 0.01795 | 0.02010 | 0.01303 | 0.00768 | 6.35% |
| April 2002 | (0.00640) | (0.01101) | (0.00751) | (0.01109) | (0.00670) | (0.00952) | (0.01196) | (0.00854) | 5.50% |
| May 2002 | 0.01489 | 0.02562 | 0.02861 | 0.03149 | 0.03134 | 0.03592 | 0.02702 | 0.02162 | 7.66% |
| June 2002 | 0.00538 | 0.00538 | 0.00586 | 0.00756 | 0.00682 | 0.00730 | 0.00183 | 0.00552 | 8.21% |
| July 2002 | 0.01285 | 0.01845 | 0.02585 | 0.02878 | 0.02311 | 0.02799 | 0.01823 | 0.01741 | 9.95% |
| August 2002 | 0.01522 | 0.01777 | 0.02159 | 0.02151 | 0.02298 | 0.02152 | 0.01740 | 0.01741 | 11.69% |
| September 2002 | 0.00968 | 0.02302 | 0.02627 | 0.03384 | 0.02369 | 0.03191 | 0.01086 | 0.01881 | 13.57% |
| October 2002 | 0.00562 | 0.01299 | 0.01665 | 0.01725 | 0.01447 | 0.01491 | 0.02129 | 0.01123 | 14.70% |
| November 2002 | 0.00229 | (0.00409) | (0.00542) | (0.00972) | (0.00243) | (0.00815) | (0.00615) | (0.00246) | 14.45% |
| December 2002 | (0.00424) | (0.00711) | (0.00995) | (0.00980) | (0.01673) | (0.01678) | (0.00452) | (0.00698) | 13.75% |
| Average | 0.00848 | 0.00827 | 0.01048 | 0.01101 | 0.01088 | 0.01141 | 0.00721 | 0.00809 | |
| stdev | 0.00823 | 0.01553 | 0.01687 | 0.01853 | 0.01882 | 0.01896 | 0.01221 | 0.01208 | |
| Difference | 0.00366 | 0.00218 | 0.00132 | 0.00139 | 0.00062 | 0.00134 | 0.00424 | 0.00278 | 4.88% |
| std error | 0.00480 | 0.00614 | 0.00679 | 0.00834 | 0.00683 | 0.00710 | 0.00471 | 0.00631 | |

A more recent embodiment of the invention (December 2004) reflecting all the changes to the invention discussed in the previous paragraphs was tested with a similar set of trading strategy backtests to validate the changes to the invention. In this test, the 10 different portfolios across tenor and credit were created in July 2001. Trading strategies using the OAS and Fair Value measures generated by the invention were used automatically to select from the contiguous sample of 1,700 bonds the most undervalued and most overvalued CMBS from the upper and lower decile in the sample. CMBS classes were purchased into their respective credit/tenor cohorts using market prices at the beginning of the month and sold using market prices at the end of the month. (As in the previous test, all appropriate interest and principal due the securities plus gains or losses due to the sale price execution were included in the calculation of the returns). We repeated the procedure for 39 months thru the end of September 2004. The results of this study are summarized in Tables 4, 5 and 6. As with the previous version of the model embedded in the previous embodiment of this invention, the CMBS bonds in their respective credit/tenor cohorts to be considered undervalued by the strategies made available in the invention, cumulatively outperformed the overvalued CMBS bonds in the same credit/tenor cohorts over the 39 months (Table 4). Further, using standard industry CMBS Index weightings for investment grade CMBS indices used by market practitioners, the weighted outperformance on an aggregate basis of the undervalued portfolios versus the overvalued portfolios was a cumulative 1,045 basis points over the 39 month period of backtesting, representing a relative outperformance of 42.22% for the period studied (Table 5). Lastly, using the same CMBS index weightings, the undervalued portfolios outperformed the benchmark CMBS index calculated for this study for a cumulative 497 basis points over the 39 month backtest period, representing a relative outperformance of 16.43% for the period studied (Table 6). These results indicate that the model embedded in this embodiment of the invention has experienced improvements as a result of changes reflecting the best practice as of this time (December 2004).

TABLE 4

| Credit/Tenor Cohort | Most Undevalued | Most Overvalued | Difference (bp) |
|---|---|---|---|
| short triple-a | 43.99% | 19.63% | 2,436 |
| long triple-a | 30.77% | 25.73% | 504 |
| all double-a | 45.91% | 33.39% | 1,252 |
| all single-a | 45.07% | 35.25% | 982 |
| all triple-b | 52.14% | 46.09% | 605 |

TABLE 5

| Credit/Tenor Cohort | CMBS Index Weighting | Most Undevalued (index wtd.) | Most Overvalued (index wtd.) | Difference (bp) |
|---|---|---|---|---|
| short triple-a | 25.77% | 11.34% | 5.06% | 628 |
| long triple-a | 51.54% | 15.86% | 13.26% | 260 |
| all double-a | 5.17% | 2.37% | 1.73% | 65 |
| all single-a | 5.94% | 2.68% | 2.09% | 58 |
| all triple-b | 5.65% | 2.95% | 2.60% | 34 |
| Weighted Total Return | | 35.19% | 24.74% | 1,045 |
| Undervalued vs. Overvalued (%) | | 42.22% | | |

TABLE 6

| Credit/Tenor Cohort | CMBS Index Weighting | Most Undevalued (index wtd.) | CMBS Benchmark Index (index wtd.) | Difference (bp) |
|---|---|---|---|---|
| short triple-a | 25.77% | 11.34% | 8.28% | 306 |
| long triple-a | 51.54% | 15.86% | 14.54% | 131 |
| all double-a | 5.17% | 2.37% | 2.08% | 29 |
| all single-a | 5.94% | 2.68% | 2.47% | 21 |
| all triple-b | 5.65% | 2.95% | 2.85% | 9 |
| Weighted Total Return | | 35.19% | 30.23% | 497 |
| Undervalued vs. Overvalued (%) | | 16.43% | | |

Elements and components described herein may be further divided into additional components or joined together to form fewer components for performing the same functions.

Each computer program (code) may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable (computer usable) media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, such as electromagnetic radiation or electrical signals, or any other medium from which a computer can read.

Although the present invention has been described in detail for CMBS. the present invention can be applied to structured finance products such as CMBS (and the underlying CRELs), Whole Loan Collateralized Mortgage Obligations (including, but not limited to, those securities collateralized by non-agency-conforming residential mortgages, 125% loan-to-value mortgages, and B-credit borrower mortgages), Asset-Backed Securities (including, but not limited to, those securities collateralized by credit card portfolios, auto loans, home equity loans, home equity lines of credit, airplane leases, and student loans), Collateralized Debt Obligations (including, but not limited to, those securities collateralized by corporate loans and lines of credit made by banks to large institutions), Collateralized Loan Obligations (including, but not limited to, those securities collateralized by corporate loans and lines of credit made by banks to large institutions), Collateralized Bond Obligations (including, but not limited to, those securities collateralized by corporate bonds), Pass-Throughs (including, but not limited to, those securities collateralized by agency-conforming residential mortgages), and Collateralized Mortgage Obligations (including, but not limited to, those securities collateralized by Pass-Throughs), as well as each of the underlying loans that serve as the collateral for each of these structured finance products.

The detailed embodiments of this invention relating to CMBS and CRELs can be extended to other structured finance products that share similar risks of payment timing with CRELs and CMBS, thus enabling the rapid improvement of risk management practices to the remaining $3.6 trillion of structured finance securities, including RMBS. There is a commonality of risks in the structured finance industry because each of these products expose investors to the risks of default, prepayment, and liquidity in very similar ways. For instance, each product is defined by tranched cash-flow allocation structures residing over a collateral pool. Each tranche within a structure is exposed to changing risks across different economic environments. The embodiment of the process of this invention applied to CMBS and CRELs evaluates the risks of CMBS and CRELs across multiple economic climates. In other embodiments specific to the various product types, the method of this invention can evaluate the risks of other structured finance securities across multiple economic climates.

CREL Amortization

The cash flows related to a CREL can be written as:

| time $t$ | payment at $t$ | balance outstanding after payment |
|---|---|---|
| 0 | | $F$ |
| 1 | $P$ | $B_1 = F(1+c) - P$ |
| 2 | $P$ | $B_2 = (F(1+c) - P)(1+c) - P$ |
| M | M | M |
| T | $P$ | $B_T = F(1+c)^T - P(1+c)^{T-1} \ldots - P$ |
| M | M | M |
| n | $P$ | $F(1+c)^n - P(1-c)^{n-1} \ldots - P = 0$ |

The task is to determine P. This implies $$P = cF\left(\frac{(1+c)^n}{(1+c)^n - 1}\right).$$

The balloon payment at time T is $$B_T = F(1+c)^T - P\left(\frac{(1+c)^T - 1}{c}\right).$$

B. Derivation of Expression (3)

Given the information set up to $X_T$, $N_d(t)$ and $N_p(t)$ are independent Poisson processes with $$Q_t(\tau_d > T \mid X_T) = e^{-\int_t^T \lambda_s ds}.$$

The density is $$dQ_t(\tau_d = s \mid X_T) = \lambda_s e^{-\int_t^\tau \lambda_u du}.$$

Similar expressions hold for $N_p(t)$. From expression (2), there are terms similar to $$E_i\left(E_i\{1_{\{T<\tau_d\}}1_{\{T<\tau_F\}}e^{-\int_i^\tau r_x ds} \mid X_T\right) =$$
$$E_i\left(e^{-\int_i^\tau r_s ds}E_i\{1_{\{T<\tau_d\}} \mid X_T\}E_i\{1_{\{T<\tau_p\}}e^{-\int_i^\tau r_s ds} \mid X_T\}\right) =$$
$$E_i\left(e^{-\int_i^\tau r_s ds}e^{-\int_i^\tau \lambda_s ds}e^{-\int_i^\tau \eta_s ds}\right).$$

There are also terms like $$E_i\left(E_t\{\delta_{\tau_d}(B_{\tau_d}+P)1_{\{\tau_d\leq T\}}1_{\{\tau_d\leq \tau_p\}}e^{-\int_i^{\tau_d} r_s ds} \mid X_T\right) =$$
$$E_t\left(E_t\{\delta_{\tau_d}(B_{\tau_d}+P)1_{\{\tau_d\leq T\}}[1_{\{\tau_d\leq \tau_p<T\}}+1_{\{T\leq\tau_p\}}]e^{-\int_i^{\tau_d} r_s ds} \mid X_T\right) =$$
$$E_i\left(E_i\{\delta_{\tau_d}(B_{\tau_d}+P)1_{\{\tau_d\leq\tau_p<T\}}e^{-\int_i^{\tau_d} r_s ds} \mid X_T\right) =$$
$$E_i\left(E_i\{\delta_{\tau_d}(B_{\tau_d}+P)1_{\{\tau_d\leq T\}}e^{-\int_i^{\tau_d} r_s ds} \mid X_T\}E_i\{1_{\{T\leq\tau_p\}} \mid X_T\}\right)$$

The first term can be written $$E_i\left(E_i\left\{\int_i^T\int_i^k \delta_s(B_s+P)1_{(\tau_d=s,\tau_p=k)}e^{-\int_i^\tau r_u du}ds\cdot dk \mid X_T\right\}\right) =$$
$$E_t\left(\int_i^T\int_i^k \delta_s(B_s+P)\lambda_s e^{-\int_i^s \lambda_s du}e^{-\int_i^s r_u du}ds\cdot\eta_k e^{-\int_i^k \eta_x du}dk\right).$$

The second term can be written $$E_i\left(E_i\left\{\int_t^T 1_{\{\tau_d=s\}}e^{-\int_i^s r_s du}ds \mid X_T\right\}E_i\{1_{\{T\leq\tau_p\}} \mid X_T\}\right) =$$
$$E_i\left(\int_t^T \lambda_x e^{-\int_i^s \lambda_u du}e^{-\int_i^s r_u du}ds\cdot e^{-\int_i^\tau \eta_s ds}\right).$$

This (and similar terms) gives expression (3).

C. CMBS Bond Tranche Allocation

CREL Pool

Using the notation from the text, let the number of loans outstanding at time t be denoted $L(t)$. Loan i has characteristics $$\{(T_i/n_i), c_i, F_i, P_i, B_i(t)\} \text{ with } N_d^i, N_p^i$$

the relevant point processes. Note that $B_i(0)=F_i$. Then, $$L(t) = \sum_{i=1}^{L(0)}\left(1 - 1_{\{N_d^i(t)+N_p^i(t)\geq 1\}}\right)$$

Reorder the index as necessary when loans are excluded. The weighted average coupon on the loan pool at time t is $$wac(t) = \sum_{i=1}^{L(t)} c_i\left(\frac{F_i}{\overline{F}(t)}\right)$$

where $$\overline{F}(t) = \sum_{i=1}^{L(t)} F_i.$$

The aggregates from the loan pool at time t are (The principal repayment penalties, in this embodiment, are included as part of the principal cash flows; this rule could be easily modified):

principal remaining $$\overline{B}(t) = \sum_{i=1}^{L(t)} B_i(t).$$

interest payments $$\overline{I}(t) = \sum_{i=1}^{L(t)} c_i F_i$$

principal cash payments $$\overline{P}(t) = \sum_{i=1}^{L(t-1)} \Delta N_d^i \delta(B_i(t)+P)(1-N_p^i(t-1)) +$$
$$\sum_{i=1}^{L(t-1)} 1_{\{t=T^i\}}B(T^i)(1-N_d^i(T^i))(1-N_p^i(T^i-1)) +$$
$$\sum_{i=1}^{L(t-1)} \Delta N_p^i B_i(t)(1+Y^i(t))(1-N_d^i(t)) +$$
$$\sum_{i=1}^{L(t-1)} (P-c_i F_i)(1-N_d^i(t))(1-N_p^i(t))$$

principal losses $$\overline{D}(t) = \sum_{i=1}^{L(t-1)} \Delta N_d^i(1-\delta)(B_i(t)+P)(1-N_p^i(t-1))$$

where $$\Delta N_j^i(t) = N_j^i(t+\Delta) - N_j^i(t).$$

CMBS Bonds

The coupon bonds have characteristics $\{\hat{c}_i, \hat{F}_i, \hat{T}_i\}$ and the IO bond has an interest payment. At time 0, the principal of the coupon bonds i=1, ..., m is set such that the entire principal of the loan pool is utilized, i.e.

$$B(0) = \sum_{i=1}^{L(0)} F_i = \sum_{i=1}^{L(0)} \hat{F}_i.$$

The IO bonds receive interest payments of $$\left[ wac(t) - \frac{\sum_{i=1}^{L(0)} \hat{c}_i \hat{F}_i}{\overline{F}(t)} \right] \overline{F}(t).$$

The aggregate interest payments on the CMBS ordinary bonds is structured to be less than the aggregate interest payments on the CRELs, i.e.

$$\sum_{i=1}^{L(0)} F_i < \sum_{i=1}^{L(0)} \hat{F}_i.$$

Let $\hat{B}_i(t)$ denote the principal remaining on the CMBS coupon bonds after any principal repayments prior to time t with $\hat{B}_i(0)=\hat{F}_i$;
Define $i_{min}$ (I)=miti$\{E_i(t-1.)>0\}$ for t>1. This is the most senior bond not yet paid off prior to time t. Define $$i_{top}(t) = \min\left\{ i : \sum_{i_{min}(t)}^{i} \hat{B}_i(t-1) > \overline{P}(t) \right\}.$$

This is the most senior bond remaining after principal payments are made at time t. Note that $i_{min}(0)=1$, and $i_{min}(t+1)=i_{top}(t)$. Define $i_{max}(t)=\max\{i: \hat{B}_i(t-1)>0\}$. This is the least senior bond still remaining after all defaults of principal prior to time t. Last, define $$i_{bottom}(t) = \max\left\{ i : \sum_{i}^{i_{max}(t)} \hat{B}_i(t-1) > \overline{D}(t) \right\}.$$

This is the least senior bond remaining after all defaults at time t. Note that $i_{max}(0)=m$, and $i_{max}(t+1)=i_{bottom}(t)$.
The allocation rules can be described as follows.
For the principal cash flows.
For t≥1, $$\hat{B}_i(t) = 0 \text{ for } i = i_{min}(t), \ldots, i_{top}(t) - 1$$

$$\hat{B}_{i_{top}(t)}(t) = \hat{B}_{i_{top}(t)}(t-1) - \left( \overline{P}(t) - \sum_{i_{min}}^{i_{top}(t)-1} \hat{B}_i(t-1) \right)$$

$$\hat{B}_i(t) = \hat{B}_i(t-1) \text{ for } i = i_{top}(t) + 1, \ldots, i_{bottom}(t) - 1$$

$$\hat{B}_{i_{bottom}(t)}(t) = \hat{B}_{i_{bottom}(t)}(t-1) - \left( \overline{D}(t) - \sum_{i_{bottom}(t)+1}^{i_{max}(t)} \hat{B}_i(t-1) \right)$$

For the interest payments:
At time t, for i=$i_{min}(t), \ldots, i_{max}(t)$, these bonds receive ȧ.
For the IO bond, it receives $$\left[ wac(t) - \frac{\sum_{i=1}^{L(0)} \hat{c}_i \hat{F}_i}{\overline{F}(t)} \right] \overline{F}(t).$$

D. Derivation of Expression (7)

In HJM (D. Heath, R. Jarrow, and A. Morton, 1992, "Bond Pricing and the Term Structure of Interest Rates: A New Methodology for Contingent Claims Valuation," *Econometrica*, 60, 77-105), the equation for the bond price process is $$\frac{dp(t,T)}{p(t,T)} = r_i dt - \sum_{j=1}^{K} \left( \int_i^{i+T} \sigma_j(t,u) du \right) dW_j(t).$$

Define $q(t, T) = P(t, t+T)$.

Then, $dq(t,T) = \frac{\partial P(t, t+T)}{\partial T} dt + d_i P(t, t+T) =$ $$\frac{\partial P(t, t+T)}{\partial T} dt + \left[ r_i dt - \sum_{j=1}^{K} \left( \int_i^{i+T} \sigma_j(t,u) du \right) dW_j(t) \right] P(t, t+T)$$

But, $$\frac{\partial P(t, t+T)}{\partial T} = \frac{\partial e^{-\int_i^{i+T} f(t,u) du}}{\partial T} = -p(t, t+T) f(t, t+T).$$

Substitution gives the result.

E. Quick Definitions

Delta (Modified Duration); delta$_i$=∂b$_i$(0)/∂r$_0$

Gamma (Convexity);

$$\text{convexity}_i = \frac{\partial \text{delta}_i(0) / \partial r_0}{b_i(0)}$$

Zero Volatility Spread (ZV or Static Spread); the unique spread to the entire spot rate curve that discounts the promised cashflows back to the market price.

Option Adjusted Spread (OAS); the average of all the unique spreads across each of the 10,000 simulated cash flow paths that discounts the simulated cash flows back to the market price.

Theta; $\theta_i(t) \equiv m_i(t) - b_i(t)$ for all i and t.

Epsilon; $\epsilon_i(t) = m_i(t) - \hat{b}_i(t)$ for all i and t.

Weighted Average Life (WAL): the weighted average time to the receipt of principal for a given tranche based on the principal payment of the underlying loans Fair Value Price; $\hat{b}_i(t) = b_i(t) - \theta_{rating}(t)$ Fair Value Spread; yield of $\hat{b}_i(t)$—yield of matched maturity Treasury bond Bond Rating; the rank order score of a bond based on the PD of the pool Subordination Level;

$$\frac{\left[\sum_{i=1}^{n} \text{Loan}_{i,t} PD_{i,j} LossSeverity_{i,t}\right]}{\sum_{i=1}^{n} \text{Loan}_{i,t}}$$

Probability of Default (PD)—loan;

$$\lambda(t, U_t^i, X_t)\Delta = 1 / \left(1 + e^{-(\varphi_\lambda + \phi_\lambda U_t^i + \psi_\lambda X_t)}\right)$$

Probability of Prepayment (PP)—loan;

$$\eta(t, U_t^i, X_t)\Delta = 1 / \left(1 + e^{-(\varphi_\eta + \phi_\eta U_t^i + \psi_\eta X_t)}\right).$$

Exposure at Default (EAD)—loan; present value of the promised payments on the loan an instant before default Loss Given Default (LGD)—loan; 1-recovery rate on the loan Maturity at Default (MD)—loan; loan maturity date—loan default time Maturity at Prepayment (MP)—loan; loan maturity date—prepayment time Probability of Default (PD)—bond; first time that the bond loses principal due to a loan defaulting Probability of Prepayment (PP)—bond; first time that the bond experiences a shortening in the WAL due to a loan prepaying Exposure At Default (EAD)—bond; present value of promised payments just prior to default on the bond Loss Given Default (LGD)—bond; 1-recovery rate on the bond Maturity at Default (MD)—bond; maturity of the bond when the bond defaults Maturity at Prepayment (MP)—bond; maturity of the bond when the bond prepays Interest Rate/Term Structure Risk in total bond composition; part of yield on bond due to interest rate risk—computed assuming no default and no prepayment in loan pool The Combined Option Risk (prepay & default) in total bond composition; part of yield on the bond not due to interest rate risk nor liquidity risk The Liquidity Risk in Total Bond Composition; part of the bond yield due to liquidity Although the invention has been described with respect to various embodiments, it should be realized this invention is also capable of a wide variety of further and other embodiments within the spirit and scope of the appended claims.

What is claimed is:

1. A computer implemented method for valuing a structured finance product based on loans, the loans characterized by probabilities of default and prepayment, the method comprising the steps of obtaining, from a database, data for a structured finance product based on loans, said data comprising historical market and loan information and current market and loan information;

determining, utilizing the data and hazard rates estimated from the data, statistical probabilities of default and prepayment on loans that serve as collateral for a collection of structured finance notes in a trust for the structured finance product; each of the statistical probabilities of default and prepayment being proportional to an intensity of a stochastic Cox process; obtaining the statistical probabilities of default and prepayment comprises including credit risk, default risk and prepayment risk; the credit risk and prepayment risk being modeled using a reduced form methodology;

obtaining, utilizing the statistical probabilities, and the data, a statistically significant number of cashflow data for each loan, wherein the number of cashflow data results in a standard error from a mean of a distribution of cashflows being statistically small; cashflow data being obtained by analysis of other stochastic processes; the other stochastic processes include interest rate risk modeled using Heath, Jarrow, Morton (HJM) model augmented by an expression for the evolution of constant maturity zero coupon bonds, constituting an augmented HJM model; using a statistically significant number of paths over a time period, each path generated under a martingale measure, estimating hazard rates, determining interest rate, using the augmented HJM model, and determining default or prepayment at predetermined intervals in the time period, said cashflows being obtained from valuation expressions for Cox processes evaluated using Monte Carlo simulations; the Monte Carlo simulations including interaction with a structured finance product pricing system at each predetermined interval; the structured finance product pricing system allocating loans into tranches;

generating, utilizing the data, a number of predicted interest rate and loan value paths, thereby generating an econometric model; outputs of the econometric model include interest rates; and determining, utilizing the data, the econometric model, and the statistical cashflow information, a valuation for the structured finance product, said valuation comprising a fair value; said valuation obtained using the cashflows obtained from valuation expressions for Cox processes evaluated using the Monte Carlo simulations; wherein the steps of obtaining, from a database, data, determining, utilizing the data, statistical probabilities of default and prepayment, generating, utilizing the data, a corresponding number of predicted interest rate and loan value paths, and determining, utilizing the data, the econometric model, and the statistical cashflow information, a valuation are performed by one or more processors executing computer readable code embodied in non-transitory computer usable media.

2. The computer implemented method of claim 1 further comprising the step of determining, utilizing the statistical cashflow information and the valuation, updated data for the structured finance product; and updating a database by including the updated data.

3. The computer implemented method of claim 1 wherein the structured finance product is at least one of Commercial Mortgage Backed Securities (CMBS) or Commercial Real Estate Loans (CRELs); and wherein said data comprises property values and property indices.

4. The computer implemented method of claim 1 wherein the prepayment risk is described using a risk hazard rate procedure.

5. The computer implemented method of claim 1 wherein the default risk is described using a risk hazard rate procedure.

6. The computer implemented method of claim 1 wherein the structured finance product is at least one of Commercial Mortgage Backed Securities (CMBS) or Commercial Real Estate Loans (CRELs); and wherein said data comprises property values and property indices.

7. The computer implemented method of claim 1 wherein the prepayment risk is described using a risk hazard rate procedure.

8. The computer implemented method of claim 1 wherein the default risk is described using a risk hazard rate procedure.

9. A system for valuing a structured finance product based on loans, the loans characterized by probabilities of default and prepayment, the system comprising:
at least one processor;
at least one non-transitory computer readable medium having computer executable code embodied therein, said computer executable code causes said at least one processor to:
obtain, from a database, data for a structured finance product; said data comprising historical and current market and loan information;
determine, utilizing the data and hazard rates estimated from the data, statistical probabilities of default and prepayment on loans that serve as collateral for a collection of structured finance notes in a trust for the structured finance product; each of the statistical probabilities of default and prepayment being proportional to an intensity of a stochastic Cox process; obtaining the statistical probabilities of default and prepayment comprises including at least one of credit risk, default or prepayment risk; the credit risk and prepayment risk being modeled using a reduced form methodology;
obtain, utilizing the statistical probabilities, and the data, a statistically significant number of cashflow data for each loan, wherein the number of cashflow data results in a standard error from a mean of a distribution of cashflows being statistically small; cashflow data being obtained by analysis of other stochastic processes; the other stochastic processes include interest rate risk modeled using a Heath, Jarrow, Morton (HJM) model augmented by an expression for the evolution of constant maturity zero coupon bonds, constituting an augmented HJM model; using a statistically significant number of paths over a time period, each path generated under a martingale measure, estimating hazard rates, determining interest rate, using the augmented HJM model, and determining default or prepayment at predetermined intervals in the time period; said cashflows being obtained from valuation expressions for Cox processes evaluated using Monte Carlo simulations; the Monte Carlo simulations including interaction with a structured finance product pricing system at each predetermined interval; the structured finance product pricing system allocating loans into tranches;
generate, utilizing the data, a number of predicted interest rate and loan value paths, thereby generating an econometric model; outputs of the econometric model include interest rates; and
determine, utilizing the data, the econometric model, and the statistical cashflow information, a valuation for the structured finance product, said valuation comprising a fair value; said valuation obtained using the cashflows obtained from valuation expressions for Cox processes evaluated using the Monte Carlo simulations.

10. The system of claim 3 wherein the computer executable code also causes said at least one processor to:
determine, utilizing the statistical cashflow information and the valuation, updated data for the structured finance product; and
update a database by including the updated data.

11. The system of claim 3 wherein said computer executable code in causing said at least one processor to determine the valuation, causes said at least one processor to determine a valuation comprising risk ratings in lieu of a fair value.

12. The system of claim 5 wherein the structured finance product is at least one of Commercial Mortgage Backed Securities (CMBS) or Commercial Real Estate Loans (CRELs); and wherein said data comprises property values and property indices.

13. The system of claim 3 wherein the default risk is described using a risk hazard rate procedure.

14. A non-transitory computer readable medium having computer executable code embodied therein, said computer executable code causing at least one processor to:
obtain, from a database, data for a structured finance product based on loans, the loans characterized by probabilities of default and prepayment, said data comprising historical and current market information and historical and current loan information;
determine, utilizing the data and hazard rates estimated from the data, statistical probabilities of default and prepayment on loans that serve as collateral for a collection of structured finance notes in a trust for the structured finance product; each of the statistical probabilities of default and prepayment being proportional to an intensity of a stochastic Cox process; obtaining the statistical probabilities of default and prepayment comprises including at least one of credit risk, default or prepayment risk; the credit risk and prepayment risk being modeled using a reduced form methodology;
obtain, utilizing the statistical probabilities, and the data, a statistically significant number of cashflow data for each loan, wherein the number of cashflow data results in a standard error from a mean of a distribution of cashflows being statistically small; cashflow data being obtained by analysis of other stochastic processes; the other stochastic processes include interest rate risk modeled using a Heath, Jarrow, Morton (HJM) model augmented by an expression for the evolution of constant maturity zero coupon bonds, constituting an augmented HJM model; using a statistically significant number of paths over a time period, each path generated under a martingale measure, estimating hazard rates, determining interest rate, using the augmented HJM model, and determining default or prepayment at predetermined intervals in the time period; said cashflows being obtained from valuation expressions for Cox processes evaluated using Monte Carlo simulations; the Monte Carlo simulations including interaction with a structured finance product pricing system at each predetermined interval; the structured finance product pricing system allocating loans into tranches;
generate, utilizing the data, a number of predicted interest rate and loan value paths, thereby generating an econometric model; outputs of the econometric model include interest rates; and
determine, utilizing the data, the econometric model, and the statistical cashflow information, a valuation for the structured finance product, said valuation comprising a fair value; said valuation obtained using the cashflows obtained from valuation expressions for Cox processes evaluated using the Monte Carlo simulations.

15. The non-transitory computer readable medium of claim 6 wherein the computer executable code also causes said at least one processor to:
  determine, utilizing the statistical cashflow information and the valuation updated data for the structured finance product; and
  update a database by including the updated data.

16. The non-transitory computer readable medium of claim 6 wherein said computer executable code in causing said at least one processor to determine the valuation, causes said at least one processor to determine a valuation comprising risk ratings in lieu of the fair value.

17. The non-transitory computer readable medium of claim 6 wherein said computer executable code in causing said at least one processor to determine the valuation, causes said at least one processor to determine a valuation also comprising at least one measure of risk.

18. The non-transitory computer readable medium of claim 6 wherein the structured finance product is at least one of Commercial Mortgage Backed Securities (CMBS) or Commercial Real Estate Loans (CRELs); and wherein said data comprises property values and property indices.

19. The non-transitory computer readable medium of claim 6 wherein the prepayment risk is described using a risk hazard rate procedure.

20. The non-transitory computer readable medium of claim 6 wherein the default risk is described using a risk hazard rate procedure.

21. A computer implemented method for valuing a structured finance product based on loans, the loans characterized by probabilities of default and prepayment, the method comprising the steps of:
  obtaining, from a database, data for a structured finance product; said data comprising historical market and loan information and current market and loan information;
  determining, utilizing the data and hazard rates estimated from the data, statistical probabilities of at least one of default or prepayment on loans that serve as collateral for a collection of structured finance notes in a trust for the structured finance product; each of the statistical probabilities of said at least one of default or prepayment being proportional to an intensity of a stochastic Cox process; obtaining the statistical probabilities of said at least one of default or prepayment comprises including at least one of credit risk, default or prepayment risk; the credit risk and prepayment risk being modeled using a reduced form methodology;
  obtaining, utilizing the statistical probabilities, and the data, a statistically significant number of cashflow data for each loan, wherein the number of cashflow data results in a standard error from a mean of a distribution of cashflows being statistically small; cashflow data being obtained by analysis of other stochastic processes; the other stochastic processes include interest rate risk modeled using a Heath, Jarrow, Morton (HJM) model augmented by an expression for the evolution of constant maturity zero coupon bonds, constituting an augmented HJM model; using a statistically significant number of paths over a time period, each path generated under a martingale measure, estimating hazard rates, determining interest rate, using the augmented HJM model, and determining default or prepayment at predetermined intervals in the time period; said cashflows being obtained from valuation expressions for Cox processes evaluated using Monte Carlo simulations; the Monte Carlo simulations including interaction with a structured finance product pricing system at each predetermined interval; the structured finance product pricing system allocating loans into tranches;
  generating, utilizing the data, corresponding number of predicted interest rate and loan value paths, thereby generating an econometric model; outputs of the econometric model include interest rates; and
  determining, utilizing the data, the econometric model, and the statistical cashflow information, a valuation for the structured finance product, said valuation comprising a fair value; said valuation obtained using the cashflows obtained from valuation expressions for Cox processes evaluated using the Monte Carlo simulations;
  wherein the steps of obtaining, from a database, data, determining, utilizing the data, statistical probabilities of at least one of default and prepayment, generating, utilizing the data, a corresponding number of predicted interest rate and loan value paths, and determining, utilizing the data, the econometric model, and the statistical cashflow information, a valuation are performed by one or more processors executing computer readable code embodied in non-transitory computer usable media.

22. The computer implemented method of claim 21 wherein the prepayment risk is described using a risk hazard rate procedure.

23. The computer implemented method of claim 21 wherein the default risk is described using a risk hazard rate procedure.

24. A system for valuing a structured finance product based on loans, the loans characterized by probabilities of default and prepayment, the system comprising:
  at least one processor;
  at least one non-transitory computer readable medium having computer executable code embodied therein, said computer executable code causes said at least one processor to:
    obtain, from a database, data for a structured finance product; said data comprising historical and current market and loan information;
    determine, utilizing the data and hazard rates estimated from the data, statistical probabilities of at least one of default or prepayment on loans that serve as collateral for a collection of structured finance notes in a trust for the structured finance product;
    each of the statistical probabilities of said at least one of default or prepayment being proportional to an intensity of a stochastic Cox process; obtaining the statistical probabilities of default and prepayment comprises including at least one of credit risk, default or prepayment risk; the credit risk and prepayment risk being modeled using a reduced form methodology;
    obtain, utilizing the statistical probabilities, and the data, a statistically significant number of cashflow data for each loan, wherein the number of cashflow data results in a standard error from a mean of a distribution of cashflows being statistically small; cashflow data being obtained by analysis of other stochastic processes; the other stochastic processes include interest rate risk modeled using a Heath, Jarrow, Morton (HJM) model augmented by an expression for the evolution of constant maturity zero coupon bonds, constituting an augmented HJM model; using a statistically significant number of paths over a time period, each path generated under a martingale measure, estimating hazard rates, determining interest rate, using the augmented HJM model, and determining default or repayment at predetermined intervals in the time period; said cashflows being obtained from valuation expressions for Cox processes evaluated using Monte Carlo simulations; the Monte Carlo simulations including interaction with a structured finance product pricing system at each predetermined interval; the structured finance product pricing system allocating loans into tranches;

generate, utilizing the data, a corresponding number of predicted interest rate and loan value paths, thereby generating an econometric model; outputs of the econometric model include interest rates; and determine, utilizing the data, the econometric model, and the statistical cashflow information, a valuation for the structured finance product, said valuation comprising a fair value; said cashflows being obtained from valuation expressions for Cox processes evaluated using Monte Carlo simulations.

25. The system of claim 24 wherein the computer executable code also causes said at least one processor to:

determine, utilizing the statistical cashflow information and the valuation, updated data for the structured finance product; and update a database by including the updated data.

26. The system of claim 24 wherein the prepayment risk is described using a risk hazard rate procedure.

27. The system of claim 24 wherein the default risk is described using a risk hazard rate procedure.

\* \* \* \* \*

UNITED STATES PATENT AND TRADEMARK OFFICE
CERTIFICATE OF CORRECTION

PATENT NO.        : 8,788,404 B1               Page 1 of 1
APPLICATION NO.   : 13/462469
DATED             : July 22, 2014
INVENTOR(S)       : Andreas D. Christopoulos et al.

It is certified that error appears in the above-identified patent and that said Letters Patent is hereby corrected as shown below:

On the title page, under (75) Inventors, "Andreas D. Christopolous" should read -- Andreas D. Christopoulos --

In the Claims

In column 75, line 66 (claim 10), "claim 3" should read -- claim 9 --
In column 76, line 5 (claim 11), "claim 3" should read -- claim 9 --
In column 76, line 9 (claim 12), "claim 5" should read -- claim 9 --
In column 76, line 14 (claim 13), "claim 3" should read -- claim 9 --
In column 77, lines 1-2 (claim 15), "claim 6" should read -- claim 14 --
In column 77, lines 8-9 (claim 16), "claim 6" should read -- claim 14 --
In column 77, lines 13-14 (claim 17), "claim 6" should read -- claim 14 --
In column 77, lines 18-19 (claim 18), "claim 6" should read -- claim 14 --
In column 77, lines 23-24 (claim 19), "claim 6" should read -- claim 14 --
In column 77, lines 26-27 (claim 20), "claim 6" should read -- claim 14 --
In column 78, line 66 (claim 24), "repayment" should read -- prepayment --

Signed and Sealed this
Thirtieth Day of September, 2014

Michelle K. Lee
*Deputy Director of the United States Patent and Trademark Office*